(12) United States Patent
Pikulski

(10) Patent No.: US 10,807,659 B2
(45) Date of Patent: Oct. 20, 2020

(54) MOTORIZED PLATFORMS

(71) Applicant: Joseph L. Pikulski, Westlake Village, CA (US)

(72) Inventor: Joseph L. Pikulski, Westlake Village, CA (US)

( * ) Notice: Subject to any disclaimer, the term of this patent is extended or adjusted under 35 U.S.C. 154(b) by 0 days.

(21) Appl. No.: 15/608,698

(22) Filed: May 30, 2017

(65) Prior Publication Data

US 2017/0341690 A1 Nov. 30, 2017

Related U.S. Application Data

(60) Provisional application No. 62/342,834, filed on May 27, 2016.

(51) Int. Cl.
| | |
|---|---|
| *B62D 51/02* | (2006.01) |
| *B62D 51/00* | (2006.01) |
| *B62K 11/00* | (2006.01) |
| *B62K 23/08* | (2006.01) |
| *B62J 25/00* | (2020.01) |
| *B62H 1/02* | (2006.01) |

(52) U.S. Cl.
CPC ......... *B62D 51/004* (2013.01); *B62D 51/001* (2013.01); *B62D 51/02* (2013.01); *B62J 25/00* (2013.01); *B62K 11/007* (2016.11); *B62K 23/08* (2013.01); *B62H 1/02* (2013.01)

(58) Field of Classification Search
CPC ................................. A63C 17/10; A63C 17/12
USPC ........................................... 180/181; 280/844
See application file for complete search history.

(56) References Cited

U.S. PATENT DOCUMENTS

| | | | |
|---|---|---|---|
| 779,886 | A | 1/1905 | Stewart |
| 1,087,167 | A | 2/1914 | Groehn et al. |
| 1,107,874 | A | 8/1914 | Appleby et al. |
| 1,112,460 | A | 10/1914 | Leaveitt et al. |
| 1,123,686 | A | 1/1915 | Cole et al. |
| 1,147,566 | A | 7/1915 | Taylor et al. |

(Continued)

FOREIGN PATENT DOCUMENTS

| | | |
|---|---|---|
| CA | 2316842 A1 | 7/1999 |
| CA | 2512299 A1 | 3/2006 |

(Continued)

OTHER PUBLICATIONS

Byrne, Brenden. "Apple Patents Articulated Bus With Tank Treads" *Valuewalk*, Aug. 9, 2016, http://www.valuewalk.com/2016/08/apple-bus-patent-tank/.

(Continued)

*Primary Examiner* — Jeffrey J Restifo
(74) *Attorney, Agent, or Firm* — Ferguson Case Orr Patterson

(57) ABSTRACT

Motorized hub assemblies for use with platforms and the corresponding motorized platforms are presented. At least one of the hub assemblies can be a motor and can contain an internal motor to propel the platform when activated. In some embodiments, the motorized platform has two sets of motorized wheels or two sets or motorized treads for differential rate maneuvering. In some embodiments, different base platforms are mounted to a single set of wheels or a single tread to provide a sporty style ride. A handlebar can also be implemented for greater stability. In all cases, there is no requirement for an electronic stabilization platform.

24 Claims, 46 Drawing Sheets

(56) References Cited

U.S. PATENT DOCUMENTS

| | | | |
|---|---|---|---|
| 1,427,583 A | 8/1922 | Davis et al. |
| 1,483,953 A | 2/1924 | Rainey et al. |
| 1,490,575 A | 4/1924 | Masury et al. |
| 1,515,756 A | 11/1924 | Roy et al. |
| 1,581,414 A | 4/1926 | Young et al. |
| 1,693,166 A | 11/1928 | Walcom et al. |
| 1,699,313 A | 1/1929 | Schlaich et al. |
| 1,771,813 A | 7/1930 | Norman et al. |
| 1,900,108 A | 3/1933 | Cerf et al. |
| 1,942,562 A | 1/1934 | Meyers et al. |
| 1,975,726 A | 10/1934 | Martinage et al. |
| 2,025,999 A | 12/1935 | Myers et al. |
| 2,082,920 A | 6/1937 | Tye et al. |
| 2,116,538 A | 5/1938 | Murphy et al. |
| 2,129,557 A | 9/1938 | Beach et al. |
| 2,312,072 A | 2/1941 | Tenger et al. |
| 2,260,027 A * | 10/1941 | Hotson .................. A63C 5/035 |
| | | | 280/11.19 |
| 2,311,475 A | 2/1943 | Schmeiser et al. |
| 2,329,582 A | 9/1943 | Bishop et al. |
| 2,345,763 A | 4/1944 | Mayne et al. |
| 2,443,236 A | 6/1948 | Gallagher et al. |
| 2,472,491 A | 6/1949 | Quinton et al. |
| 2,510,754 A | 6/1950 | Norlin et al. |
| 2,550,811 A | 5/1951 | Ignatius et al. |
| 2,555,126 A | 5/1951 | Greve et al. |
| 2,673,671 A | 3/1954 | Williams et al. |
| 2,701,169 A | 2/1955 | Cannon et al. |
| 2,725,923 A | 12/1955 | Bachrach |
| 2,798,732 A | 7/1957 | Craig et al. |
| 2,829,705 A | 4/1958 | Godshalk et al. |
| 2,855,210 A | 10/1958 | Lawrence et al. |
| 2,886,186 A | 5/1959 | Hamilton |
| 2,933,143 A | 4/1960 | Robinson |
| 2,950,924 A | 8/1960 | Gantz et al. |
| 2,960,216 A | 11/1960 | Brady et al. |
| 2,967,737 A | 1/1961 | Moore et al. |
| 2,993,702 A | 7/1961 | Gilt et al. |
| 2,999,693 A | 9/1961 | Thorson |
| 3,018,638 A | 1/1962 | Winkler et al. |
| 3,026,981 A | 3/1962 | Youtie et al. |
| 3,035,654 A | 5/1962 | Blank |
| 3,046,034 A | 7/1962 | Herrick et al. |
| 3,060,972 A | 10/1962 | Sheldon et al. |
| 3,107,642 A | 10/1963 | Edwards et al. |
| 3,166,138 A | 1/1965 | Dunn et al. |
| 3,172,376 A | 3/1965 | Havlis et al. |
| 3,190,286 A | 6/1965 | Stokes |
| 3,199,683 A | 8/1965 | Graswich |
| 3,215,219 A | 11/1965 | Forsyth et al. |
| 3,287,964 A | 11/1966 | Saito et al. |
| 3,341,219 A | 9/1967 | Marini et al. |
| 3,362,492 A | 1/1968 | Hansen et al. |
| 3,387,896 A | 6/1968 | Sobota et al. |
| 3,438,506 A | 4/1969 | Groth et al. |
| 3,442,523 A | 5/1969 | Butler et al. |
| 3,472,392 A | 10/1969 | Hahn et al. |
| 3,489,236 A | 1/1970 | Goodwin |
| 3,491,847 A | 1/1970 | Abbott |
| 3,497,083 A | 2/1970 | Victor et al. |
| 3,499,177 A | 3/1970 | Wolfe et al. |
| 3,527,354 A | 9/1970 | Sokolow et al. |
| 3,565,198 A | 2/1971 | Ames |
| 3,568,787 A | 3/1971 | Gremeret |
| 3,587,483 A | 6/1971 | Konstant |
| 3,589,746 A | 6/1971 | Bollinger |
| 3,604,526 A | 9/1971 | Hutchison |
| 3,610,431 A | 10/1971 | Rodden et al. |
| 3,656,809 A | 4/1972 | Ronning et al. |
| 3,664,526 A | 5/1972 | Dilday et al. |
| 3,688,757 A | 9/1972 | Gray et al. |
| 3,711,110 A | 1/1973 | Logerquist |
| 3,721,349 A | 3/1973 | Jaffee et al. |
| 3,762,738 A | 10/1973 | Christina |
| 3,766,863 A | 10/1973 | Danielson et al. |
| 3,826,323 A | 7/1974 | Mehne |
| 3,827,573 A | 8/1974 | Guerette |
| 3,841,424 A | 10/1974 | Purcell et al. |
| 3,864,983 A | 2/1975 | Jacobsen et al. |
| 3,865,208 A | 2/1975 | Crawshay |
| 3,874,531 A | 4/1975 | Mayo et al. |
| 3,876,032 A * | 4/1975 | Ferino .................... A63C 17/10 |
| | | | 180/181 |
| 3,925,836 A | 12/1975 | Simmonds et al. |
| 3,933,214 A | 1/1976 | Guibord et al. |
| 3,934,664 A | 1/1976 | Pohjola et al. |
| 3,971,568 A | 7/1976 | Wright et al. |
| 3,974,907 A | 8/1976 | Brewer et al. |
| 4,007,862 A | 2/1977 | Heftmann et al. |
| 4,017,092 A | 4/1977 | Boomer et al. |
| 4,051,914 A | 10/1977 | Pohjola et al. |
| 4,059,315 A | 11/1977 | Jolliffe et al. |
| 4,068,905 A | 1/1978 | Black et al. |
| 4,107,948 A | 8/1978 | Molaug |
| 4,109,971 A | 8/1978 | Black et al. |
| 4,128,170 A | 12/1978 | Elliott et al. |
| 4,132,279 A | 1/1979 | Van der Lende |
| 4,163,564 A | 8/1979 | Kramer et al. |
| 4,172,365 A | 10/1979 | Mcclintock et al. |
| 4,218,101 A | 8/1980 | Thompson |
| 4,231,709 A | 11/1980 | Corsetti et al. |
| 4,232,806 A | 11/1980 | Shald et al. |
| 4,243,242 A | 1/1981 | Waits et al. |
| 4,260,053 A | 4/1981 | Onodera et al. |
| 4,271,997 A | 6/1981 | Michael et al. |
| 4,278,264 A | 7/1981 | Lenz et al. |
| 4,296,878 A | 10/1981 | Ward et al. |
| 4,316,615 A | 2/1982 | Willete et al. |
| 4,319,629 A | 3/1982 | Hotta |
| 4,332,317 A | 6/1982 | Bahre et al. |
| 4,332,424 A | 6/1982 | Thompson et al. |
| 4,337,961 A * | 7/1982 | Covert .................... A63C 17/01 |
| | | | 280/844 |
| 4,339,031 A | 7/1982 | Densmore |
| 4,347,713 A | 9/1982 | Morrison et al. |
| 4,398,735 A | 8/1983 | Evans et al. |
| 4,412,689 A | 11/1983 | Lee et al. |
| 4,423,899 A | 1/1984 | Langmead et al. |
| 4,460,188 A | 7/1984 | Maloof et al. |
| 4,469,341 A | 9/1984 | Creim et al. |
| 4,487,134 A | 12/1984 | Foote et al. |
| 4,489,826 A | 12/1984 | Dubson et al. |
| 4,494,417 A | 1/1985 | Larson et al. |
| 4,540,192 A | 9/1985 | Harvey et al. |
| 4,544,172 A | 10/1985 | Poulouin et al. |
| 4,551,061 A | 11/1985 | Olenick et al. |
| 4,561,667 A | 12/1985 | Allia et al. |
| 4,566,292 A | 1/1986 | Parmet et al. |
| 4,589,460 A | 5/1986 | Albee et al. |
| 4,600,073 A | 7/1986 | Honett |
| 4,602,802 A | 7/1986 | Morgan et al. |
| 4,607,576 A | 8/1986 | Kranjec et al. |
| 4,621,965 A | 11/1986 | Wilcock et al. |
| 4,636,137 A | 1/1987 | Lemelson et al. |
| 4,645,023 A | 2/1987 | Rea |
| 4,646,906 A | 3/1987 | Wilcox et al. |
| 4,661,039 A | 4/1987 | Brenholt |
| 4,671,774 A | 6/1987 | Owsen et al. |
| 4,679,818 A | 7/1987 | Kakavas et al. |
| 4,700,693 A | 10/1987 | Lia et al. |
| 4,702,504 A | 10/1987 | Brothers |
| 4,703,944 A | 11/1987 | Higson et al. |
| 4,712,803 A | 12/1987 | Garcia et al. |
| 4,713,896 A | 12/1987 | Jennens et al. |
| 4,714,125 A | 12/1987 | Stacy, Jr. et al. |
| 4,724,681 A | 2/1988 | Bartholomew et al. |
| 4,725,066 A | 2/1988 | Nootenboom et al. |
| 4,735,426 A | 4/1988 | McConnell et al. |
| 4,752,105 A | 6/1988 | Barnard et al. |
| 4,756,662 A | 7/1988 | Tani et al. |
| 4,784,042 A | 11/1988 | Hardin et al. |
| 4,796,909 A | 1/1989 | Kirkendall et al. |
| 4,804,215 A | 2/1989 | Bisbing |
| 4,806,066 A | 2/1989 | Rhodes et al. |

(56) References Cited

U.S. PATENT DOCUMENTS

| | | | |
|---|---|---|---|
| 4,815,319 A | 3/1989 | Clement et al. | |
| 4,815,911 A | 3/1989 | Bengtsson et al. | |
| 4,818,175 A | 4/1989 | Motohiko | |
| 4,828,298 A | 5/1989 | Bisbing et al. | |
| 4,828,339 A | 5/1989 | Thomas | |
| 4,828,453 A | 5/1989 | Martin et al. | |
| 4,832,355 A | 5/1989 | Hung et al. | |
| 4,842,289 A | 6/1989 | Samuels et al. | |
| 4,846,493 A | 7/1989 | Mason et al. | |
| 4,848,179 A | 7/1989 | Ubhayakar | |
| 4,854,456 A | 8/1989 | Lee et al. | |
| 4,862,808 A | 9/1989 | Hedgcoxe et al. | |
| 4,873,841 A | 10/1989 | Bradshaw et al. | |
| 4,878,451 A | 11/1989 | Siren et al. | |
| 4,895,382 A | 1/1990 | Pak et al. | |
| 4,900,218 A | 2/1990 | Sutherland et al. | |
| 4,909,341 A | 3/1990 | Rippingale et al. | |
| 4,924,153 A | 5/1990 | Toru et al. | |
| 4,930,831 A | 6/1990 | Valiga et al. | |
| 4,931,677 A | 6/1990 | Shustack et al. | |
| 4,932,677 A | 6/1990 | Shustack | |
| 4,932,830 A | 6/1990 | Woodburn et al. | |
| 4,936,639 A | 6/1990 | Pohjola | |
| 4,955,626 A | 9/1990 | Smith et al. | |
| 4,960,214 A | 10/1990 | Sayers et al. | |
| 4,974,426 A | 12/1990 | Gomez et al. | |
| 4,984,648 A | 1/1991 | Strzok | |
| 4,984,760 A | 1/1991 | Cohn et al. | |
| 5,016,765 A | 5/1991 | Leonardo et al. | |
| 5,016,893 A | 5/1991 | Hart, Jr. et al. | |
| 5,018,591 A | 5/1991 | Price et al. | |
| 5,021,798 A | 6/1991 | Ubhayakar | |
| 5,022,668 A * | 6/1991 | Kenny | A63C 5/03 |
| | | | 280/11.28 |
| 5,022,812 A | 6/1991 | Coughlan | |
| 5,037,118 A | 8/1991 | Straube et al. | |
| 5,040,808 A | 8/1991 | Mcintyre et al. | |
| 5,046,914 A | 9/1991 | Holland et al. | |
| 5,048,632 A | 9/1991 | Battel | |
| D322,199 S | 12/1991 | Ayon et al. | |
| D322,915 S | 1/1992 | Franklin et al. | |
| 5,080,000 A | 1/1992 | Bubic et al. | |
| 5,080,387 A | 1/1992 | Ryals et al. | |
| 5,096,216 A | 3/1992 | Mccalla et al. | |
| 5,114,165 A | 5/1992 | Vogel et al. | |
| 5,130,631 A | 7/1992 | Gordon et al. | |
| 5,169,165 A | 12/1992 | Oates et al. | |
| 5,184,477 A | 2/1993 | Brown et al. | |
| 5,186,526 A | 2/1993 | Pennington et al. | |
| 5,199,771 A | 4/1993 | James et al. | |
| 5,205,612 A | 4/1993 | Sugden et al. | |
| 5,213,381 A | 5/1993 | Anderson et al. | |
| 5,214,858 A | 6/1993 | Pepper et al. | |
| 5,219,264 A | 6/1993 | McClure et al. | |
| 5,220,740 A | 6/1993 | Brault et al. | |
| 5,222,748 A | 6/1993 | Johnson et al. | |
| 5,231,850 A | 8/1993 | Morris et al. | |
| 5,232,232 A | 8/1993 | Mitsuhiro et al. | |
| 5,249,438 A | 10/1993 | Rhaney et al. | |
| 5,249,823 A | 10/1993 | McCoy et al. | |
| 5,252,870 A | 10/1993 | Jacobsen et al. | |
| 5,253,727 A | 10/1993 | Etherington | |
| 5,259,215 A | 11/1993 | Rocca et al. | |
| 5,262,447 A | 11/1993 | Tucker | |
| 5,263,725 A | 11/1993 | Gesmer et al. | |
| 5,269,157 A | 12/1993 | Ciminelli et al. | |
| 5,285,656 A | 2/1994 | Peters et al. | |
| 5,285,936 A | 2/1994 | Matricardi, Jr. et al. | |
| 5,286,047 A | 2/1994 | Kho et al. | |
| 5,299,817 A | 4/1994 | Chang et al. | |
| 5,305,846 A * | 4/1994 | Martin | A63C 5/085 |
| | | | 180/181 |
| 5,306,029 A | 4/1994 | Kaiser Li et al. | |
| 5,313,817 A | 5/1994 | Meinders et al. | |
| 5,317,952 A | 6/1994 | Immega | |
| 5,330,026 A * | 7/1994 | Hsu | A63C 17/01 |
| | | | 180/181 |
| D349,630 S | 8/1994 | Redmon et al. | |
| 5,337,911 A | 8/1994 | Holub | |
| 5,350,033 A | 9/1994 | Kraft et al. | |
| 5,354,324 A | 10/1994 | James | |
| 5,363,935 A | 11/1994 | Schempf et al. | |
| 5,372,262 A | 12/1994 | Benson et al. | |
| 5,373,708 A | 12/1994 | Dumoulin, Jr. et al. | |
| 5,380,022 A | 1/1995 | Dennis et al. | |
| 5,380,023 A | 1/1995 | Mcbee et al. | |
| 5,382,052 A * | 1/1995 | Tarng | A63C 1/306 |
| | | | 280/11.27 |
| 5,390,958 A * | 2/1995 | Soo | A63C 17/10 |
| | | | 280/11.27 |
| 5,407,218 A | 4/1995 | Jackson et al. | |
| 5,413,361 A | 5/1995 | Mosher et al. | |
| 5,413,380 A * | 5/1995 | Fernandez | A63C 17/10 |
| | | | 280/11.19 |
| 5,413,454 A | 5/1995 | Movsesian et al. | |
| 5,423,195 A | 6/1995 | Peters et al. | |
| 5,425,545 A | 6/1995 | McCusker et al. | |
| 5,426,336 A | 6/1995 | Jacobsen | |
| 5,427,390 A | 6/1995 | Duncan et al. | |
| 5,428,713 A | 6/1995 | Matsumaru | |
| 5,435,405 A | 7/1995 | Schempf et al. | |
| 5,440,916 A | 8/1995 | Stone | |
| 5,462,213 A | 10/1995 | Watt et al. | |
| 5,464,237 A | 11/1995 | Saporiti et al. | |
| 5,465,525 A | 11/1995 | Mifune et al. | |
| 5,465,985 A | 11/1995 | Devan et al. | |
| 5,465,996 A | 11/1995 | Wisz et al. | |
| 5,466,056 A | 11/1995 | James et al. | |
| 5,476,282 A | 12/1995 | Dah et al. | |
| 5,478,125 A | 12/1995 | Gromotka | |
| D366,599 S | 1/1996 | Brown et al. | |
| 5,480,170 A | 1/1996 | Kaiser Li et al. | |
| 5,505,474 A | 4/1996 | Yeh et al. | |
| 5,516,249 A | 5/1996 | Brimhall | |
| 5,531,464 A | 7/1996 | Maurer et al. | |
| 5,538,267 A | 7/1996 | Pasin et al. | |
| 5,539,941 A | 7/1996 | Fuller et al. | |
| 5,551,545 A | 9/1996 | Gelfman et al. | |
| 5,553,874 A | 9/1996 | Schouten et al. | |
| 5,556,370 A | 9/1996 | Maynard | |
| 5,562,843 A | 10/1996 | Yasumoto | |
| 5,566,961 A | 10/1996 | Snell et al. | |
| 5,567,110 A | 10/1996 | Sutherland et al. | |
| 5,570,992 A | 11/1996 | Lemelson et al. | |
| 5,573,316 A | 11/1996 | Wankowski et al. | |
| 5,580,096 A * | 12/1996 | Freilich | A63C 17/10 |
| | | | 280/844 |
| 5,588,688 A | 12/1996 | Jacobsen et al. | |
| 5,599,031 A | 2/1997 | Hodges et al. | |
| 5,620,191 A | 4/1997 | Sayette et al. | |
| 5,632,350 A | 5/1997 | Gauvin | |
| 5,636,852 A | 6/1997 | Sistrunk et al. | |
| 5,647,489 A | 7/1997 | Bellis, Jr. | |
| D382,309 S | 8/1997 | Brown et al. | |
| 5,672,044 A | 9/1997 | Lemelson et al. | |
| 5,697,285 A | 12/1997 | Nappi et al. | |
| 5,711,429 A | 1/1998 | Brown | |
| 5,712,961 A | 1/1998 | Matsuo | |
| 5,713,584 A | 2/1998 | Crane et al. | |
| 5,718,441 A | 2/1998 | Kern et al. | |
| 5,725,063 A | 3/1998 | Ceragioli | |
| 5,730,241 A * | 3/1998 | Shyr | A63C 17/10 |
| | | | 180/181 |
| 5,735,428 A | 4/1998 | Chern et al. | |
| 5,738,238 A | 4/1998 | Yang et al. | |
| 5,765,868 A | 6/1998 | Ventrone et al. | |
| 5,806,878 A | 9/1998 | Mroczka et al. | |
| 5,816,593 A | 10/1998 | Che | |
| 5,820,143 A | 10/1998 | Rigo et al. | |
| 5,821,666 A | 10/1998 | Matsumoto et al. | |
| 5,823,551 A | 10/1998 | Conroy et al. | |
| 5,826,893 A | 10/1998 | Snoeyenbos et al. | |
| 5,833,251 A | 11/1998 | Peck et al. | |
| 5,842,381 A | 12/1998 | Feiten | |

(56) References Cited

U.S. PATENT DOCUMENTS

| | | | |
|---|---|---|---|
| 5,842,586 A | 12/1998 | Melby | |
| 5,845,915 A | 12/1998 | Wilson et al. | |
| 5,857,695 A | 1/1999 | Crowell et al. | |
| 5,871,219 A | 2/1999 | Elliott | |
| 5,873,431 A | 2/1999 | Butler | |
| 5,876,047 A | 3/1999 | Dennis et al. | |
| 5,876,050 A | 3/1999 | Berger et al. | |
| 5,893,425 A | 4/1999 | Finkle | |
| 5,911,422 A | 6/1999 | Carpenter et al. | |
| 5,918,891 A | 7/1999 | Russell et al. | |
| 5,921,635 A | 7/1999 | Deliman et al. | |
| 5,934,706 A * | 8/1999 | Yiu | A63C 17/10 280/11.26 |
| 5,941,229 A | 8/1999 | Schlosser et al. | |
| 5,957,350 A | 9/1999 | Giles et al. | |
| 5,957,353 A | 9/1999 | Clement et al. | |
| D414,987 S | 10/1999 | Moffett, III et al. | |
| D415,658 S | 10/1999 | Frehse | |
| 5,960,968 A | 10/1999 | Wang | |
| 5,984,032 A | 11/1999 | Gremillion et al. | |
| 5,987,891 A | 11/1999 | Kim et al. | |
| 5,996,346 A | 12/1999 | Maynard | |
| 6,007,074 A | 12/1999 | Tarng | |
| 6,010,187 A | 1/2000 | Dallas et al. | |
| 6,016,385 A | 1/2000 | Yee et al. | |
| 6,021,843 A | 2/2000 | Roach | |
| 6,022,032 A | 2/2000 | Savage et al. | |
| 6,030,057 A | 2/2000 | Fikse et al. | |
| D421,552 S | 3/2000 | Frehse | |
| 6,036,219 A | 3/2000 | Oefelein et al. | |
| 6,042,122 A | 3/2000 | Mohr et al. | |
| 6,056,237 A | 5/2000 | Woodland et al. | |
| 6,056,302 A | 5/2000 | Smith et al. | |
| 6,076,298 A | 6/2000 | Teel et al. | |
| 6,079,719 A | 6/2000 | Tisbo et al. | |
| 6,079,720 A | 6/2000 | Spear et al. | |
| 6,092,817 A | 7/2000 | Kilmer et al. | |
| 6,095,533 A | 8/2000 | Balolia et al. | |
| 6,109,644 A | 8/2000 | Cox | |
| 6,109,705 A | 8/2000 | Courtemanche | |
| 6,113,343 A | 9/2000 | Goldenberg et al. | |
| 6,131,925 A | 10/2000 | Weldon et al. | |
| 6,132,133 A | 10/2000 | Muro et al. | |
| 6,132,158 A | 10/2000 | Pfeiffer et al. | |
| 6,139,029 A | 10/2000 | Shaw et al. | |
| 6,142,492 A | 11/2000 | DeLucia et al. | |
| 6,142,544 A | 11/2000 | Benzoni et al. | |
| 6,152,460 A | 11/2000 | Cooper et al. | |
| 6,153,857 A | 11/2000 | Gunnels et al. | |
| 6,162,171 A | 12/2000 | Ng et al. | |
| 6,173,842 B1 | 1/2001 | Fitzgerald et al. | |
| 6,176,499 B1 | 1/2001 | Conrado et al. | |
| 6,182,462 B1 | 2/2001 | Bania et al. | |
| 6,186,604 B1 | 2/2001 | Fikse et al. | |
| 6,193,003 B1 | 2/2001 | Dempster | |
| 6,193,247 B1 | 2/2001 | Spear et al. | |
| D439,115 S | 3/2001 | Bidwell et al. | |
| 6,213,483 B1 | 4/2001 | Gaffney et al. | |
| 6,216,488 B1 | 4/2001 | Rucker et al. | |
| 6,220,611 B1 | 4/2001 | Shapiro et al. | |
| 6,244,066 B1 | 6/2001 | Larose et al. | |
| 6,260,501 B1 | 7/2001 | Agnew et al. | |
| 6,264,216 B1 | 7/2001 | Wilson et al. | |
| 6,264,293 B1 | 7/2001 | Musselman et al. | |
| 6,264,294 B1 | 7/2001 | Musselman et al. | |
| 6,266,972 B1 | 7/2001 | Bostic et al. | |
| 6,272,396 B1 | 8/2001 | Taitler | |
| 6,276,698 B1 | 8/2001 | Calandra et al. | |
| 6,281,489 B1 | 8/2001 | Tubel et al. | |
| 6,295,830 B1 | 10/2001 | Newman et al. | |
| 6,311,991 B1 | 11/2001 | Conrado et al. | |
| 6,315,304 B1 | 11/2001 | Kirkland et al. | |
| 6,315,312 B1 | 11/2001 | Reyes et al. | |
| 6,318,740 B1 | 11/2001 | Nappo et al. | |
| 6,323,615 B1 | 11/2001 | Khairallah et al. | |
| 6,328,179 B1 | 12/2001 | Conrado et al. | |
| 6,333,631 B1 | 12/2001 | Das et al. | |
| 6,338,493 B1 | 1/2002 | Wohlgemuth et al. | |
| 6,339,993 B1 | 1/2002 | Comello et al. | |
| 6,349,559 B1 | 2/2002 | Hasanovic et al. | |
| 6,354,611 B1 | 3/2002 | Mihalic et al. | |
| 6,367,828 B1 | 4/2002 | Mandic et al. | |
| 6,375,055 B1 | 4/2002 | Spykerman et al. | |
| 6,378,712 B1 | 4/2002 | Sampl | |
| 6,380,889 B1 | 4/2002 | Herrmann et al. | |
| 6,390,309 B1 | 5/2002 | Tucker et al. | |
| 6,394,204 B1 | 5/2002 | Haringer | |
| 6,398,272 B1 | 6/2002 | Plummer et al. | |
| 6,408,224 B1 | 6/2002 | Okamoto et al. | |
| 6,411,055 B1 | 6/2002 | Fujita et al. | |
| 6,419,248 B1 | 7/2002 | Kay et al. | |
| 6,422,509 B1 | 7/2002 | Yim et al. | |
| 6,428,022 B1 | 8/2002 | Namiki et al. | |
| 6,428,023 B2 | 8/2002 | Reyes et al. | |
| 6,430,475 B2 | 8/2002 | Okamoto et al. | |
| 6,435,290 B1 * | 8/2002 | Justus | A63C 5/08 180/181 |
| 6,446,988 B1 | 9/2002 | Kho et al. | |
| 6,467,779 B1 | 10/2002 | Mills et al. | |
| 6,467,782 B1 | 10/2002 | Smith et al. | |
| 6,471,237 B1 | 10/2002 | Bedsole et al. | |
| 6,474,097 B2 | 11/2002 | Treppedi et al. | |
| 6,474,666 B1 | 11/2002 | Andersen et al. | |
| 6,477,444 B1 | 11/2002 | Bennett et al. | |
| 6,484,083 B1 | 11/2002 | Hayward et al. | |
| 6,497,424 B2 | 12/2002 | Gartner et al. | |
| 6,502,656 B2 | 1/2003 | Weiss | |
| 6,505,843 B1 | 1/2003 | Williams et al. | |
| 6,505,896 B1 | 1/2003 | Boivin et al. | |
| 6,508,077 B1 | 1/2003 | Vander Boegh et al. | |
| 6,512,345 B2 | 1/2003 | Borenstein et al. | |
| D470,798 S | 2/2003 | Martin et al. | |
| 6,520,513 B2 | 2/2003 | Presley-Mays et al. | |
| 6,520,597 B1 | 2/2003 | Markling et al. | |
| 6,522,950 B1 | 2/2003 | Conca et al. | |
| 6,523,837 B2 | 2/2003 | Kirkland et al. | |
| 6,533,298 B2 | 3/2003 | Sims et al. | |
| 6,535,793 B2 | 3/2003 | Allard et al. | |
| 6,536,228 B1 | 3/2003 | Hall et al. | |
| 6,536,733 B1 | 3/2003 | Sharp et al. | |
| 6,540,310 B1 | 4/2003 | Cartwright et al. | |
| 6,543,800 B1 | 4/2003 | Doran et al. | |
| 6,550,791 B2 | 4/2003 | Ramsey et al. | |
| 6,557,954 B1 | 5/2003 | Hattori et al. | |
| 6,561,396 B2 | 5/2003 | Ketterhagen et al. | |
| 6,563,084 B1 | 5/2003 | Bandy et al. | |
| 6,574,958 B1 | 6/2003 | MacGregor et al. | |
| 6,576,406 B1 | 6/2003 | Jacobsen et al. | |
| 6,581,718 B1 | 6/2003 | Vigren | |
| 6,581,945 B1 | 6/2003 | Shapiro et al. | |
| 6,585,304 B1 | 7/2003 | Boozer et al. | |
| 6,595,812 B1 | 7/2003 | Haney et al. | |
| D479,159 S | 9/2003 | Martin et al. | |
| 6,619,485 B1 | 9/2003 | Jenkins et al. | |
| 6,626,453 B1 | 9/2003 | Theus et al. | |
| 6,636,781 B1 | 10/2003 | Shen et al. | |
| 6,637,835 B2 | 10/2003 | Morris et al. | |
| 6,641,149 B2 | 11/2003 | Chiappetta et al. | |
| 6,648,349 B1 | 11/2003 | Waller et al. | |
| 6,651,456 B1 | 11/2003 | White et al. | |
| 6,651,804 B2 | 11/2003 | Thomas et al. | |
| 6,652,164 B2 | 11/2003 | Stiepel et al. | |
| 6,668,951 B2 | 12/2003 | Won et al. | |
| 6,669,214 B1 | 12/2003 | Domis et al. | |
| 6,669,215 B2 | 12/2003 | Laporte | |
| 6,679,795 B2 | 1/2004 | Ouimette et al. | |
| 6,708,068 B1 | 3/2004 | Sakaue et al. | |
| 6,715,575 B2 | 4/2004 | Karpik et al. | |
| 6,725,128 B2 | 4/2004 | Hogg et al. | |
| 6,736,416 B1 | 5/2004 | Romeo et al. | |
| 6,739,150 B2 | 5/2004 | Garcia et al. | |
| 6,755,428 B2 | 6/2004 | Butler et al. | |
| 6,758,482 B2 | 7/2004 | Stallbaumer et al. | |
| 6,772,673 B2 | 8/2004 | Seto et al. | |

(56) References Cited

U.S. PATENT DOCUMENTS

| | | |
|---|---|---|
| 6,773,327 B1 | 8/2004 | Felice et al. |
| 6,774,597 B1 | 8/2004 | Borenstein et al. |
| 6,783,147 B1 | 8/2004 | Green, Sr. et al. |
| 6,792,935 B2 | 9/2004 | Williams et al. |
| 6,793,223 B2 | 9/2004 | Ondrasik et al. |
| 6,796,319 B1 | 9/2004 | Patarra et al. |
| 6,799,689 B2 | 10/2004 | Langtry et al. |
| 6,805,113 B2 | 10/2004 | Stephen et al. |
| 6,811,180 B1 | 11/2004 | Molliere et al. |
| 6,814,362 B2 | 11/2004 | Hanson et al. |
| 6,824,150 B2 | 11/2004 | Simione et al. |
| 6,831,436 B2 | 12/2004 | Gonzalez et al. |
| 6,837,318 B1 | 1/2005 | Craig et al. |
| 6,840,588 B2 | 1/2005 | Deland et al. |
| 6,843,062 B2 | 1/2005 | Crete et al. |
| 6,883,267 B1 | 4/2005 | Pruitt et al. |
| 6,889,118 B2 | 5/2005 | Murray, IV et al. |
| 6,893,030 B2 | 5/2005 | Shapiro et al. |
| 6,917,176 B2 | 7/2005 | Schempf |
| 6,918,563 B2 | 7/2005 | Tseng |
| 6,921,101 B1 | 7/2005 | Lauren et al. |
| D508,455 S | 8/2005 | Oakley et al. |
| 6,923,516 B2 | 8/2005 | Sheng-Bin et al. |
| 6,923,693 B2 | 8/2005 | Borgen et al. |
| 6,926,294 B2 | 8/2005 | Lewis et al. |
| 6,932,362 B1 | 8/2005 | Barrett et al. |
| 6,932,365 B2 | 8/2005 | Chiappetta et al. |
| 6,936,003 B2 | 8/2005 | Iddan et al. |
| 6,944,981 B1 | 9/2005 | Garberg et al. |
| 6,948,334 B1 | 9/2005 | Challenger et al. |
| 6,962,354 B1 | 11/2005 | Miller et al. |
| 6,981,705 B1 | 1/2006 | Jolley et al. |
| 6,983,941 B2 | 1/2006 | Moscaret et al. |
| 6,993,931 B1 | 2/2006 | Hamilton et al. |
| D516,869 S | 3/2006 | Beal |
| 7,011,224 B2 | 3/2006 | Sheng-Bin et al. |
| 7,017,940 B2 | 3/2006 | Hatfull et al. |
| D521,322 S | 5/2006 | Loving et al. |
| 7,040,115 B1 | 5/2006 | Lopez et al. |
| 7,040,426 B1 | 5/2006 | Berg et al. |
| 7,051,550 B2 | 5/2006 | Roth et al. |
| 7,066,476 B2 | 6/2006 | Elden et al. |
| 7,066,628 B2 | 6/2006 | Allen et al. |
| 7,070,196 B1 | 7/2006 | Larsen et al. |
| 7,080,920 B2 | 7/2006 | Fitzsimmons et al. |
| 7,090,637 B2 | 8/2006 | Danitz et al. |
| 7,091,724 B2 * | 8/2006 | Heinzmann .......... G01R 31/343 324/546 |
| 7,108,335 B2 | 9/2006 | Morris |
| 7,121,560 B1 | 10/2006 | Balzano et al. |
| 7,137,465 B1 | 11/2006 | Kerrebrock et al. |
| 7,143,601 B1 | 12/2006 | Jimenez et al. |
| 7,150,460 B2 | 12/2006 | Williams et al. |
| 7,155,859 B1 | 1/2007 | Brooks et al. |
| 7,171,279 B2 | 1/2007 | Buckingham et al. |
| 7,188,473 B1 | 3/2007 | Asada et al. |
| 7,188,491 B2 | 3/2007 | Donald, II et al. |
| 7,198,280 B2 * | 4/2007 | Hara .................. A63C 17/0033 280/87.042 |
| 7,210,545 B1 | 5/2007 | Waid et al. |
| 7,213,817 B2 | 5/2007 | Cheung et al. |
| 7,229,093 B1 | 6/2007 | Carter et al. |
| 7,232,183 B1 | 6/2007 | Haught et al. |
| 7,249,772 B2 | 7/2007 | Bruns et al. |
| 7,252,295 B2 | 8/2007 | Bludworth et al. |
| 7,275,607 B2 * | 10/2007 | Kamen ................ A63C 17/01 180/7.1 |
| 7,284,763 B1 | 10/2007 | King et al. |
| 7,296,816 B2 | 11/2007 | Wilnau et al. |
| 7,306,243 B2 | 12/2007 | Van Horn et al. |
| 7,311,487 B1 | 12/2007 | Crossley et al. |
| 7,322,586 B1 | 1/2008 | Zettel et al. |
| 7,331,436 B1 | 2/2008 | Pack et al. |
| 7,334,802 B2 | 2/2008 | Kaplan |
| 7,340,917 B1 | 3/2008 | Coleman et al. |
| 7,383,908 B2 * | 6/2008 | Tuli .................... A43B 3/0005 180/181 |
| 7,389,608 B1 | 6/2008 | MacKay et al. |
| 7,398,618 B2 | 7/2008 | Schomaker et al. |
| 7,407,170 B1 | 8/2008 | Williams et al. |
| 7,415,321 B2 | 8/2008 | Okazaki et al. |
| 7,419,168 B2 | 9/2008 | Felty et al. |
| 7,451,709 B2 | 11/2008 | Swartfager et al. |
| 7,458,435 B2 * | 12/2008 | Negoro ................ A63C 17/12 180/180 |
| 7,458,589 B2 | 12/2008 | Vanderberg et al. |
| 7,458,590 B2 | 12/2008 | Vanderberg et al. |
| 7,458,591 B2 | 12/2008 | Vanderberg et al. |
| 7,458,592 B2 | 12/2008 | Maratta |
| 7,464,943 B1 | 12/2008 | Poggioli et al. |
| 7,475,745 B1 | 1/2009 | Deroos et al. |
| 7,475,889 B2 | 1/2009 | Marmah et al. |
| 7,487,977 B2 | 2/2009 | Johnson et al. |
| 7,513,510 B2 | 4/2009 | Vanderberg et al. |
| 7,540,344 B2 | 6/2009 | Yamamoto et al. |
| 7,540,364 B2 | 6/2009 | Sanderson et al. |
| 7,543,828 B2 | 6/2009 | Vanderberg et al. |
| 7,546,912 B1 | 6/2009 | Pack et al. |
| 7,549,653 B2 | 6/2009 | Vanderberg et al. |
| 7,549,655 B2 | 6/2009 | Fan et al. |
| 7,559,559 B2 | 7/2009 | Vanderberg et al. |
| 7,562,897 B1 | 7/2009 | Sherman et al. |
| 7,575,075 B2 | 8/2009 | Fairhead |
| D599,625 S | 9/2009 | Lessells et al. |
| 7,597,334 B2 | 10/2009 | Chen et al. |
| 7,597,762 B2 | 10/2009 | Albanese et al. |
| 7,600,592 B2 | 10/2009 | Goldenberg et al. |
| D604,473 S | 11/2009 | Gibson et al. |
| 7,628,406 B1 | 12/2009 | Thomas et al. |
| 7,645,047 B2 | 1/2010 | Martinez et al. |
| 7,648,147 B2 | 1/2010 | Lauer et al. |
| 7,654,348 B2 | 2/2010 | Ohm et al. |
| 7,658,442 B1 | 2/2010 | Whiteside et al. |
| 7,661,685 B2 | 2/2010 | Thibault et sal |
| 7,677,581 B2 | 3/2010 | Vanderberg et al. |
| 7,677,592 B2 | 3/2010 | Giesler et al. |
| 7,681,412 B1 | 3/2010 | Arroyo et al. |
| D613,128 S | 4/2010 | Blakeman et al. |
| D613,560 S | 4/2010 | Robichaud et al. |
| 7,703,795 B2 | 4/2010 | Williamson et al. |
| 7,722,204 B1 | 5/2010 | Sandberg et al. |
| 7,762,363 B1 | 7/2010 | Hirschfeld et al. |
| 7,784,816 B2 | 8/2010 | Shikun et al. |
| 7,789,401 B2 | 9/2010 | Ambrefe, Jr. et al. |
| 7,798,264 B2 | 9/2010 | Hutcheson et al. |
| 7,798,886 B1 * | 9/2010 | Williamson .......... B62D 51/007 446/456 |
| 7,815,003 B2 | 10/2010 | Ferrer |
| 7,823,906 B2 | 11/2010 | Darling, III et al. |
| 7,828,306 B2 | 11/2010 | Stratton et al. |
| 7,843,431 B2 | 11/2010 | Robbins et al. |
| 7,845,440 B2 | 12/2010 | Jacobsen |
| 7,845,653 B2 | 12/2010 | Katz |
| 7,857,327 B2 | 12/2010 | Reed et al. |
| 7,860,614 B1 | 12/2010 | Reger et al. |
| 7,900,723 B2 | 3/2011 | Brazier |
| 8,002,365 B2 | 8/2011 | Jacobsen |
| 8,016,304 B2 | 9/2011 | Maratta |
| D661,451 S | 6/2012 | Armstrong, Sr. et al. |
| 8,210,304 B2 | 7/2012 | Baldwin |
| 8,327,963 B1 | 12/2012 | Faulkingham |
| 8,430,192 B2 * | 4/2013 | Gillett ................ B60K 1/04 180/65.51 |
| D685,228 S | 6/2013 | Daugherty et al. |
| 8,465,031 B2 | 6/2013 | Coghill, Jr. |
| 8,540,039 B1 | 9/2013 | Hsiao |
| D691,686 S * | 10/2013 | Yu ................ D21/765 |
| 8,573,505 B1 | 11/2013 | Hennessy |
| 8,668,039 B2 * | 3/2014 | Tuli .................... A43B 3/0005 180/180 |
| 8,672,074 B2 * | 3/2014 | Ganeous ............. A63C 17/10 180/181 |
| 8,695,994 B2 | 4/2014 | Maratta |
| D704,786 S | 5/2014 | Tang et al. |

(56) References Cited

U.S. PATENT DOCUMENTS

| | | | |
|---|---|---|---|
| 8,925,752 B2 | 1/2015 | Smith et al. | |
| 8,939,315 B2 | 1/2015 | Pillow et al. | |
| 8,991,541 B1 * | 3/2015 | Maier | A63C 5/08 |
| | | | 180/181 |
| 9,022,395 B1 | 5/2015 | Vanderberg | |
| 9,027,690 B2 * | 5/2015 | Chavand | A63C 17/12 |
| | | | 180/181 |
| D735,609 S | 8/2015 | Barckmann | |
| D738,977 S | 9/2015 | Lai et al. | |
| 9,150,235 B2 | 10/2015 | Galante et al. | |
| 9,186,570 B1 | 11/2015 | Wells et al. | |
| 9,211,901 B2 | 12/2015 | Vanderberg et al. | |
| D747,668 S | 1/2016 | Chen et al. | |
| 9,233,701 B2 | 1/2016 | Glover et al. | |
| D749,911 S | 2/2016 | Diamond et al. | |
| 9,316,428 B2 | 4/2016 | Mech et al. | |
| 9,389,010 B1 | 7/2016 | Booker, Sr. et al. | |
| 9,403,566 B2 | 8/2016 | Jacobsen et al. | |
| 9,415,786 B1 | 8/2016 | Lorrigan et al. | |
| 9,452,345 B2 * | 9/2016 | Doerksen | A63C 17/01 |
| D769,997 S | 10/2016 | Doerksen | |
| D770,585 S | 11/2016 | Desberg | |
| D779,375 S | 2/2017 | Zeng | |
| 9,598,141 B1 * | 3/2017 | Doerksen | B62M 7/12 |
| 9,616,318 B2 * | 4/2017 | Rogers | A63C 17/12 |
| 9,694,859 B2 | 7/2017 | Martel | |
| 9,849,901 B2 | 12/2017 | Jackman | |
| 9,908,032 B2 * | 3/2018 | Garcia Elena | B62M 6/65 |
| 9,919,200 B2 * | 3/2018 | Mo | A63C 17/12 |
| 9,925,453 B1 * | 3/2018 | Tuli | A43B 3/0005 |
| 9,950,243 B2 * | 4/2018 | Evans | A63C 17/015 |
| 10,071,303 B2 * | 9/2018 | Pikulski | A63C 17/12 |
| 10,112,680 B2 * | 10/2018 | Doerksen | B60K 7/0007 |
| 2001/0013358 A1 | 8/2001 | Patarra et al. | |
| 2001/0037163 A1 | 11/2001 | Allard et al. | |
| 2001/0052686 A1 | 12/2001 | Galik et al. | |
| 2001/0054433 A1 | 12/2001 | Patarra et al. | |
| 2002/0043774 A1 | 4/2002 | Chou et al. | |
| 2002/0056579 A1 | 5/2002 | Cooper | |
| 2002/0067015 A1 | 6/2002 | Tierney et al. | |
| 2002/0070517 A1 | 6/2002 | Ramsey et al. | |
| 2002/0105158 A1 | 8/2002 | Stewart et al. | |
| 2002/0128714 A1 | 9/2002 | Manasas et al. | |
| 2002/0140392 A1 | 10/2002 | Borenstein et al. | |
| 2002/0167138 A1 | 11/2002 | Butler et al. | |
| 2002/0181961 A1 | 12/2002 | Sanda et al. | |
| 2003/0000747 A1 | 1/2003 | Genroku et al. | |
| 2003/0024938 A1 | 2/2003 | Mompo et al. | |
| 2003/0038457 A1 | 2/2003 | Eskridge et al. | |
| 2003/0069474 A1 | 4/2003 | Couvillon et al. | |
| 2003/0075890 A1 | 4/2003 | Jacobs | |
| 2003/0081408 A1 | 5/2003 | Hsien et al. | |
| 2003/0097080 A1 | 5/2003 | Masayoshi et al. | |
| 2003/0110938 A1 | 6/2003 | Takeshi et al. | |
| 2003/0141688 A1 | 7/2003 | Lynn et al. | |
| 2003/0160411 A1 | 8/2003 | Turner et al. | |
| 2003/0168371 A1 | 9/2003 | Weimer et al. | |
| 2003/0177747 A1 | 9/2003 | Lundstorm et al. | |
| 2003/0197338 A1 | 10/2003 | Chen et al. | |
| 2003/0221880 A1 | 12/2003 | Stummer | |
| 2003/0223844 A1 | 12/2003 | Schiele et al. | |
| 2003/0234501 A1 | 12/2003 | Mordehai et al. | |
| 2004/0016854 A1 | 1/2004 | Hart et al. | |
| 2004/0017055 A1 | 1/2004 | Panasewicz et al. | |
| 2004/0030571 A1 | 2/2004 | Solomon et al. | |
| 2004/0045314 A1 | 3/2004 | Roth et al. | |
| 2004/0061294 A1 | 4/2004 | Flanigan et al. | |
| 2004/0099175 A1 | 5/2004 | Yann et al. | |
| 2004/0103740 A1 | 6/2004 | Townsend et al. | |
| 2004/0140634 A1 | 7/2004 | Chen et al. | |
| 2004/0168837 A1 | 9/2004 | Michaud et al. | |
| 2004/0216931 A1 | 11/2004 | Chikyung et al. | |
| 2004/0216932 A1 | 11/2004 | Giovanetti et al. | |
| 2004/0232637 A1 | 11/2004 | Butler et al. | |
| 2004/0232639 A1 | 11/2004 | Chiappetta et al. | |
| 2004/0239065 A1 | 12/2004 | Smith et al. | |
| 2004/0262056 A1 | 12/2004 | Ying | |
| 2004/0262181 A1 | 12/2004 | Venegas et al. | |
| 2004/0262465 A1 | 12/2004 | Tseng et al. | |
| 2005/0007055 A1 | 1/2005 | Borenstein | |
| 2005/0027412 A1 | 2/2005 | Hobson et al. | |
| 2005/0029260 A1 | 2/2005 | Hsieh et al. | |
| 2005/0029261 A1 | 2/2005 | Hsieh et al. | |
| 2005/0029911 A1 | 2/2005 | Hsieh et al. | |
| 2005/0039973 A1 | 2/2005 | Clark | |
| 2005/0045520 A1 | 3/2005 | Johnson et al. | |
| 2005/0046126 A1 | 3/2005 | Green et al. | |
| 2005/0085693 A1 | 4/2005 | Belson et al. | |
| 2005/0107669 A1 | 5/2005 | Couvillon et al. | |
| 2005/0116445 A1 | 6/2005 | Hatfull et al. | |
| 2005/0166413 A1 | 8/2005 | Crampton et al. | |
| 2005/0168068 A1 | 8/2005 | Courtemanche et al. | |
| 2005/0168070 A1 | 8/2005 | Courtemanche et al. | |
| 2005/0184479 A1 | 8/2005 | Moore et al. | |
| 2005/0225046 A1 | 10/2005 | Wilnau | |
| 2005/0225162 A1 | 10/2005 | Gibbins et al. | |
| 2005/0230936 A1 | 10/2005 | Van Horn et al. | |
| 2005/0235898 A1 | 10/2005 | Hobson | |
| 2005/0235899 A1 | 10/2005 | Yamamoto | |
| 2005/0252234 A1 | 11/2005 | Ik-Sub et al. | |
| 2005/0268622 A1 | 12/2005 | Krieger | |
| 2005/0288819 A1 | 12/2005 | De Guzman et al. | |
| 2006/0000137 A1 | 1/2006 | Alvarado et al. | |
| 2006/0005733 A1 | 1/2006 | Rastegar et al. | |
| 2006/0010702 A1 | 1/2006 | Roth et al. | |
| 2006/0012141 A1 | 1/2006 | Bouvet | |
| 2006/0017243 A1 | 1/2006 | Bludworth | |
| 2006/0017245 A1 | 1/2006 | Bruns et al. | |
| 2006/0048532 A1 | 3/2006 | Beal et al. | |
| 2006/0048534 A1 | 3/2006 | Beal et al. | |
| 2006/0049595 A1 | 3/2006 | Crigler et al. | |
| 2006/0053363 A1 | 3/2006 | Bargh et al. | |
| 2006/0070775 A1 | 4/2006 | Anhalt et al. | |
| 2006/0071435 A1 | 4/2006 | Zwack et al. | |
| 2006/0237924 A1 | 10/2006 | Vanderberg et al. | |
| 2006/0237928 A1 | 10/2006 | Vanderburg et al. | |
| 2006/0279947 A1 | 12/2006 | Henley et al. | |
| 2007/0023439 A1 | 2/2007 | Vaughn | |
| 2007/0029117 A1 | 2/2007 | Goldenberg et al. | |
| 2007/0056106 A1 | 3/2007 | Roberts et al. | |
| 2007/0101754 A1 | 3/2007 | Maldonado et al. | |
| 2007/0103895 A1 | 5/2007 | Riesebosch et al. | |
| 2007/0114743 A1 | 5/2007 | Chen et al. | |
| 2007/0156286 A1 | 7/2007 | Yamauchi | |
| 2007/0170666 A1 | 7/2007 | Chen et al. | |
| 2007/0193790 A1 | 8/2007 | Goldenberg et al. | |
| 2007/0206372 A1 | 9/2007 | Casillas et al. | |
| 2007/0216116 A1 | 9/2007 | Gallea et al. | |
| 2007/0260378 A1 | 11/2007 | Clodfelter et al. | |
| 2007/0272465 A1 | 11/2007 | Su | |
| 2007/0273114 A1 | 11/2007 | Katz | |
| 2007/0273118 A1 | 11/2007 | Conrad | |
| 2007/0289786 A1 | 12/2007 | Cutkosky et al. | |
| 2008/0001373 A1 | 1/2008 | Vaughn | |
| 2008/0011760 A1 | 1/2008 | Bruns et al. | |
| 2008/0054149 A1 | 3/2008 | Freebairn et al. | |
| 2008/0110892 A1 | 5/2008 | House et al. | |
| 2008/0115687 A1 | 5/2008 | Gal | |
| 2008/0164079 A1 | 7/2008 | Jacobsen et al. | |
| 2008/0167662 A1 | 7/2008 | Kurtz et al. | |
| 2008/0167752 A1 | 7/2008 | Jacobsen et al. | |
| 2008/0168070 A1 | 7/2008 | Naphade et al. | |
| 2008/0170388 A1 | 7/2008 | Greil et al. | |
| 2008/0179847 A1 | 7/2008 | Defrancia et al. | |
| 2008/0192569 A1 | 8/2008 | Ray et al. | |
| 2008/0215185 A1 | 9/2008 | Jacobsen et al. | |
| 2008/0217993 A1 | 9/2008 | Jacobsen et al. | |
| 2008/0272647 A9 | 11/2008 | Hirose | |
| 2008/0281231 A1 | 11/2008 | Jacobsen et al. | |
| 2008/0281468 A1 | 11/2008 | Jacobsen et al. | |
| 2008/0284244 A1 | 11/2008 | Hirose | |
| 2009/0001756 A1 | 1/2009 | Dempsey et al. | |
| 2009/0025988 A1 | 1/2009 | Jacobsen et al. | |
| 2009/0030562 A1 | 1/2009 | Jacobsen et al. | |

(56) References Cited

U.S. PATENT DOCUMENTS

| | | |
|---|---|---|
| 2009/0035097 A1 | 2/2009 | Loane |
| 2009/0095209 A1 | 4/2009 | Jamieson |
| 2009/0132088 A1 | 5/2009 | Taitler |
| 2009/0139245 A1 | 6/2009 | Blackway et al. |
| 2009/0148267 A1 | 6/2009 | Crossley et al. |
| 2009/0171151 A1 | 7/2009 | Choset et al. |
| 2009/0212157 A1 | 8/2009 | Arlton et al. |
| 2009/0217699 A1 | 9/2009 | Ball et al. |
| 2009/0236810 A1 | 9/2009 | Anderson et al. |
| 2009/0248202 A1 | 10/2009 | Osuka et al. |
| 2009/0250891 A1 | 10/2009 | Stratton et al. |
| 2009/0260159 A1 | 10/2009 | Buchanan |
| 2009/0273150 A1 | 11/2009 | Kortschot et al. |
| 2010/0030377 A1 | 2/2010 | Unsworth |
| 2010/0036544 A1 | 2/2010 | Mashiach |
| 2010/0066057 A1 | 3/2010 | Shikun et al. |
| 2010/0102524 A1 | 4/2010 | Larsen et al. |
| 2010/0117317 A1 | 5/2010 | Smith et al. |
| 2010/0126196 A1 | 5/2010 | McCane |
| 2010/0140886 A1 | 6/2010 | Gorisch et al. |
| 2010/0147015 A1 | 6/2010 | Vanderberg et al. |
| 2010/0154456 A1 | 6/2010 | Wilkins |
| 2010/0155349 A1 | 6/2010 | Murphy et al. |
| 2010/0174422 A1 | 7/2010 | Jacobsen et al. |
| 2010/0201185 A1 | 8/2010 | Jacobsen et al. |
| 2010/0201187 A1 | 8/2010 | Jacobsen et al. |
| 2010/0223759 A1 | 9/2010 | Baik et al. |
| 2010/0228548 A1 | 9/2010 | Liu et al. |
| 2010/0237599 A1 | 9/2010 | Bianchi |
| 2010/0242520 A1 | 9/2010 | Weir et al. |
| 2010/0258365 A1 | 10/2010 | Jacobsen et al. |
| 2010/0268470 A1 | 10/2010 | Kamal et al. |
| 2010/0314856 A1 | 12/2010 | Katz |
| 2010/0317244 A1 | 12/2010 | Jacobsen et al. |
| 2010/0318242 A1 | 12/2010 | Jacobsen et al. |
| 2011/0006497 A1 | 1/2011 | Chen et al. |
| 2011/0006505 A1 | 1/2011 | Wang et al. |
| 2011/0042391 A1 | 2/2011 | Vanderberg et al. |
| 2011/0042392 A1 | 2/2011 | Vanderberg et al. |
| 2011/0042393 A1 | 2/2011 | Vanderberg et al. |
| 2011/0042394 A1 | 2/2011 | Vanderberg et al. |
| 2011/0042395 A1 | 2/2011 | Vanderberg et al. |
| 2011/0042396 A1 | 2/2011 | Vanderberg et al. |
| 2011/0042398 A1 | 2/2011 | Vanderberg et al. |
| 2011/0056230 A1 | 3/2011 | Blakeman et al. |
| 2011/0056233 A1 | 3/2011 | Flaker et al. |
| 2011/0079972 A1 | 4/2011 | Watson et al. |
| 2011/0115177 A1 | 5/2011 | De Sousa et al. |
| 2011/0120828 A1 | 5/2011 | King |
| 2011/0133420 A1 | 6/2011 | Smith et al. |
| 2011/0186458 A1 | 8/2011 | Schiessl et al. |
| 2011/0197625 A1 | 8/2011 | Urban et al. |
| 2011/0226003 A1 | 9/2011 | Chaney et al. |
| 2011/0226785 A1 | 9/2011 | Sakell et al. |
| 2011/0239525 A1 | 10/2011 | Morales et al. |
| 2011/0259278 A1 | 10/2011 | Collingham et al. |
| 2011/0301785 A1 | 12/2011 | Sword et al. |
| 2012/0013091 A1 | 1/2012 | Giese et al. |
| 2012/0072019 A1 | 3/2012 | Sanders et al. |
| 2012/0185095 A1 | 7/2012 | Rosenstein et al. |
| 2012/0193881 A1 | 8/2012 | Svärdby |
| 2012/0205168 A1 | 8/2012 | Flynn et al. |
| 2012/0273505 A1 | 11/2012 | Bose et al. |
| 2012/0277914 A1 | 11/2012 | Crow et al. |
| 2012/0292120 A1 | 11/2012 | Pinhas |
| 2013/0033854 A1 | 2/2013 | Statham et al. |
| 2013/0054021 A1 | 2/2013 | Murai et al. |
| 2013/0214501 A1 | 8/2013 | Vanderberg et al. |
| 2013/0238231 A1 | 9/2013 | Chen |
| 2013/0285337 A1 | 10/2013 | Palagyi et al. |
| 2014/0014669 A1 | 1/2014 | Smith et al. |
| 2014/0042797 A1 | 2/2014 | Pillow et al. |
| 2014/0043837 A1 | 2/2014 | Michaud et al. |
| 2014/0062042 A1 | 3/2014 | Wagner et al. |
| 2014/0121835 A1 | 5/2014 | Smith et al. |
| 2014/0246257 A1 | 9/2014 | Jacobsen et al. |
| 2014/0312044 A1 | 10/2014 | Pillow et al. |
| 2015/0084291 A1 | 3/2015 | Yoder et al. |
| 2015/0127150 A1 | 5/2015 | Ponulak et al. |
| 2015/0127155 A1 | 5/2015 | Passot et al. |
| 2015/0225006 A1 | 8/2015 | Thiel et al. |
| 2015/0241107 A1 | 8/2015 | Mech et al. |
| 2016/0023349 A1 | 1/2016 | Hoppe et al. |
| 2016/0107070 A1 | 4/2016 | Middleton |
| 2016/0129963 A1* | 5/2016 | Ying .................... B62D 51/001 180/6.5 |
| 2016/0136508 A1 | 5/2016 | Bigler |
| 2016/0144267 A1 | 5/2016 | Huang |
| 2016/0214633 A1 | 7/2016 | Kincaid et al. |
| 2016/0242518 A1 | 8/2016 | Kennedy et al. |

FOREIGN PATENT DOCUMENTS

| | | |
|---|---|---|
| CN | 1603068 A | 4/2005 |
| CN | 1970373 A | 5/2007 |
| CN | 100556483 C | 11/2009 |
| CN | 101583820 B | 5/2011 |
| CN | 103463806 A | 12/2013 |
| CN | 103847826 A | 6/2014 |
| DE | 3025840 C2 | 8/1983 |
| DE | 3626238 A1 | 2/1988 |
| DE | 3626328 A1 | 2/1988 |
| DE | 19617852 A1 | 10/1997 |
| DE | 10018075 A1 | 1/2001 |
| DE | 102004010089 A1 | 9/2005 |
| EP | 0105418 B1 | 6/1987 |
| EP | 0558776 A1 | 9/1993 |
| EP | 0924034 A3 | 4/2004 |
| EP | 1510896 B1 | 3/2005 |
| EP | 1679101 A1 | 7/2006 |
| EP | 1832501 B1 | 9/2007 |
| EP | 2444006 A2 | 4/2012 |
| EP | 2549165 A1 | 1/2013 |
| FR | 2609335 A1 | 1/1988 |
| FR | 2638813 | 2/1991 |
| FR | 2660730 B1 | 11/1992 |
| FR | 2846931 A1 | 5/2004 |
| JP | S5257625 | 5/1977 |
| JP | S5889480 | 5/1983 |
| JP | S6015275 | 1/1985 |
| JP | S6047771 | 3/1985 |
| JP | S60139546 | 7/1985 |
| JP | S611581 | 1/1986 |
| JP | S63306988 | 12/1988 |
| JP | 2001010560 | 1/2001 |
| JP | 2001195113 A | 7/2001 |
| JP | 2003019985 | 1/2003 |
| JP | 2003237618 | 8/2003 |
| JP | 2003315486 | 11/2003 |
| JP | 2010132238 A | 6/2010 |
| RU | 2206859 C1 | 6/2003 |
| WO | WO1989002301 A1 | 3/1989 |
| WO | WO2000035735 A1 | 6/2000 |
| WO | WO2001087435 A1 | 11/2001 |
| WO | WO2003087618 A2 | 10/2003 |
| WO | WO2004014499 A1 | 2/2004 |
| WO | WO2003072425 A3 | 4/2004 |
| WO | WO2004037358 A1 | 5/2004 |
| WO | WO2004105901 A1 | 12/2004 |
| WO | WO2006059883 A1 | 6/2006 |
| WO | WO2007046609 A1 | 4/2007 |
| WO | WO2007117092 A1 | 10/2007 |
| WO | WO2007127554 A2 | 11/2007 |
| WO | WO2008073456 A2 | 6/2008 |
| WO | WO2009134020 A2 | 11/2009 |
| WO | WO2011005180 A1 | 1/2011 |
| WO | WO2011037521 A1 | 3/2011 |
| WO | WO2011037531 A1 | 3/2011 |
| WO | WO2012083950 A1 | 6/2012 |
| WO | WO2012113011 A1 | 8/2012 |

(56) References Cited

FOREIGN PATENT DOCUMENTS

WO     WO2012165975 A1    12/2012
WO     WO2014133485 A1    9/2014

OTHER PUBLICATIONS

"Law Firm that Handles Apple Patents Claims that the Vehicle Patent Assigned to Apple was in Error" *Patently Apple*, Aug. 10, 2016. http://www.patentlyapple.com/patently-apple/2016/08/law-firm-that-handles-apple-patents-claims-the-the-vehicle-patent-assigned-to-apple-was-in-error.html.

"The Electric Skateboard Can Dominate Any Terrain" Mashable, Jul. 17, 2013, http://mashable.com/2013/07/14/scarpar/#leEiiYhwDZqb.

Office Action of U.S. Appl. No. 15/247,820; dated Jan. 10, 2018.

\* cited by examiner

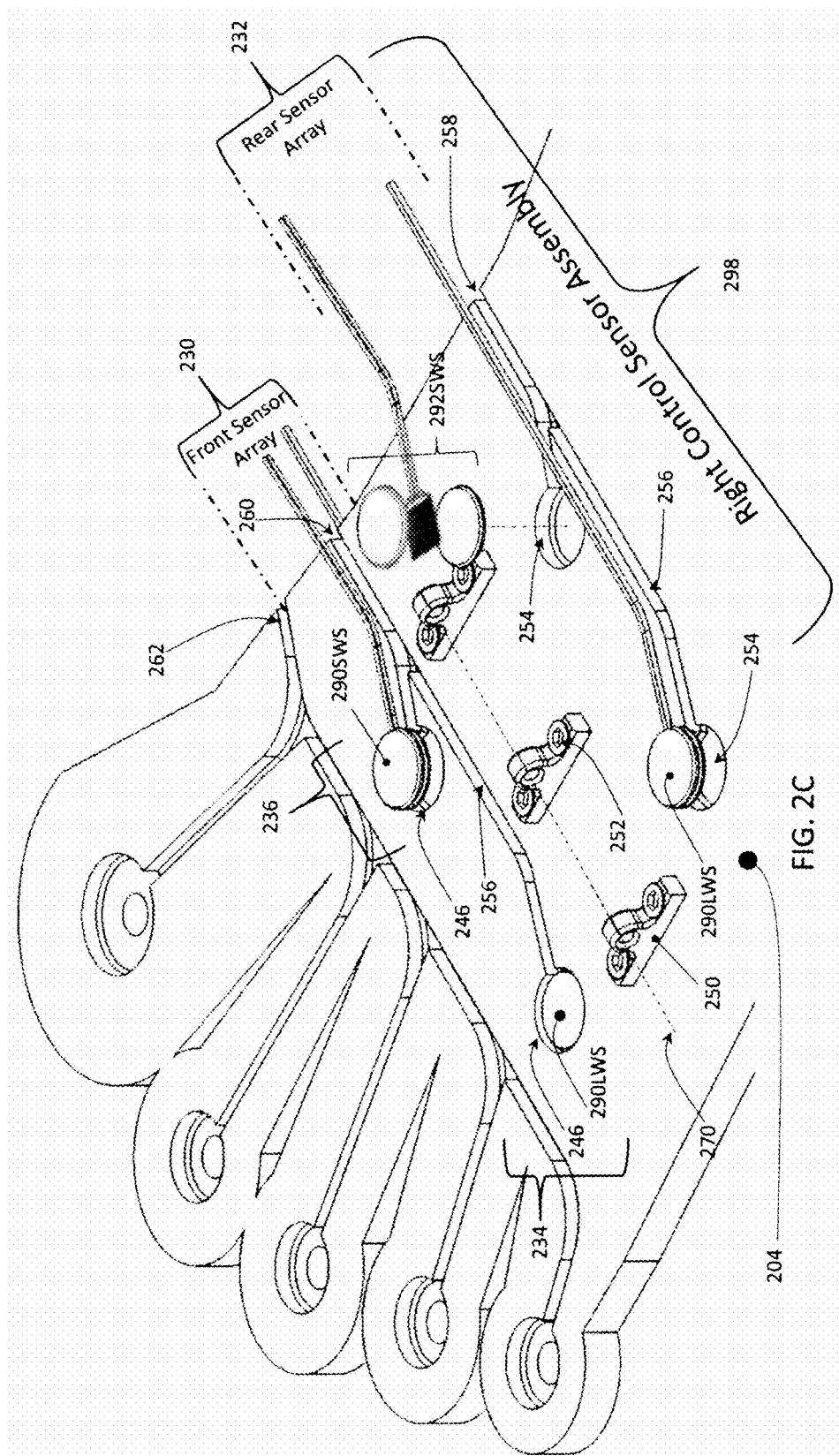

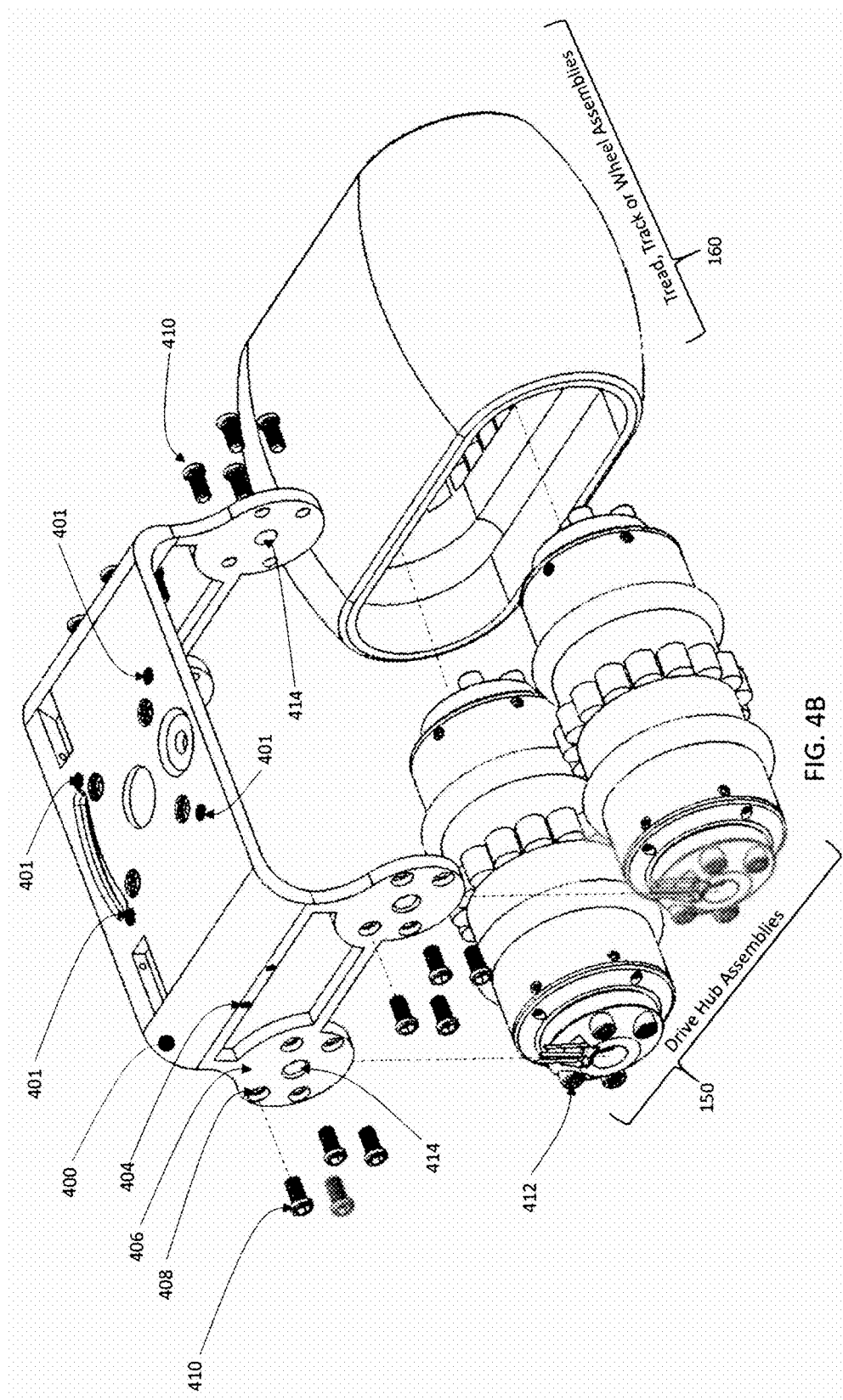

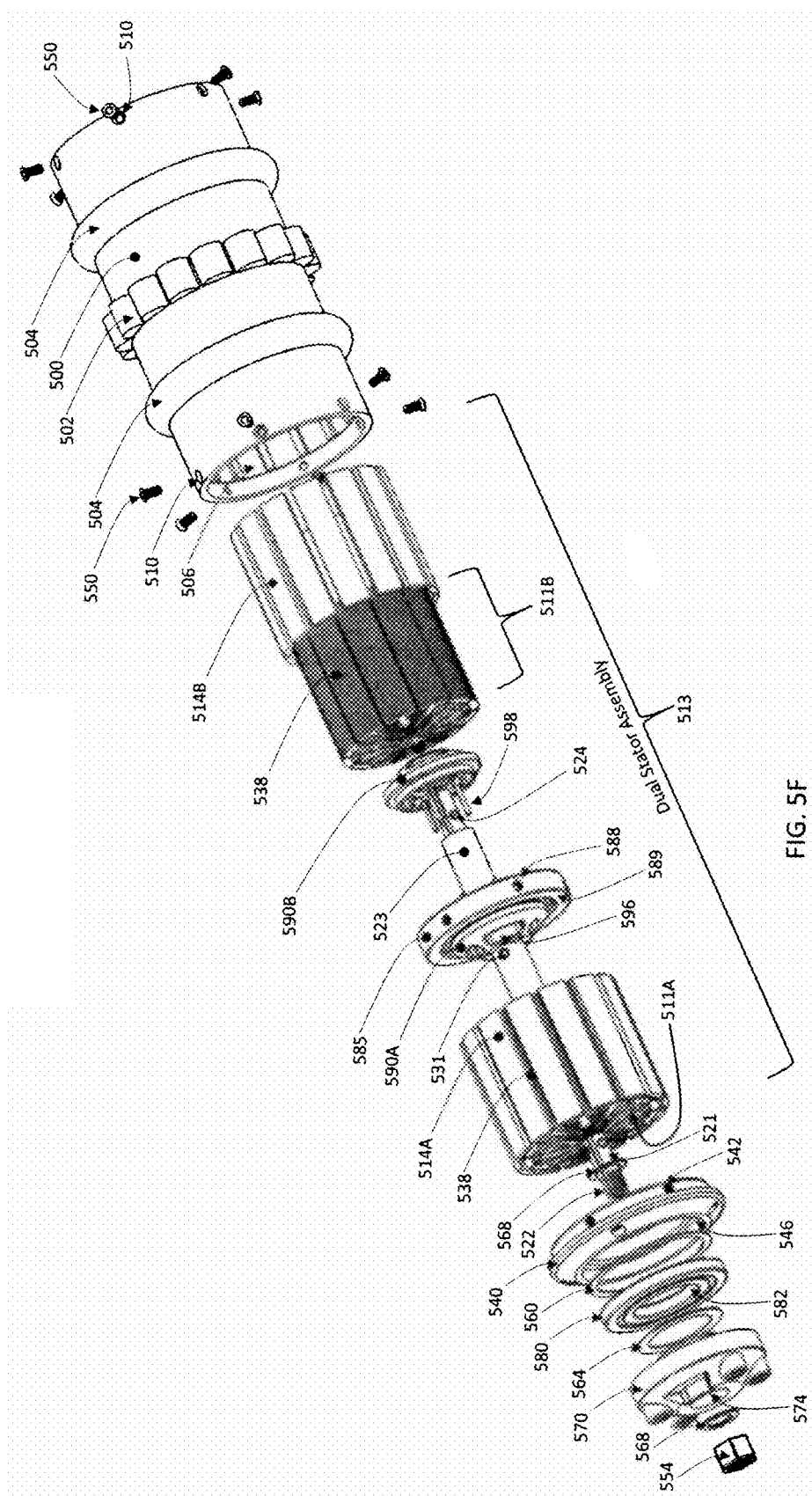

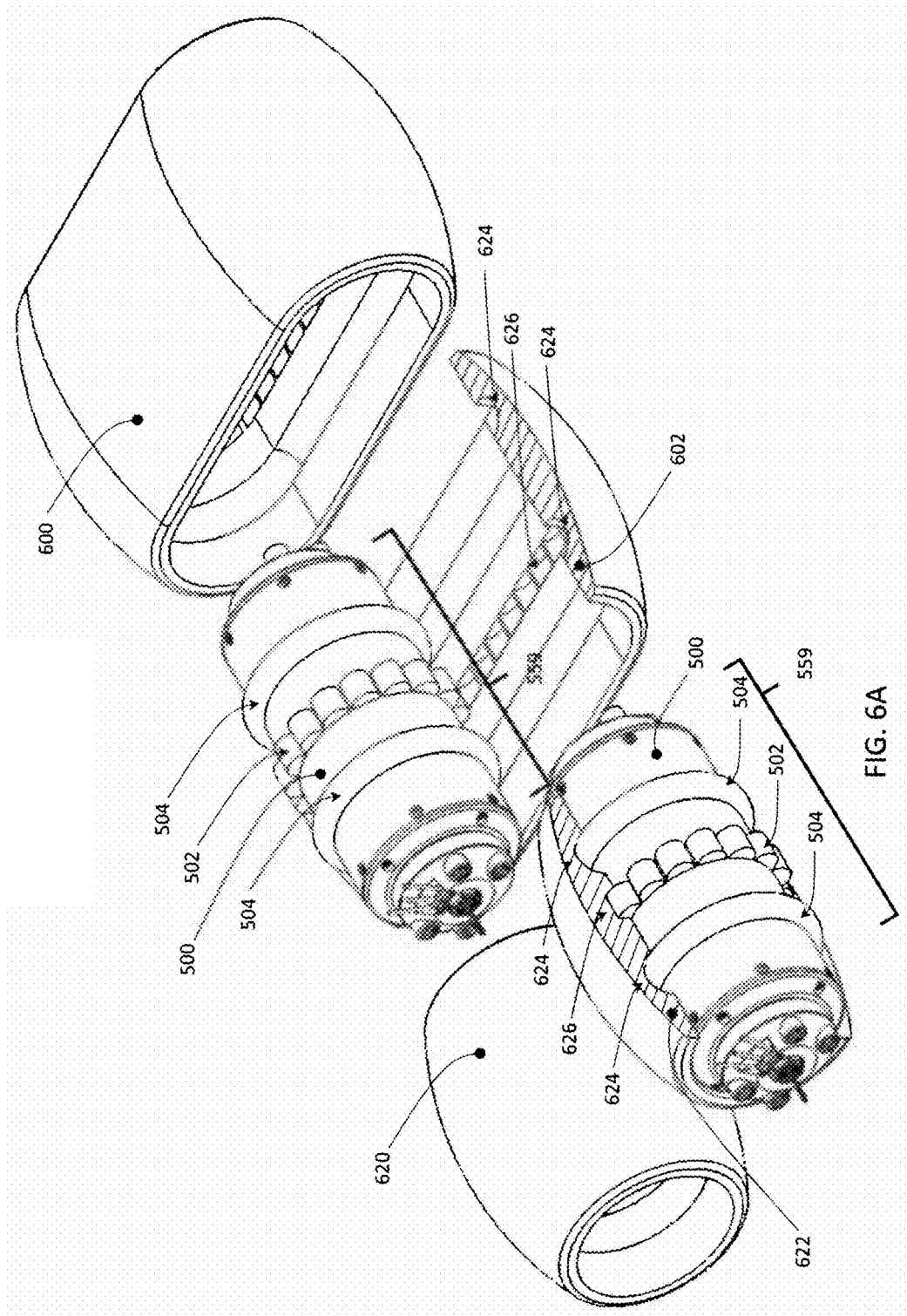

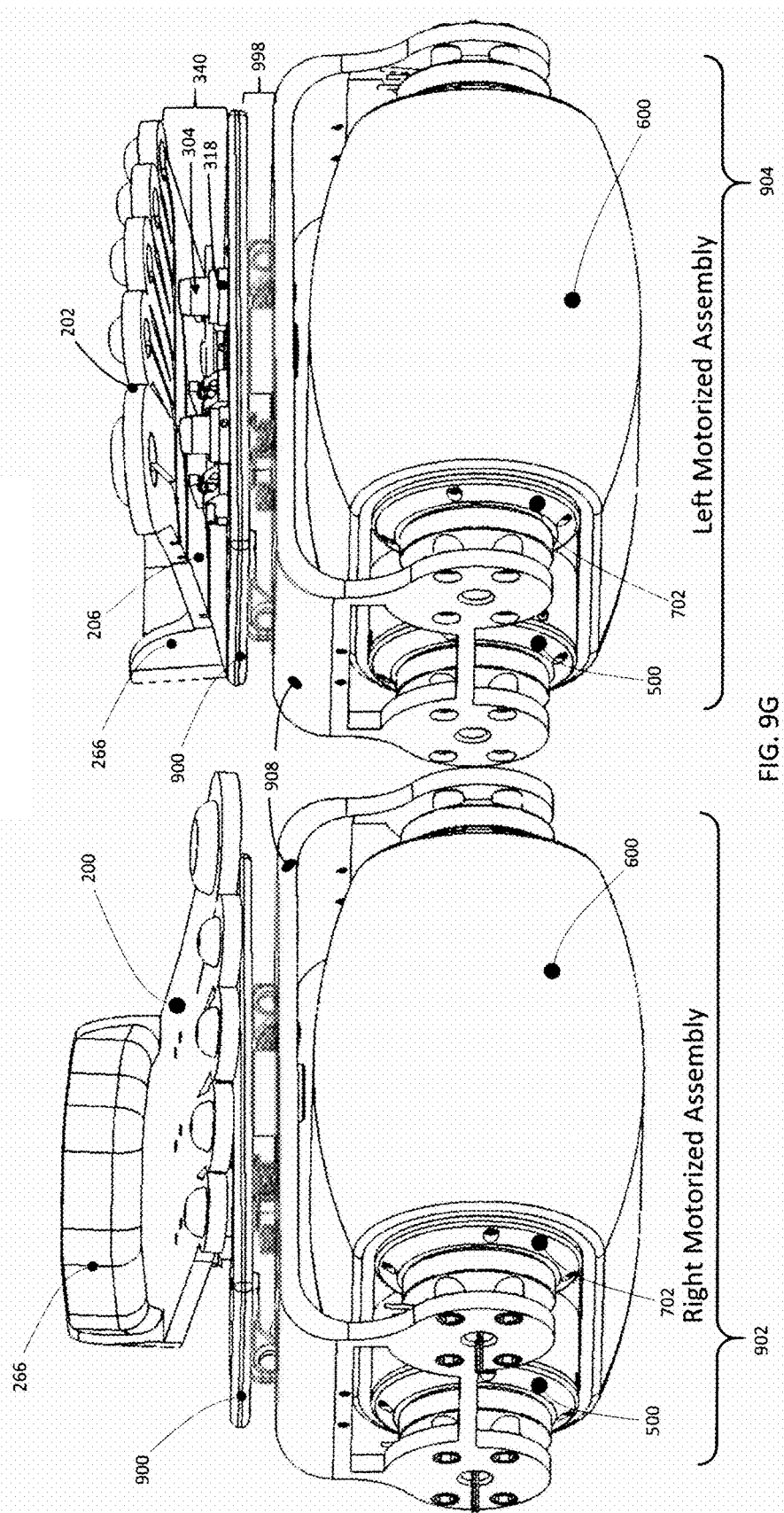

MOTORIZED PLATFORMS

CROSS REFERENCE TO RELATED APPLICATIONS

This application is a continuation-in-part of U.S. application Ser. No. 15/247,820 to Joseph L. Pikulski, entitled MOTORIZED SKATEBOARD, filed on Aug. 25, 2016, which in turn claims priority from U.S. Provisional Application Ser. No. 62/210,351, to Joseph L. Pikulski, also entitled MOTORIZED SKATEBOARD, filed on Aug. 26, 2015. This application further claims the benefit of U.S. Provisional Application Ser. No. 62/342,834 to Joseph L. Pikulski, entitled MOTORIZED PLATFORMS, filed on May 27, 2016. All of the above-listed applications are hereby incorporated herein in their entirety by reference.

BACKGROUND

Field of the Invention

This present disclosure relates to personal motorized devices having a common platform for stability with the connection of independent motorized drive assemblies, which can be treaded, tracked or wheeled.

Description of the Related Art

There are several well-known inventions of self-balancing motorized vehicles with two wheels arranged on either end of their respective axles, one being the Segway®, (14 Technology Drive, Bedford, N.H. 03110), as described in U.S. Pat. Nos. 8,830,048, 8,083,013 and another described in U.S. Pat. No. 9,045,190. All of the motorized personal devices require self-balancing mechanisms that assist the rider to maintain proper riding attitude. These self-balancing motor-controlled configurations lead to inherent stability control problems where the rider, at some point, might over compensates their leaning control attitude, which can result in the motorized platform scooting out from under the rider quickly behind them or in front of them, thereby potentially causing them to lose control or over accelerate and can leave the rider falling forwards or backwards.

In addition to the above, there is additional electronic circuitry needed in conventional two-wheel self-balancing motorized vehicle platform devices, which can rapidly deplete an associated stored power source, such as a battery. These conventional self-balancing platforms have an increase in power consumption due to the motor's counteracting or averaging of the movements of the rider. To minimize accidents that have been occurring on these self-balancing platforms, some manufactures have added a third wheel in the front to increase its stability. Due to the low profile of the current conventional self-balancing platforms, this can cause interference with moving over tall obstacles and up steep hills.

SUMMARY

Described herein are motorized platform devices and hub assemblies for use with motorized platform devices. As will be apparent through the disclosure herein, novel hub assemblies comprising motorized features are presented, with the specific variable features described herein.

In one embodiment, a motorized drive mount bracket for use with a platform comprises a mount bracket body configured to connect to a platform, at least a first drive hub assembly and a second drive hub assembly connected to the mount bracket body, at least the first drive hub assembly comprising an electrical drive hub assembly comprising a motor, and tread connected to the first drive hub assembly and the second drive hub assembly.

In another embodiment, a motorized platform comprises a mounting platform, a mount bracket body moveably connected to the mounting platform, at least a first drive hub assembly and a second drive hub assembly connected to the mount bracket body, at least the first drive hub assembly comprising an electrical drive hub assembly comprising a motor, and tread connected to the first drive hub assembly and the second drive hub assembly.

In yet another embodiment, a motorized platform comprises a mounting platform, a mount bracket body moveably connected to the mounting platform, at least a first drive hub assembly and a second drive hub assembly connected to the mount bracket body, at least the first drive hub assembly comprising an electrical drive hub assembly comprising a motor, a suspension assembly between the mounting platform and the mount bracket body, one or more sensors between the mounting platform and the mount bracket body configured to detect motion of the mounting platform, and tread connected to the first drive hub assembly and the second drive hub assembly.

These and other further features and advantages of the invention would be apparent to those skilled in the art from the following detailed description, taken together with the accompanying drawings, wherein like numerals designate corresponding parts in the figures, in which:

BRIEF DESCRIPTION OF THE DRAWINGS

FIG. 2C is an off-axis view of the bottom of the right foot controller showing the fully assembled sensor properly seated in its respective sensor recesses;

FIG. 4B is an isometric view that shows the relationship of the right drive mounting bracket and the components that are attached to it. There are some features that are not identified on the top of the right drive mounting bracket, but are described when other components are introduced;

FIG. 5F is an exploded isometric view of a dual motor assembly or a dual stator assembly that is inserted into the motor hub or drive hub and the other components used to secure the assembly;

FIG. 5I is a fully assembled brushless DC motor drive assembly, which is referred to as the motor drive assembly in future drawings, and shows the methods of egress or ingress for the electrical wires required for controlling the brushless DC motor;

FIG. 6A is an isometric view of a tread and the cross section of the tread. Also shown is an isometric view of a wheel and the cross-section of that wheel, how they are mated to the motor drive hub, the engagement of the internal features of the tread, and the wheel matching to the external features of the motor drive hub;

FIG. 9G is an off-axis end view of the two separate motorized assemblies, the right motorized assembly, the left motorized assembly, and the fully implemented configuration;

FIG. 9I is a side view of the right motorized assembly with the tread pressure roller being lowered in the direction of the arrow indicating the deformation point to create a tread riding vertex;

DETAILED DESCRIPTION

Figure 1A:
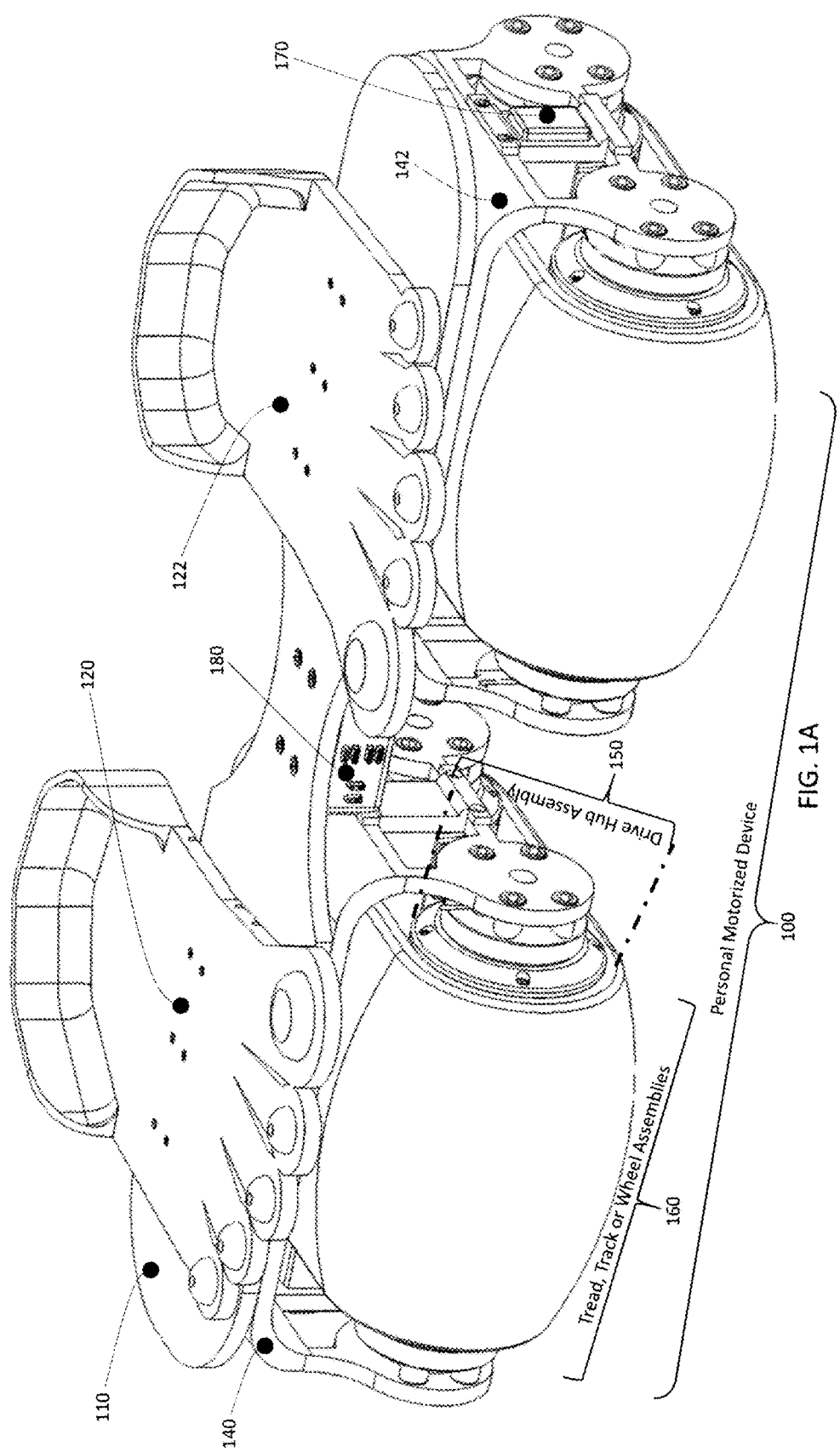
FIG. 1A is an elevated off-axis view of a personal motorized device showing the perspective relationship of the components.

In the following detailed description, numerous specific details are set forth in order to provide a more thorough understanding of embodiments incorporating features of the present invention. However, it will be apparent to one skilled in the art that the present invention can be practiced without necessarily being limited to these specifically recited details. In other instances, well-known structures and devices are shown in block diagram form, rather than in detail, in order to better describe embodiments incorporating features of the present invention.

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Throughout this description, the preferred embodiment and examples illustrated should be considered as exemplars, rather than as limitations on the present invention. As used herein, the term "invention," "device," "present invention," or "present device" refers to any one of the embodiments of the invention described herein, and any equivalents. Furthermore, reference to various feature(s) of the "invention," "device," "present invention," or "present device" throughout this document does not mean that all claimed embodiments or methods must include the referenced feature(s).

Furthermore, any element in a claim that does not explicitly state "means for" performing a specified function, or "step for" performing a specific function, is not to be interpreted as a "means" or "step" clause as specified in 35 U.S.C. § 112, for example, in 35 U.S.C. § 112(f) or pre-AIA 35 U.S.C. § 112, sixth paragraph. In particular, the use of "step of" or "act of" in the claims herein is not intended to invoke the provisions of 35 U.S.C. § 112.

It is also understood that when an element or feature is referred to as being "on" or "adjacent" to another element or feature, it can be directly on or adjacent the other element or feature or intervening elements or features may also be present. It is also understood that when an element is referred to as being "attached," "connected" or "coupled" to another element, it can be directly attached, connected or coupled to the other element or intervening elements may be present. In contrast, when an element is referred to as being "directly attached," "directly connected" or "directly coupled" to another element, there are no intervening elements present. For example, if an upper support component is said to be connected to a lower support component, which in turn is said to be connected to a base component, it is also correct to say that the upper support component is connected to the base component (through the intervening connection of the lower support component). Furthermore, the upper support component in the previous example would not be "directly" connected to the base component, but would be "directly" connected to the lower support component.

Please note, if used, relative terms such as "left," "right," "front," "back," "top," "bottom," "forward," "reverse," "clockwise," "counter clockwise" "outer," "above," "upper," "lower," "below," "horizontal," "vertical" and similar terms, have been used for convenience purposes only and are not intended to imply any particular fixed direction. Instead, they are used to reflect relative locations and/or directions between various portions of an object.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present invention.

The terminology used herein is for describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," when used herein, specify the presence of stated features, integers, steps, operations, elements, and/or components, but do not preclude the presence or addition of one or more other features, integers, steps, operations, elements, components, and/or groups thereof.

Embodiments of the invention are described herein with reference to different views and illustrations that are schematic illustrations of idealized embodiments of the invention. As such, variations from the shapes of the illustrations as a result, for example, of manufacturing techniques and/or tolerances are expected. Embodiments of the invention should not be construed as limited to the particular shapes of the regions illustrated herein, but are to include deviations in shapes that result, for example, from manufacturing.

It is understood that when a first element is referred to as being "between," "sandwiched," or "sandwiched between" two or more other elements, the first element can be directly between the two or more other elements or intervening elements may also be present between the two or more other elements. For example, if a first element is "between" or "sandwiched between" a second and third element, the first element can be directly between the second and third elements with no intervening elements or the first element can be adjacent to one or more additional elements with the first element and these additional elements all between the second and third elements.

The present invention is exemplified by multiple principle configurations. The first of these is shown in FIG. 1A, which is an elevated off-axis view of a personal motorized device 100 comprising a base platform 110, with a right mounting platform 120, and a left mounting platform 122, resembling feet or foot prints to show the orientation of motion with the proper foot placement. It is understood that while the mounting platforms 120, 122 themselves can resemble feet or footprints, the disclosed appearance of feet and footprint shapes as used herein is utilized to better show orientation of motion of devices incorporating features of the present invention, and that the mounting platforms 120, 122 can comprise any shape suitable for their function as a mounting platform for a user to place or otherwise position his or her feet. As a non-exhaustive list, the shape of mounting platforms 120, 122 can comprise any shape that is similar to a regular or irregular polygonal shape, or can resemble a simulacrum of a real world object, for example, appearing as a miniature skateboard or surfboard base, or can resemble a fictional object, for example, the face of a popular cartoon character.

The mounting platforms 120, 122 can comprise or otherwise be integrated with, mounted on or connected to at least one base platform 110. The base platform 110 can comprise or be connected to a right drive-mounting platform 140 at a first position, for example, a first end of the base platform 110. In some embodiments, the right drive-mounting platform 140 can be connected to an underside of the right drive mounting platform 140 opposite the mounting platforms 120, 122 as shown in FIG. 1A. Correspondingly, the base platform 110 can comprise or be connected to a left drive mounting platform 142 at another position, for example an opposite end of the base platform as the right drive-mounting platform 140. The right drive mounting platform 140 and the left drive mounting platform 142 can provide the frame for securing one or more drive hub assemblies 150 (one shown connected to each drive mounting platform 140, 142 in FIG. 1A) at each location. Along with the drive hub assemblies 150, a tread, track, or wheel hub assembly 160 (conveyance-structure assembly 160) can be mounted onto the drive hub assemblies 150 for the appropriate riding surfaces.

Also shown in FIG. 1A are potential additional features, for example, a motor controller and/or battery charger 180, and an auxiliary battery charger and motor controller box 170. The a motor controller and/or battery charger 180 and an auxiliary battery charger and motor controller box 170 can comprise any known motor controller and/or battery charger 180 and an auxiliary battery charger and motor controller box 170 can be communicatively connected to the motor assembly 150 in order to drive the motor assembly 150.

Figure 1B:
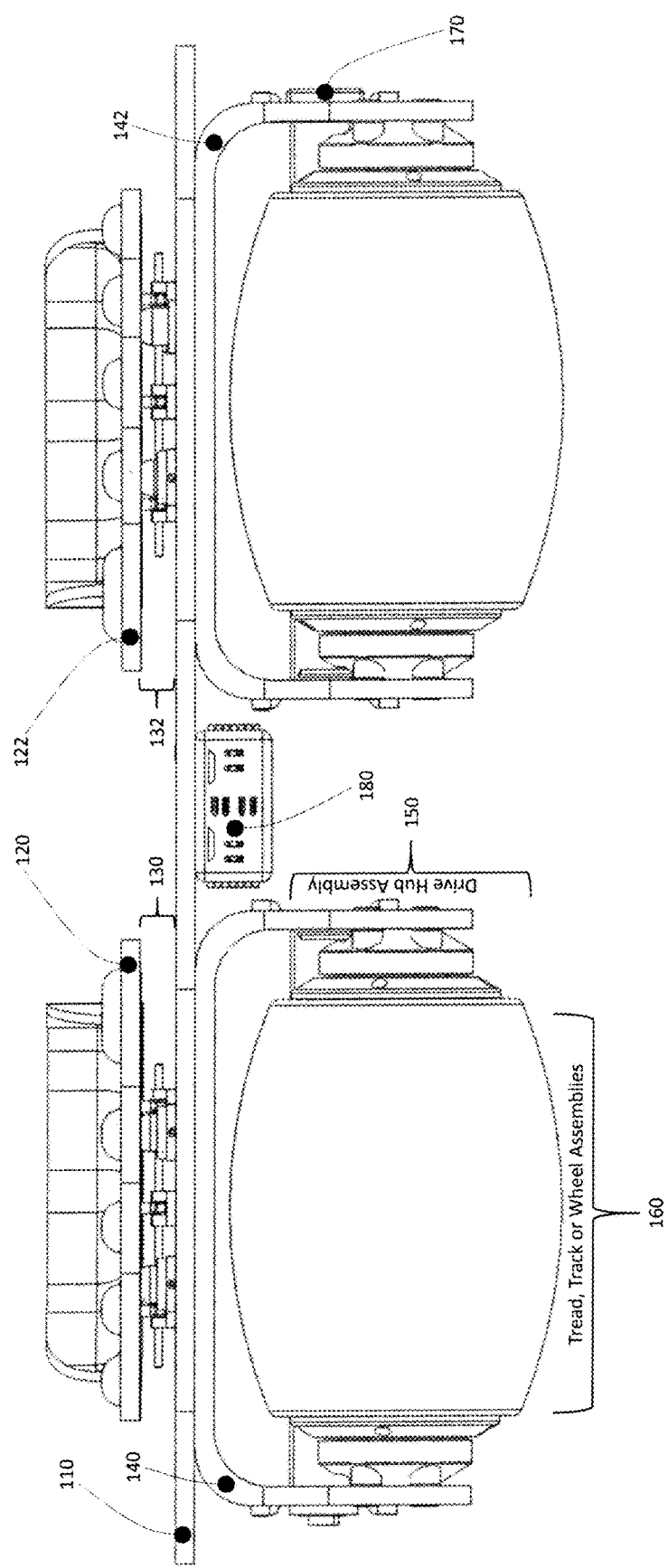
FIG. 1B is a head-on view of a personal motorized device showing the support structure, suspension assembly, right mounting platform, left mounting platform, the battery charger and motor controller, an auxiliary battery storage compartment, an auxiliary battery charger and motion controller and the front end view of the tread, track or wheel assemblies in their relationship to the drive hub assemblies.

A head on view shows the simplicity of the personal motorized device 100. FIG. 1B is a head-on view of the personal motorized device 100 showing a support structure, which is referred to as a suspension assembly. Each mounting platform 120, 122 can comprise or be connected to its own individual suspension assembly 130 (as shown in FIG. 1B) or can be connected to the same suspension assembly. FIG. 1B shows the right mounting platform 120 being connected to a right suspension assembly 130 and the left mounting platform 122 being connected to a left suspension assembly. This head-on view of the base platform 110 is a perspective view showing example aspect ratio relationship of components that can be mounted to the right drive mounting platform 140, as well as, the left drive-mounting platform 142. FIG. 1B further shows an example orientation of the battery charger and motor controller 180 along with the auxiliary battery charger and motor controller box 170. FIG. 1B illustrates an example relationship of the conveyance-structure assembly 160 as it is oriented to the drive hub assembly 150 and attached to both the right drive-mounting platform 140 and the left drive-mounting platform 142.

Figure 1C:
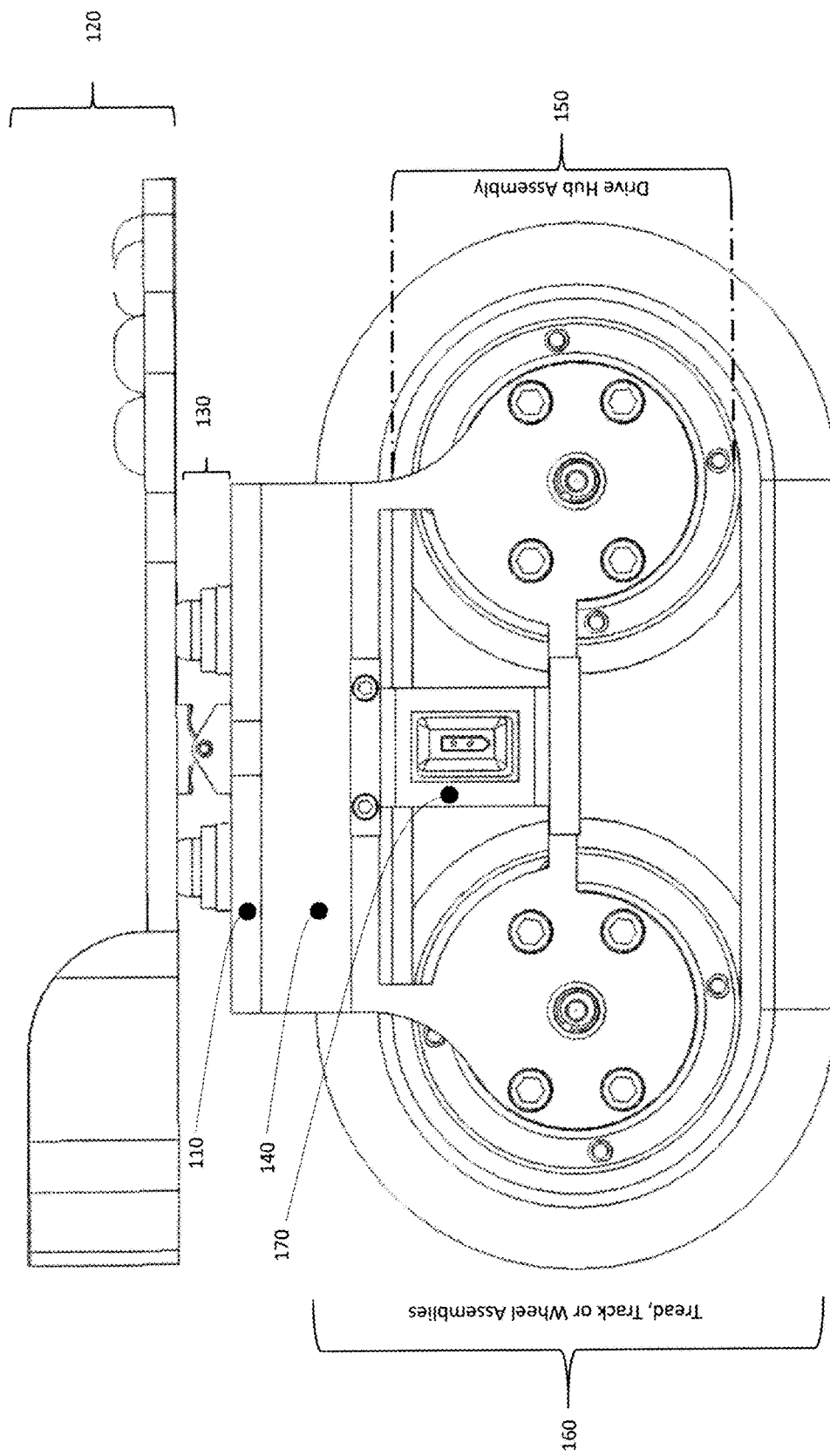
FIG. 1C is a side view of the personal motorized device showing a perspective with regard to the tread, track, and wheel assembly, the mounting platforms, drive hub assemblies, and the suspension assemblies for interfacing the mounting platform to the drive mounting platforms.

FIG. 1C is a side view of the motorized personal mobile device 100 setting forth an example orientation of the conveyance-structure assembly 160, which can be connected to or integrated with the drive hub assembly 150. This view shows the right mounting platform 120 mounted atop, which can also be otherwise connected to or integrated with, the right suspension assembly 130 that can be connected to or integrated with the base platform 110, which can be connected to or integrated with the right drive-mounting platform 140. The auxiliary battery charger and motor controller box 170 can be connected to or integrated with on the side of the right drive-mounting platform 140. All of these components in FIG. 1C can be mirror images of the left drive-mounting platform 142.

Figure 2A:
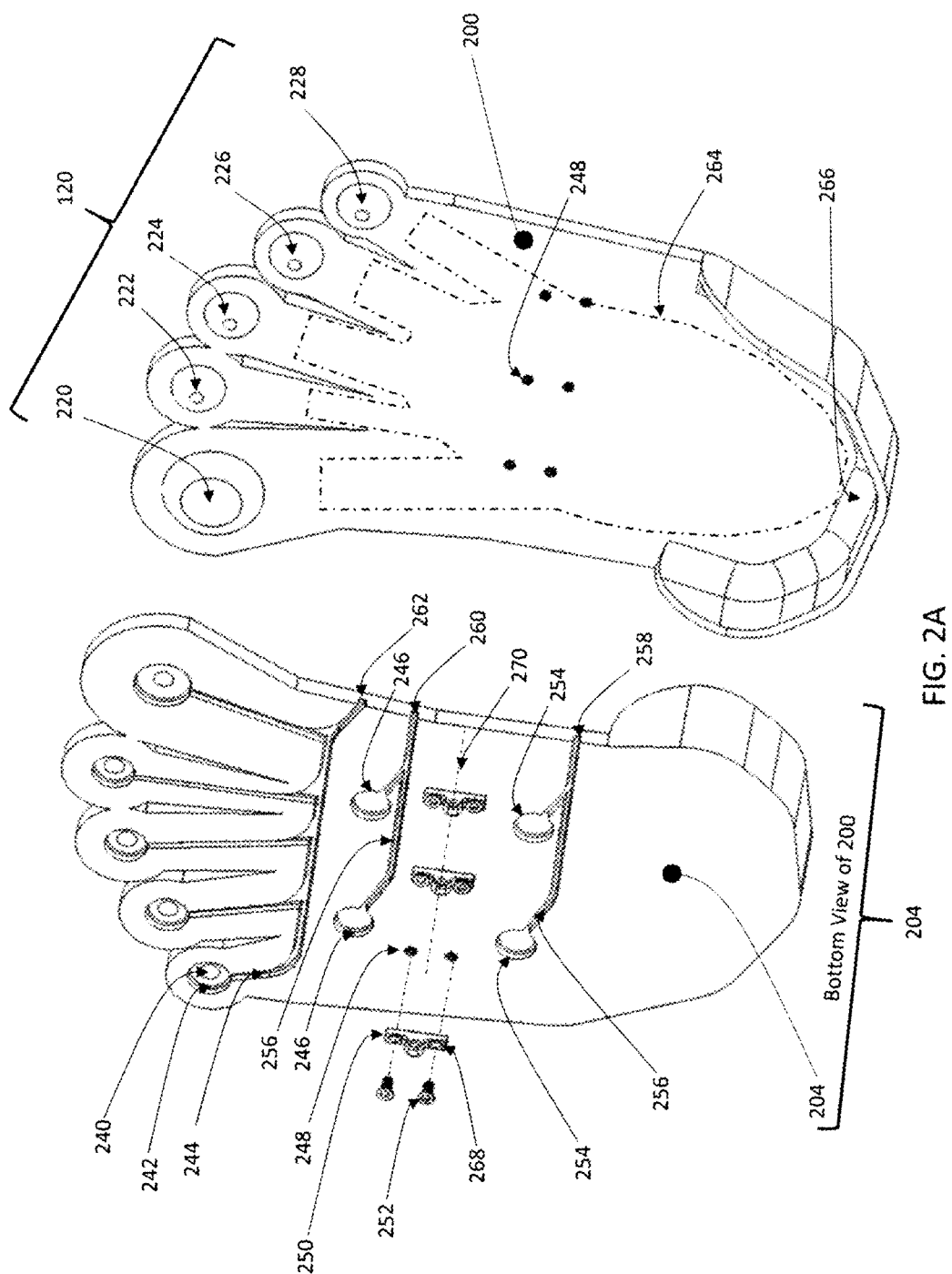
FIG. 2A is an off-axis view of the top right foot platform and the bottom side of the right foot platform. The top features of the right foot platform are noted; the light emitting diode battery indicator lights on the top surface and the bottom surface show the sensor wells.

Functional simplicity is incorporated into the design of the current invention. For example, FIG. 2A is an off-axis view of a top right foot platform 200 (which can be similar to the base platform 120 discussed herein with regard to FIG. 1A, FIG. 1B, and FIG. 1C), and a comparative bottom view 205 of the bottom 204 of the right foot control platform 200. The features of the right foot control platform 200 can resemble the foot toes and are designated as a big toe 220, a toe number two 222, a toe number three 224, a toe number four 226 and a little toe 228. These toe-like features can comprise lenses formed onto the top of the right foot platform 200.

The bottom view 205 of the bottom right foot control platform 204 shows that these toe-like features can comprise a through-hole 240 for mounting additional feature, for example, electronic features such as light emitting diodes (LEDS; not shown). A countersunk recess 242 can be used to secure the hardware and wires for such electronic features (not shown). A wire channel 244 can be formed into the bottom right foot control platform 204 of the bottom right foot control platform 204 to allow for the routing of the light emitting diode wires (not shown). A sensor-mounting recess 246 can be formed into the bottom right foot control platform 204 as described in the bottom view 205. There can be multiple sensor-mounting recesses 246 (two shown), which can be offset from a sensor wire channel 256. A sensor mounting recess 254 can be formed alongside and introduced into the wire channel 256.

An array of two or more minor hinge knuckle bodies 250 (three shown) can be fastened to the bottom right foot control platform 204 described in the bottom view 205. The minor hinge knuckle bodies 250 can be connected to a fastener 252 that can pass through a minor hinged knuckle through-hole 268 and be secured into or otherwise connected to or integrated with a faster threaded hole 248. A common axis of rotation of these minor hinge knuckles 250 is a dashed line indicating an axis of rotation 270. The bottom view 205 of the bottom right foot platform 204 can comprise wire channel exits (three shown), a light emitting diode wire channel exit 262, a front sensor wire channel exit 260, and a rear sensor wire channel exit 258. For the security of the rider, there can be a heel backstop 266 and a deck tape 264 outlined similar to that of a footprint, as seen as a dashed line 264, on the top side of the right foot control platform 200, for gripping and control purposes.

It is understood that the foot platform 200 can comprise the shape of a foot or can be interpreted schematically and actually comprise the shape of any other suitable object, such as those described earlier herein with regard to the mounting platforms 120, 122 in FIG. 1A above.

Figure 2B:
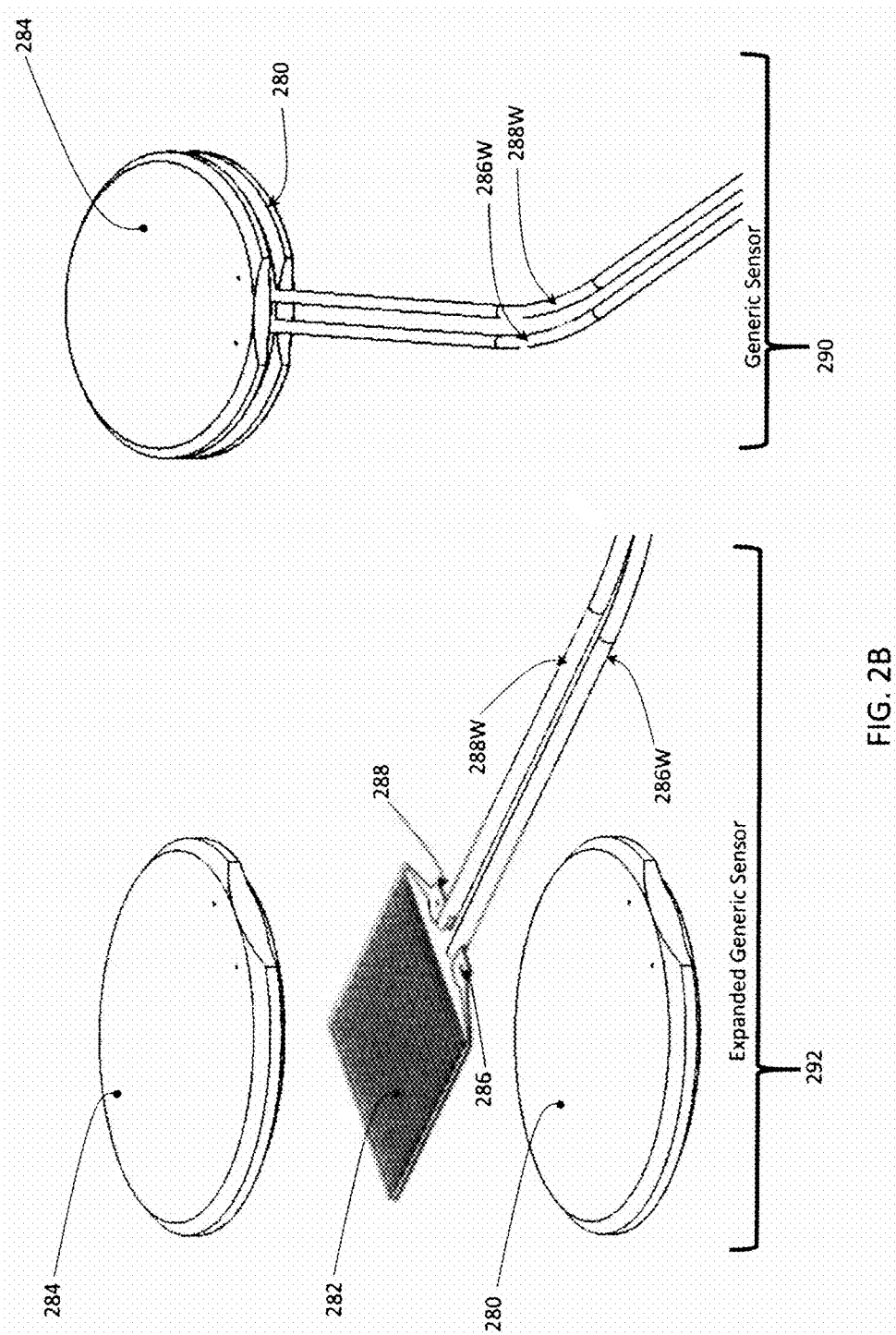
FIG. 2B is a view of the generic sensor and an exploded view of the generic sensor along with the positive and negative electrodes and wire connections.

Many commercially available sensors are considered for incorporation into a control system for the current invention. An example, the Round Force-Sensitive Resistor, Model 402 FSR, from Interlink Electronics, Inc., (31248 Oak Crest Drive, Ste. 110, Westlake Village, Calif. 91361), although it is understood that any known sensor can be utilized. FIG. 2B is a view of a generic sensor 290 and a comparative view of an exploded generic sensor 292. The generic sensor 290 can be minimally comprised of a bottom resilient pad 280, which can sandwich a generic sensor element 282 with a second resilient pad 284. The generic sensor element 282 can measure and/or detect a conditional electrical change via a positive electrode pad 286, and a negative electrode pad 288. A conditional change refers to a change in the resistance, voltage, capacitance, or pressure when an external force acts on the generic sensor element 282 through the bottom resilient pad 280 and the second resilient pad 284. One or more wires (two shown: a wire 288W and a wire 286W) can connect the generic sensors 290 with the battery charger and the motor controller 180 and/or the auxiliary battery charger and motor controller box 170.

FIG. 2C is an off-axis view of the bottom right foot control platform 204 showing an example sensor configuration. A long-wire sensor 290LWS can be seated in a front sensor recess hole 246. A short wire sensor 290SWS can be positioned into the front sensor recess 246. A front sensor array 230 can comprise a short wire sensor 290SWS and a long wire sensor 290LWS that can be placed into their respective front sensor recess holes. All sensor wires that are part of the front sensor array 230 can exit through a front sensor wire exit channel 260. Likewise, the long wire sensor 290LWS can be positioned above the rear sensor mounting recess 254, along with the exploded short wire sensor 292SWS, above its respective sensor mounting recess 254. These last two sensors can form a rear sensor array 232. All of these components can form a bottom right foot control platform assembly 298.

Figure 2D:
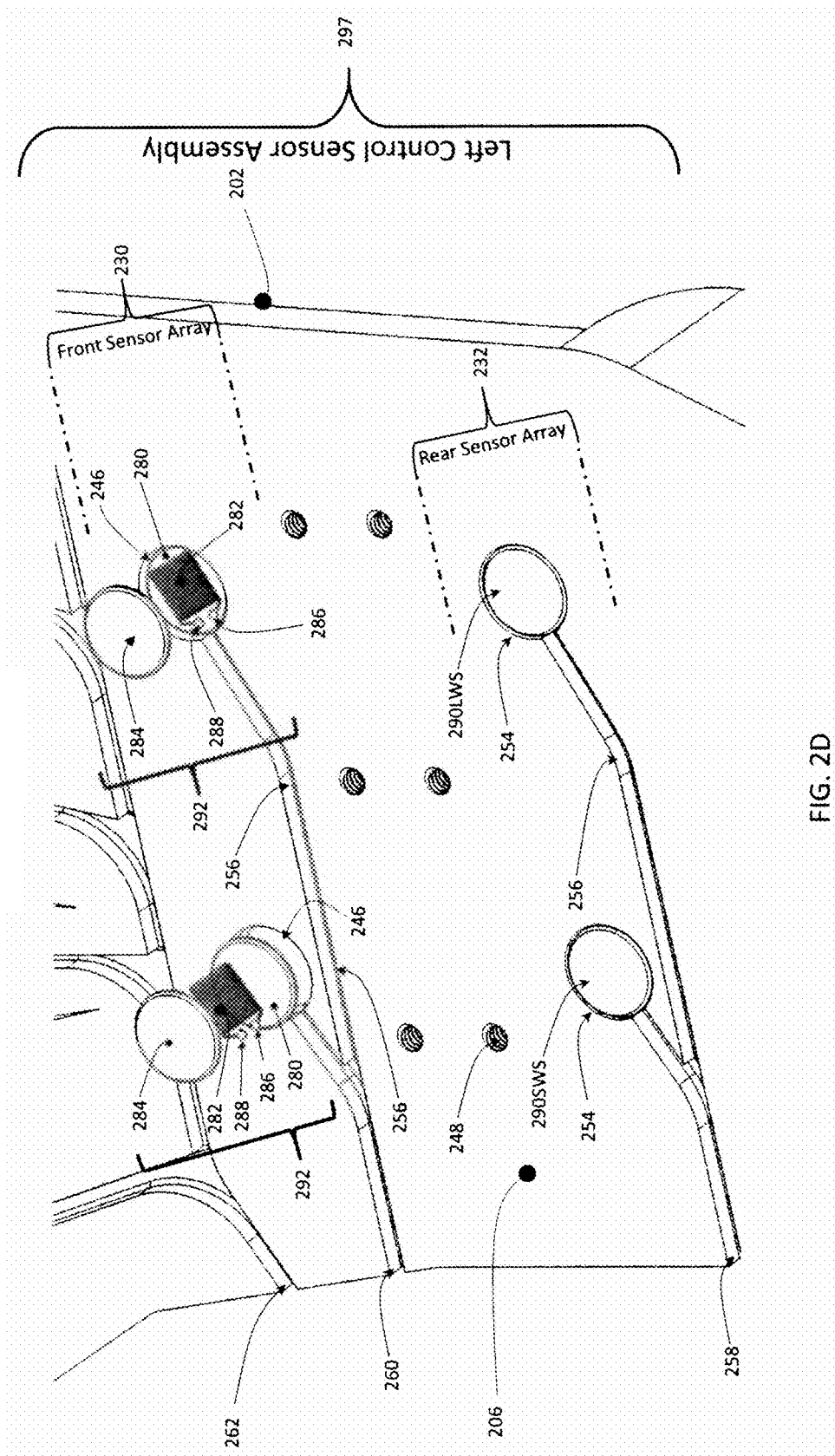
FIG. 2D is a bottom view of the left foot control platform, which is a mirror image of the bottom of the right foot control platform. The mechanical and electrical characteristics of the left foot control platform and the right foot control platform are identical.

A corresponding mirror image of the components that can form the bottom right foot control platform assembly 298, as seen in FIG. 2C, can form a left foot control assembly is 297. FIG. 2D is a view of a bottom left foot control platform 206. For clarity, the sensor electrode wire 286W and sensor electrode wire 288W are not shown. The exploded generic sensor 292 is a view of the generic sensor 290 as seen in FIG. 2B. The exploded generic sensor 292 can be visible above the front sensor recess 246. These sensors can form the front sensor array 230, as do the short wire sensor 290SWS and the long wire sensor 290LWS, properly seated in the rear sensor mounting recesses 254 and form the rear sensor array 232.

Figure 3:
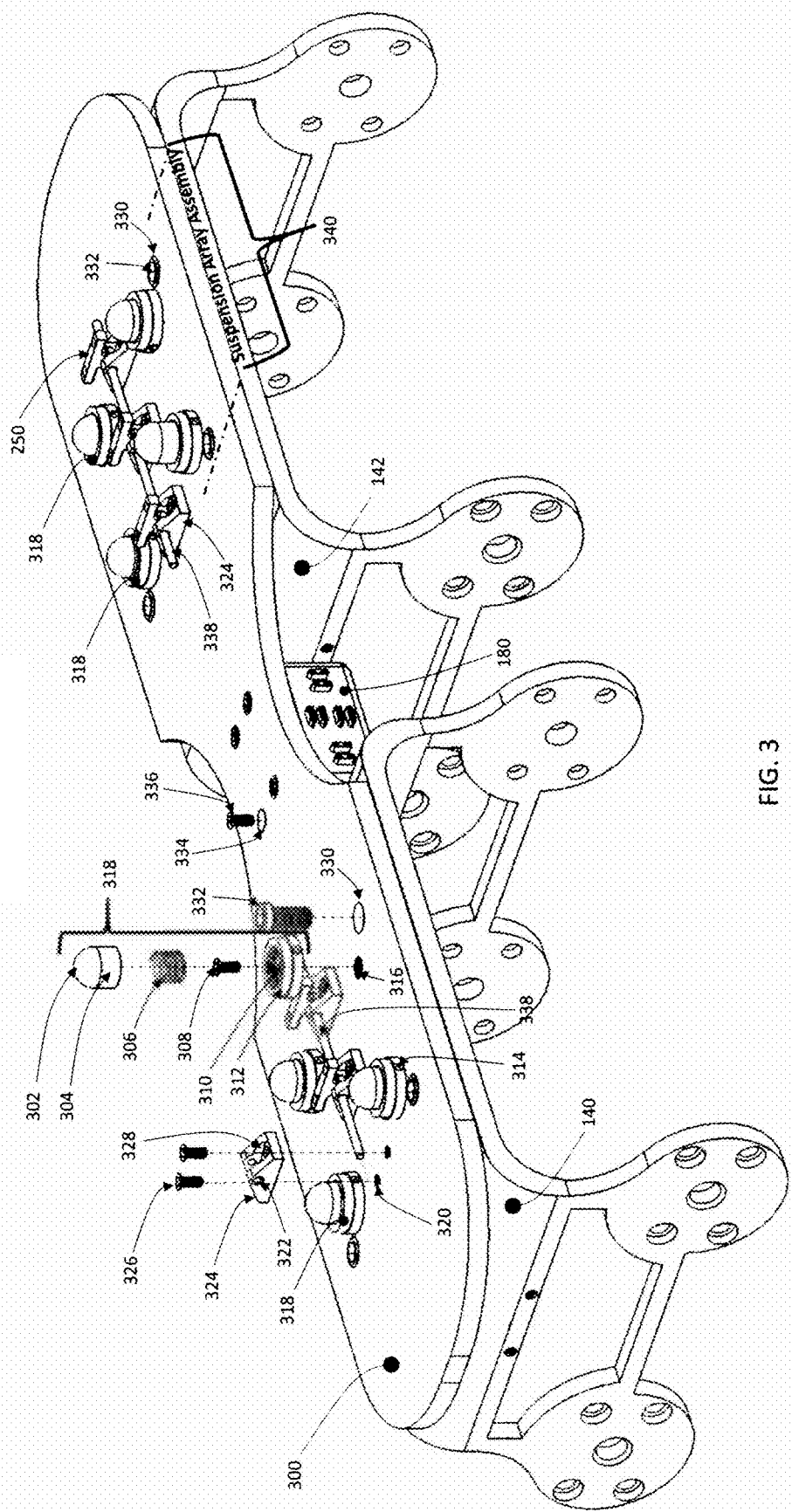
FIG. 3 is an isometric view of the base platform and the components that are secured to it. The suspension system is comprised of a piston base, piston head, piston cylinder, spring, and fastener. The main hinge knuckles are shown along with the axle rod, the battery charge and motor controller, and fastening holes.

A method of mechanically interfacing to the electronic sensors is illustrated in FIG. 2B and shown in FIG. 3. FIG. 3 is an isometric view of a base platform 300, (similar to the base platform 110 described earlier herein with regard to FIG. 1A), and the components that are connected to it. A suspension assembly 318 comprises a piston base platform 300 with a through-hole 310, a fastener 308, a spring or an elastomer 306, a hollow piston body 304 with a rounded piston top 302. The piston base 312 can be secured to the base platform 300 with a fastener 308 that passes through the through-hole 310 and into a threaded hole 316. There can be two sets of suspension assemblies 318 that form a suspension array assembly 340. A main hinge knuckle 324 can be connected to the base platform 300, which can be fastened or otherwise connected to the base platform 300, for example, with a fastener 326 that passes through a knuckle through-hole 328 and secures the main hinge knuckles 324 to the base platform 300 with a threaded hole 320. The main hinge knuckles 324 can comprise a hinge axel through-hole 322 that use an axel-rod 338. The battery charger and motor controller 180 can be connected to the base platform 300, for example, with a faster 336 that passes through a countersunk through-hole 334. Also shown in this view is a fastener 332 which can be used to secure the right drive-mounting platform 140.

Figure 4A:
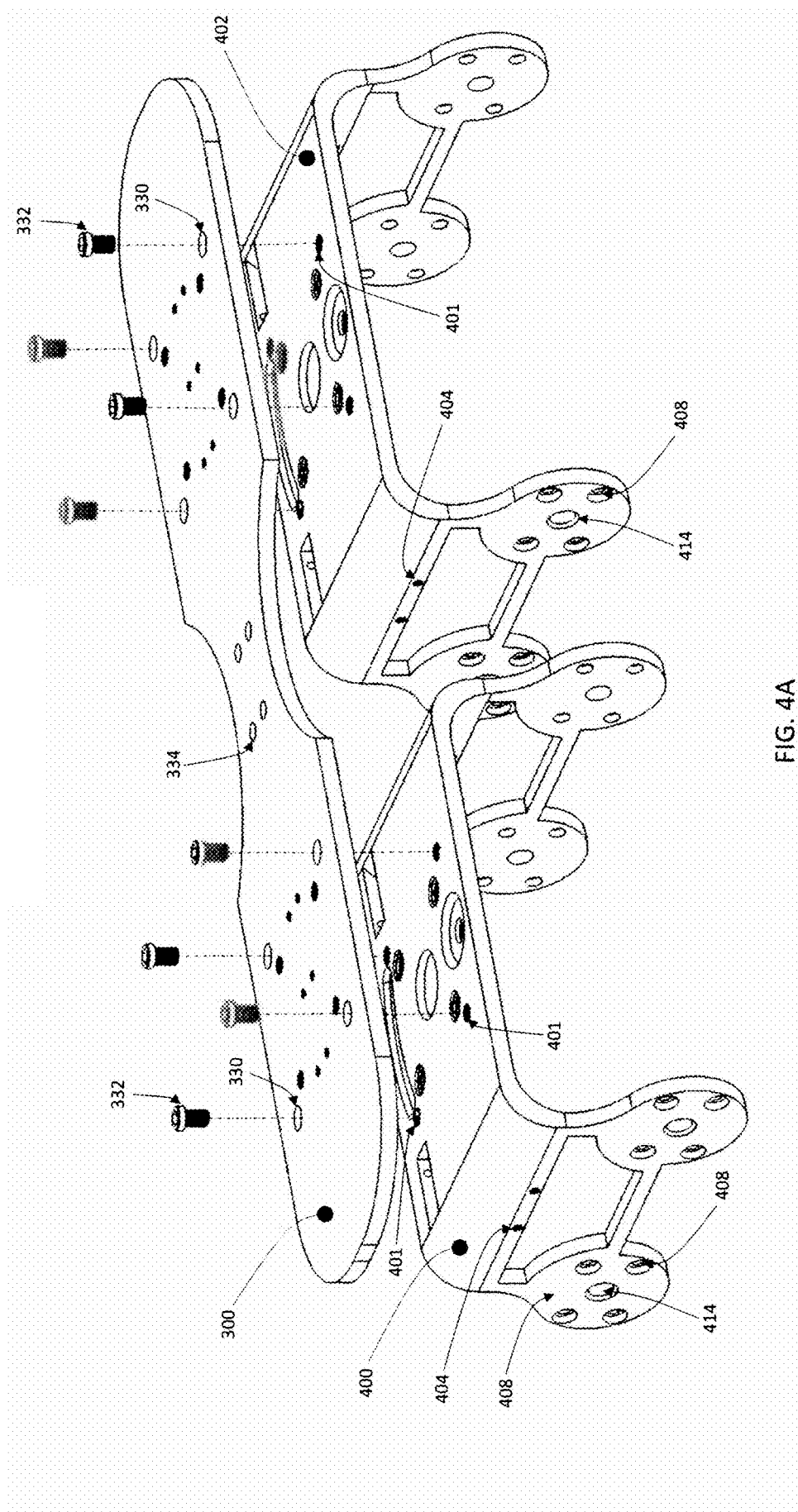
FIG. 4A is an isometric view of the base platform showing the attachment relationships to the right drive motor mount bracket, the left drive motor mount bracket, and the associated fasteners.

FIG. 4A is an isometric view of the base platform 300 showing an attachment method to secure a right drive motor mount bracket body 400 (which can be integrated into the right drive mounting platform 140 described with regard to FIG. 1A above), and a left drive motor mount bracket 402 which can be integrated into the left drive mounting platform 140 described with regard to FIG. 1A above). A fastener 332 can pass through a countersunk through-hole 330 and into a threaded hole 401 in four locations on the left drive motor mount bracket 400, and in four locations on the left drive motor mount bracket 402. A countersunk through-hole 408 can be used to secure various drive hub assemblies 150. A through-hole 414 can serve as a mechanical or an electrical passage through-hole; a countersunk through-hole 408 can be used to secure the motor drive assemblies 150. A threaded hole 404 can be used to secure the auxiliary battery charger and motor controller box 170.

Simple assembly connections are illustrated in FIG. 4B that demonstrate the configuration of the personal motorized device. FIG. 4B is an isometric view that shows the relationship of a right drive motor mount bracket 400 and the attached components. There are some features that are not defined on the top of the right drive motor mount bracket 400, but are described in further detail in figures below. The features that are shown in this top view is a threaded hole 401, as described in FIG. 4A. A drive assembly mounting flange 406 can comprise one or more countersunk through-holes 408 (four shown) through which can pass a fastener 410 to secure the drive hub assemblies 150 to a threaded boss 412. The through-hole for 414 can be utilized as a mechanical and electrical feed-through. FIG. 4B also shows an example relationship between the drive hub assemblies 150 and the tread, track or wheel assemblies 160.

Figure 5A:
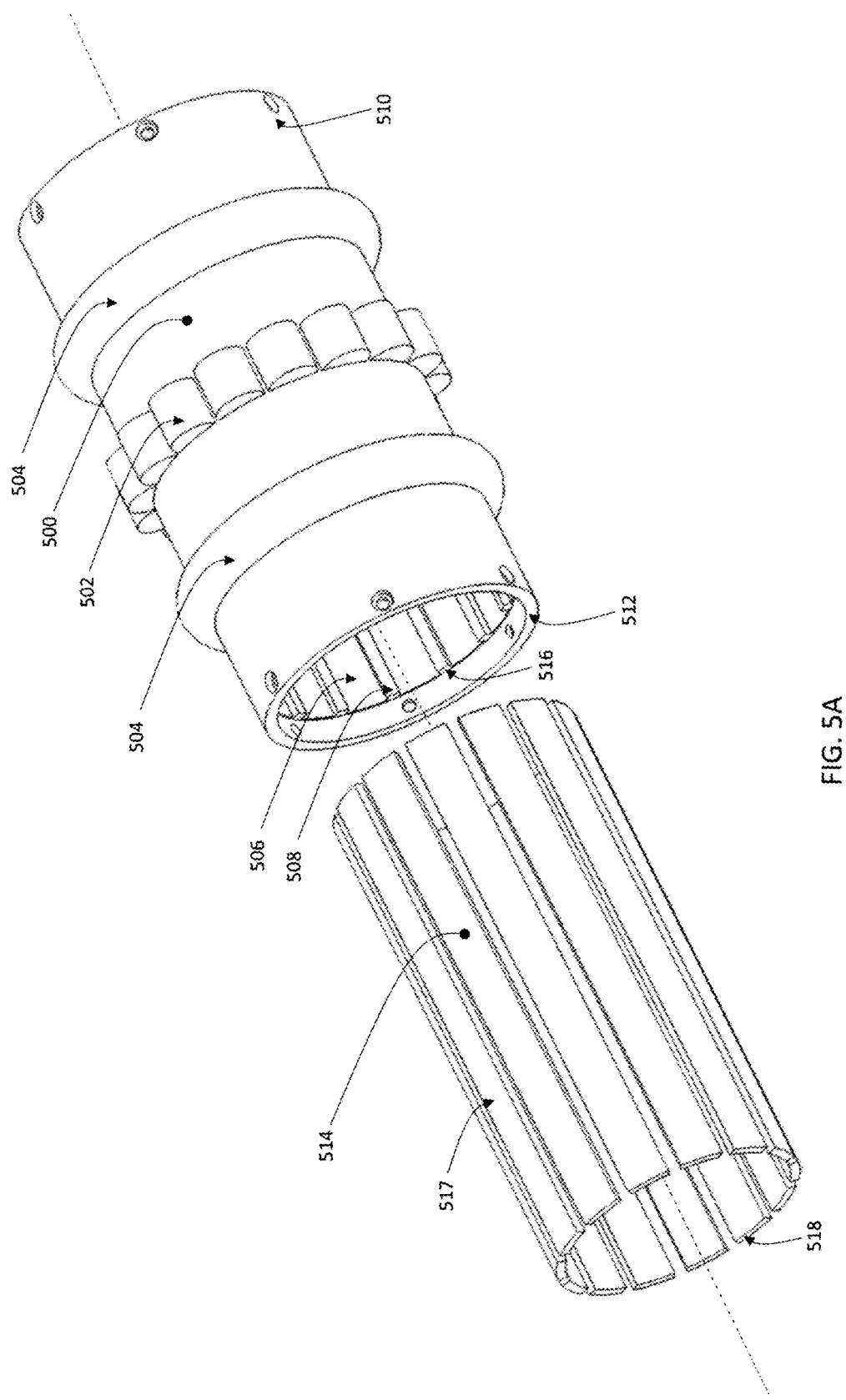
FIG. 5A is an isometric view of the drive hub, which is the outside part of a drive assembly showing features such as cylindrical guide rails around the circumference of the drive hub and the positive sprockets on the circumference of the drive hub. The main feature described is the cylindrical array of magnets that are inserted and mated to the formed geometries on the inside surface of the drive hub.

The drive hub assembly 150 is a component of an out-runner style brushless direct current motor. FIG. 5A is an exploded isometric view of a drive hub 500, which is a component of the drive hub assembly 150. The external surface of the drive hub 500 can comprise a positive sprocket 502, which can be formed around the circumference of the drive hub 500. Another potential feature of the drive hub assembly 150 is one or more guide rails 504, which can be any suitable shape for their function as guide rails and are shown as cylindrical, which can also be formed around the circumference of the drive hub 500. These features can be used to drive and keep the conveyance-structure assemblies 160 on the drive hub 500, shown in FIG. 4B. An internal feature of the drive hub 500 can comprise a recess 506 that can hold one or more magnets 517 and form a cylindrical magnet array 514. The individual magnets 517 that can form the cylindrical magnet array 514, can be separated by a containment ridge 508, formed on the inside of the drive hub 500.

There can be at least two reference points for registering the magnets 517 for precise alignment. These can be an internal drum reference edge 516 and a magnet reference edge 18. The internal drum reference edge 516 is the perpendicular face to the inside containment ridge 508 and can be used as a registration point for the magnets 517 to align to the magnet reference edge 518. The individual magnets 517 can be positioned inside the recesses 506, for example, epoxied one by one, until the cylindrical magnet array 514 is formed on the inside of the drive hub 500.

Figure 5B:
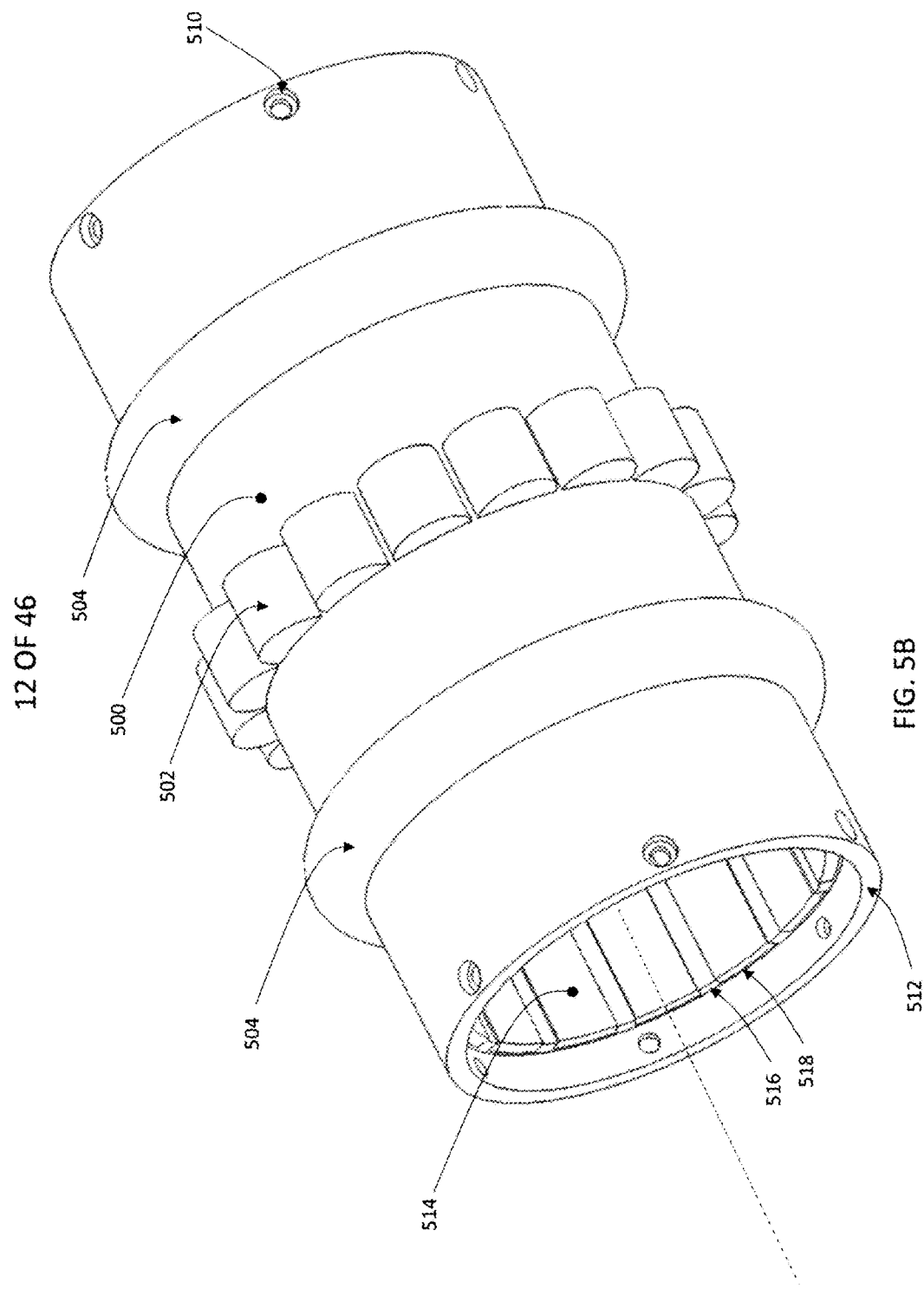
FIG. 5B is an isometric view, which shows the assembled drive hub with the magnets mounted internally and secured in the formed recesses as shown in FIG. 5A.

FIG. 5B is an isometric view, which shows the assembled drive hub 500 with the cylindrical magnet array 514 mounted internally into the recesses 516 as shown in FIG. 5A. The internal drum reference surface 516 and the magnet reference edge 518 are shown in perfect alignment. Also shown in FIG. 5B, are an array countersunk through-holes 510 and a drive hub reference edge 512.

Figure 5C:
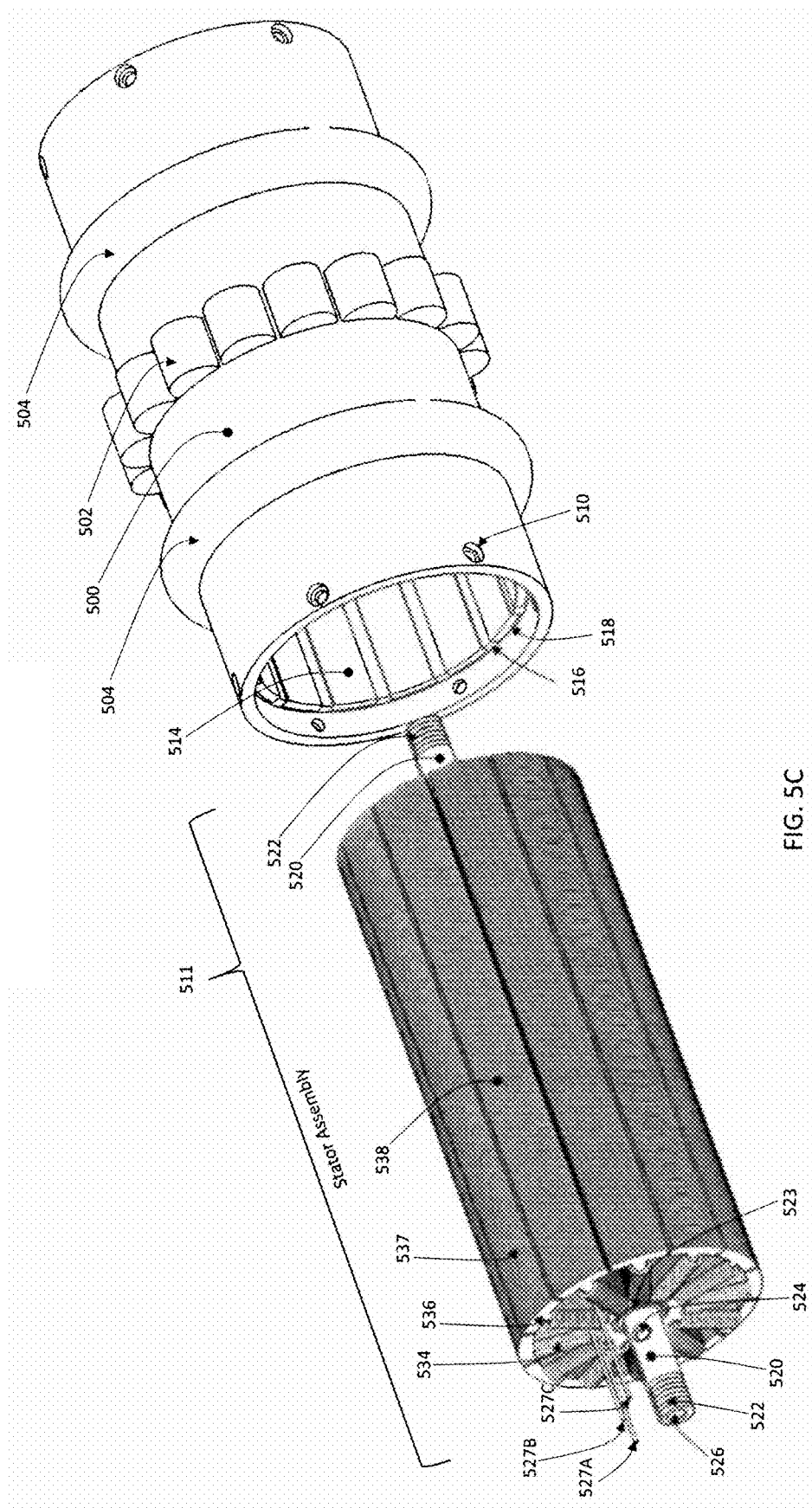
FIG. 5C is an exploded isometric view of the stator assembly with the components that are attached to the stator assembly and its relationship to the drive hub.

Another important part of an out-runner style brushless direct current motor is the assembly if the internal parts. FIG. 5C is an exploded isometric view of a stator assembly 511 and the drive hub 500. The stator assembly 511 can comprise a motor stator 538 with one or more of windings 534 wrapped around one of the one or more a stator arms 536. In the embodiment shown, there are three individual winding wires that form the windings on the stator arms 536, although that some embodiments comprise less or more wires. These one or more individual wires (three shown is the specific embodiment) are a winding wire 527A, a winding wire 527B, and a winding wire 527C. These winding wires 527A, 527B, and 527C can be wound in a specific fashion using brushless DC motor specifications and compliant motor drivers that are commercially available. The stator arms 536 can be stacked together to form the motor stator 538.

Adjacent stator arms 536 can be partially insulated from one another with a thin spacer, or another option is a thin insulating material 537. The stator assembly 511 is mounted onto an insulating sleeve 523 to prevent electrical shorting. The insulating sleeve 523 can be slid onto a motor axle 520. The motor axle 520 can comprise one or more radial wire through-holes 524, which allows the winding wires 527A, 527B, and 527C to pass through and exit a motor axle through-hole 526. This can facilitate motor connections. FIG. 5C also shows a threaded axel end 522 on the ends of the motor axel 520 with the wires feed the motor axel through-hole 526. The stator assembly 511 is shown ready to be inserted into the drive hub 500 with its respective features as called out in FIG. 5A and FIG. 5B.

Figure 5D:
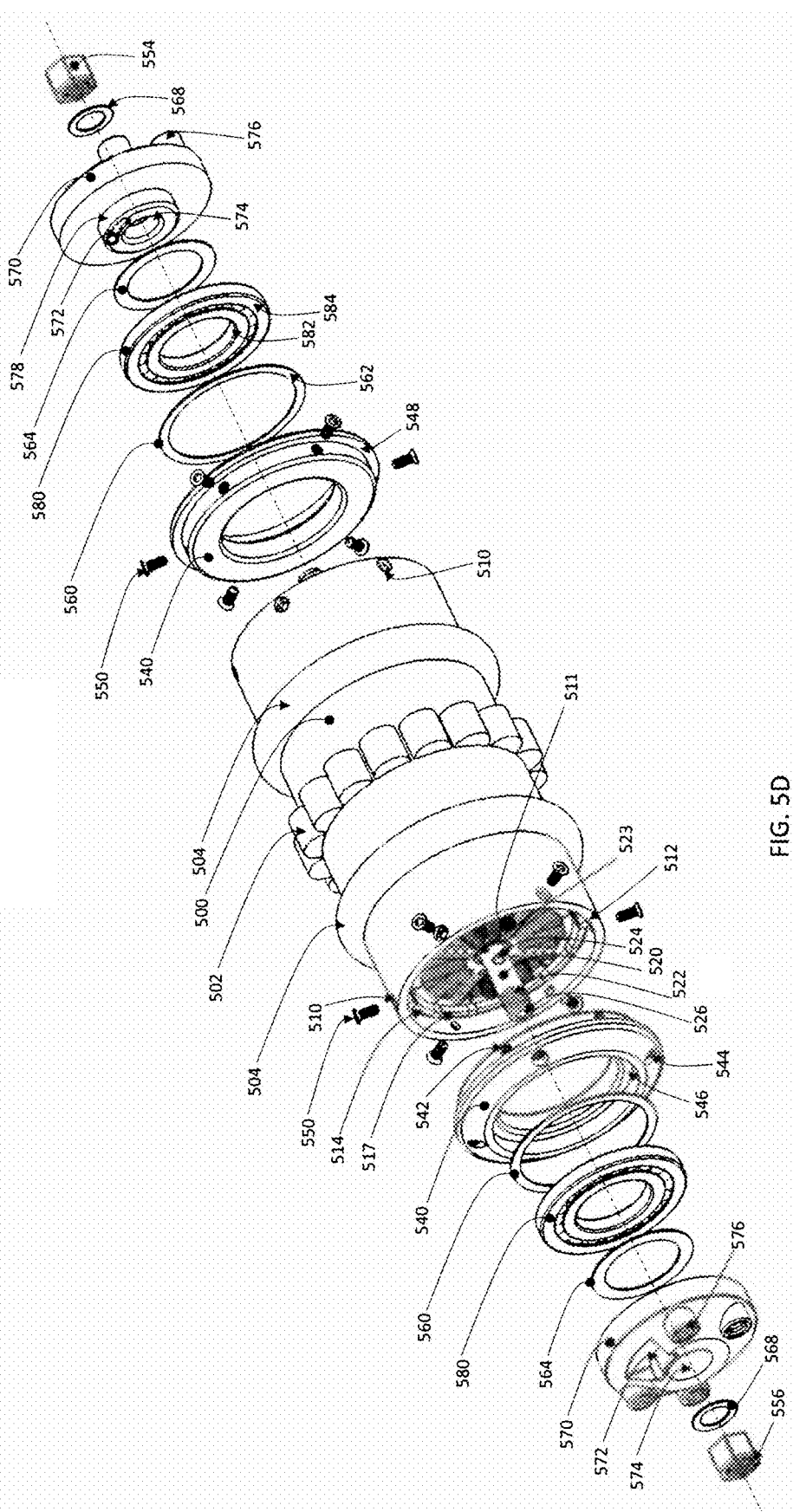
FIG. 5D shows an exploded isometric view of all the components that form a complete drive hub assembly and the relationships of the various components: bearing hub adapters, drive hub, stator assembly bearing adapters, axle rod, and locking nuts.

The arrangement of parts that form a style of out-runner brushless direct current motor is illustrated in FIG. 5D. FIG. 5D shows an exploded isometric view of example components that form a motor drive assembly 559. The stator assembly 511 can be inserted into the drive hub 500. One or more bearing hub adapter 540F can be inserted into the open ends of the motor hub 500 to the drive hub reference edge 512 and fastened to the drive hub 500 with a fastener 550, which can pass through a countersunk through-hole 510 and fasten into a threaded hole 542 of the bearing hub adapter 540F. To prevent rotating surfaces from binding, a bearing spacer 560 can be inserted into a bearing recess 546 of the bearing hub adapter 540F. A bearing 580 can be inserted into the bearing recess 546 and a bearing spacer 564 can be placed onto a bearing boss 578 of a bearing axle adapter 570.

The bearing axle adapter 570 can be inserted into an inner race 582 of the bearing 580. The motor drive assembly 559 can include the fastening of motor axle 520, which can pass through a recessed through-hole 574 of the bearing axle adapter 570. A washer 568 and a locking nut 554 can be tightened onto the threaded axel end 522 of the motor axle 520. When the motor axle 520 is properly torqued in place with a locking nut 554, for example, using a spanner wrench (not shown) inserted into the sprocket-holes 556 on both ends of the motor axle 520, the stator assembly 511 can be properly aligned by the bearing hub adapter 540F and the bearing axle adapter 570. Therefore, the motor axel 520 can span the entire length, or substantially the entire length, of the drive hub 500, and can protrude from opposite through-holes 574 of the drive hub 500. As shown, two bearing hub adapters 540F can be registered into position with the joining of a reference surface 548 with the drive hub of reference edge 512. The drive hub 500 with the array of magnets 514 attached to its inner surface, along with the bearing hub adapter 540F, can be free to rotate around the motor axle 520 through the action of the bearings 580. With the stator assembly 511 suspended on the motor axle 520, and the drive hub 500 suspended by the bearing hub adapter 540F, there is a minimum separation between the rotating magnets 517 that form the cylindrical magnetic array 514 and the outside surface of the motor stator 538. This configuration can form an out runner brushless DC motor.

Given the minimum spacing required for optimum performance of a brushless DC motor, the spacing between the stator assembly 511 and the magnet 517 of the cylindrical magnet array 514 can be compromised if the walls of the drive hub 500 are thin. This could cause friction-erosion to both the stator arms 536 making contact with the magnets 517. This could eventually lead to motor performance decrease and ultimately motor failure.

Figure 5E:
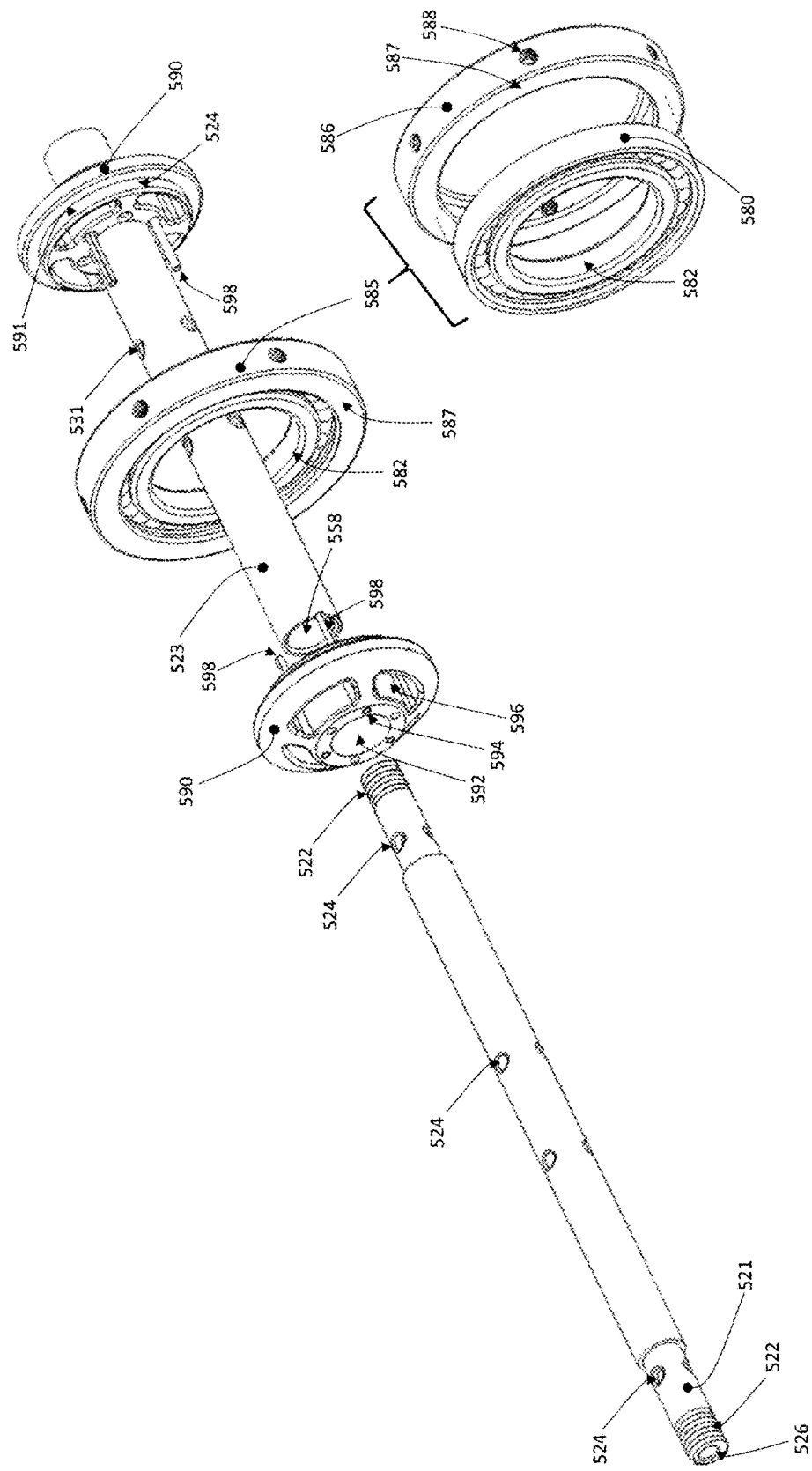
FIG. 5E is an isometric view of a motor axle that shows the new bearing adapters, which hold a bearing in the center part of a motor assembly or drive assembly in order to prevent the motor drive hub from scoring magnets or stators of the motor. It also shows the through holes that can be used for different motor wiring configurations.

Simple hobby style brushless direct current out-runner motors are powerful but may lack the mechanical integrity to sustain the forceful stresses desired in skateboard or new motorized vehicles. FIG. 5E is an exploded isometric view of a motor axle 521, which can be used to hold a support bearing assembly 585. This support bearing assembly 585 is implemented to maintain the proper spacing between the rotating cylindrical magnet arrays 514 and the stator arms 536 of stationary stator assembly 511. This design can sustain strong external forces applied to the drive hub 500. The insulating sleeve 523 can prevent the motor axel 521 from shorting the stator assembly 511 shown in FIG. 5C. The insulating sleeve 523 can comprise an array of radial wire through-holes 531 that align with an array of radial wire through-holes 524 on the motor axle 521. A support bearing 585 can be held in place by a center bearing adapter 590A and a center bearing adapter 590B. The center bearing adapter 590A and the center bearing adapter 590B can comprise a bearing boss 591, which is pressed onto an inner race 582 on both sides of a bearing 580.

The support bearing assembly 585 can be pinned in place between the two center bearing adapter 590A and center bearing adapter 590B with a roll pin 598 that can be pressed into a role-pin through-hole 594 at multiple locations. The center bearing adapter 590A and center adapter 590B holding the support bearing assembly 585 can be slid onto the middle of the insulating sleeve 523A common axel through-hole 592. The insulating sleeve 523 can be slid onto the motor axel 521 using the axel through-hole 558 and aligned over a plurality of radial wire through-holes 531 and the radial wire through-holes 524 with the support bearing assembly 585 in the middle. The support bearing assembly 585 can comprise a bearing 580 with a resilient bearing adapter sleeve 586, which can comprise non-conductive and non-magnetic expandable elastomeric sides 587. This configuration can allow the bearing 580 to be slid into this resilient bearing adapter sleeve 586. This material can be in contact with the individual magnetics 517, which form the cylindrical magnet array 514, and rotate freely with the cylindrical magnet array 514. The support bearing assembly 585 can prevent the individual magnets 517 of the cylindrical magnet array 514, shown in FIG. 5B, from rubbing against the stator assembly 511 avoiding motor malfunctions due to massive forces on the outside of the drive hub 500.

Introducing the support bearing assembly 585 and the wiring options provided by the radial axel through-holes 524 of the motor axel 520 and motor axel 521 allows for many more out-runner motor configurations. FIG. 5F shows an exploded isometric view of a dual stator or dual motor assembly 513 for larger motor applications. A dual stator assembly 513 can comprise a left stator assembly 511A and a right stator assembly 511B, which can be symmetrically mounted onto the insulating sleeve 523 with the support bearing assembly 585 centered on the insulating sleeve 523 as described in FIG. 5E. The insulating sleeve 523 can be mounted onto the motor axel 521 with the radial wire through-holes 531 aligned with the radial wire through-holes 524.

The left stator assembly 511A with the cylindrical magnet array 514A can constitute a motor when the cylindrical magnet array 514A is mounted into the recesses 506 of the drive hub 500 along with the insertion of the left stator assembly 511A. When a more powerful motor is required, the drive hub 500 can increase in length to accommodate larger stator assemblies 511 and longer magnets 517 to comprise the cylindrical magnet array 514 as described in FIG. 5B. A drive hub 500 increase in length can cause it to deform. A dual stator or dual motor assembly 513 can be implemented with the support bearing assembly 585, as illustrated in FIG. 5F, to prevent any deformation.

Figure 5G:
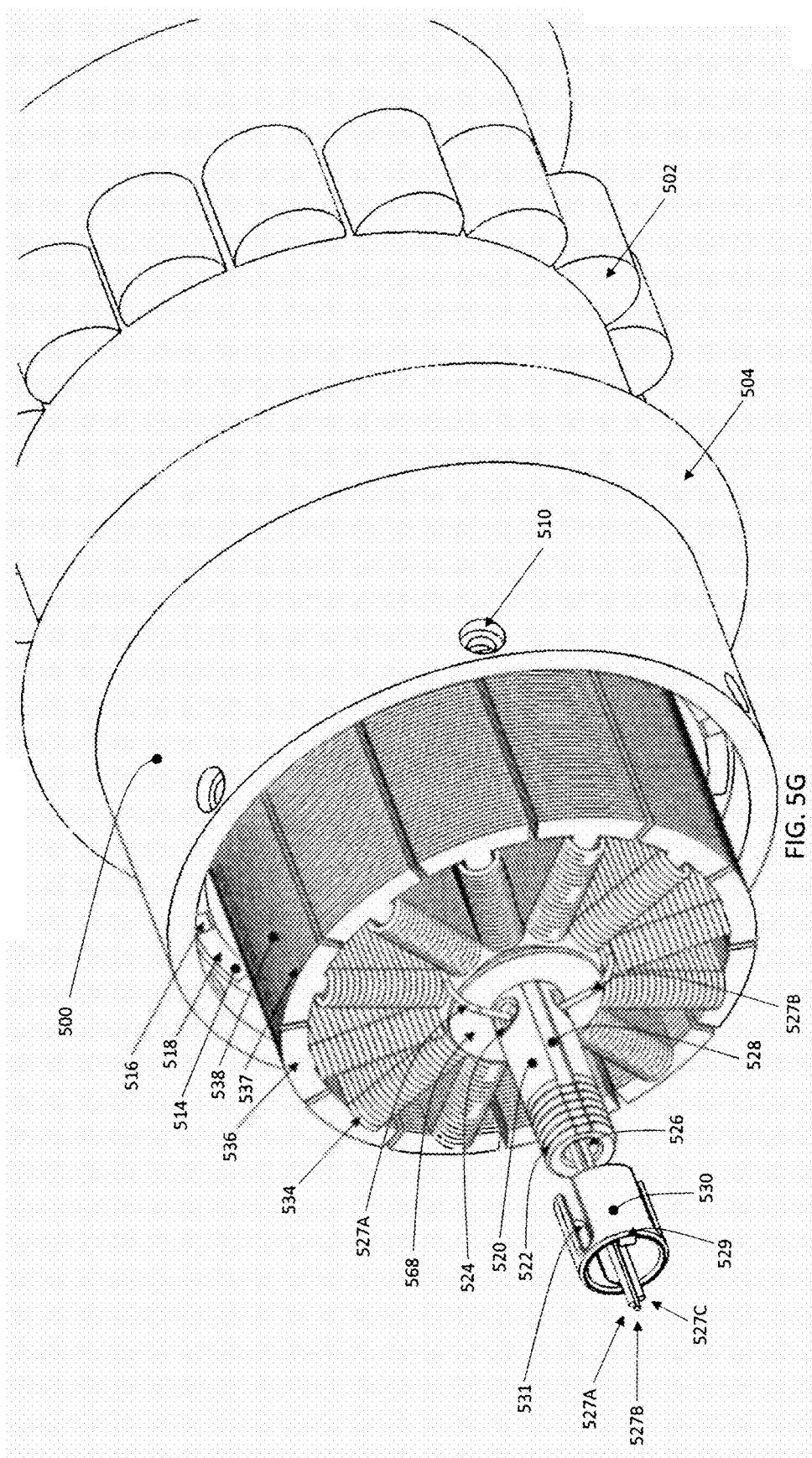
FIG. 5G is an exploded isometric view of a partial drive hub with a partially inserted stator assembly or a dual stator assembly, the respective wires used to supply current that drives a brushless DC motor, the method of egress of these wires through the motor axle, and a keyed spacer that is used to prevent shearing the motor wires.

The dual motor aspect of the dual stator or dual motor assembly 513 can utilize varying wiring configurations. A first motor assembly 566 of the dual stator or dual motor assembly 513 can comprise winding wires 527A, 527B, and 527C for the plurality of windings 534 around the stator arms 536 of the left stator assembly 511A, similar to that illustrated in FIG. 5C, with the windings wires 527A, 527B, and 527C exiting the motor axel 521, as illustrated in the next figure, FIG. 5G. A second motor assembly 567 can comprise a second set of winding wires 527A, 527B, and 527C for the plurality of windings 534 around the stator arms 536 of the right stator assembly 511B, as illustrated in FIG. 5C, and with the winding wires 527A, 527B, and 527C, exiting the opposite end of the motor axel 521, as illustrated in FIG. 5G. The first motor assembly 566 and the second motor assembly 567 are mirror images. The winding wires 527A, 527B, and 527C for the first motor 56, and the second motor assembly 567, can be controlled with a dual motor controller contained in the battery charger and motor controller 180 or in the auxiliary battery charger and motor controller box 170. There are several commercially available dual motor controllers.

The left stator assembly 511A of the dual stator or dual motor assembly 513 can comprise winding wires 527A, 527B, and 527C for the plurality of windings 534 around the stator arms 536 of the left stator assembly 511A as described in FIG. 5C. However, a set of splice wires 527A', 527B', and 527C', can be spliced onto the left stator assembly 511A winding wires 527A, 527B, and 527C to connect to the winding wires 527A, 527B, and 527C of the parallel stator arms 536 of the right stator assembly 511B. Splice wires 527A', 527B', and 527C' can be passed through a wire through-hole 596 of the center bearing adapter 590A and center bearing adapter 590B. There can be multiple wire through-holes 596 that accommodate large numbers of the splice wires 527A', 527B', and 527C'. The dual stator aspect of the dual stator or dual motor assembly 513 can also use a longer magnet 517 to replace the individual magnets 517 that form the cylindrical magnet array 514A and cylindrical magnet array 514B. The dual stator aspect of the dual stator or dual motor assembly 513 can operate with a single motor controller or multiple motor controllers.

A unique motor wiring technique is set forth in FIG. 5G. FIG. 5G is a partially exploded isometric view of a drive hub 500 and a partially inserted stator assembly 511 showing the motor stator 538 comprising a plurality of windings 534 around the stator arms 536. FIG. 5G provides a closer view of an example configuration of alternating stator arms 536 and corresponding insulating material 537. The alternating light and dark lines represent the stator arms 536 with the very thin insulating material 537 as described in FIG. 5C. Also shown are the windings 534, which can comprise two or more winding wires (three shown). The three winding wires 527A, 527B, and 527C can form the basis for the drive currents that turn the cylindrical magnet array 514 and the drive hub 500. In this particular case, the winding wires 527A, 527B, and 527C are directed through the radial wire through-holes 524 located on motor axel 521. An elongated spacer 530 can be used to prevent the winding wires 527A, 527B, and 527C from being sheared by allowing the winding wires 527A, 527B, and 527C to pass through a wire through-slot 533, into the radial wire through-hole 524, and out the motor axle through-hole 526. Other wire extraction scenarios are described further below. The elongated spacer 530 can comprise a rectangular key 529, which is locked in pace and slid onto the motor axle 520 with the key aligned to a key way guide channel 528 on the motor axle 520. The cylindrical magnet array 514 can comprise a reference surface, which is a magnet edge 518, properly registered and stopped at the reference surface 516. The reference surface 516 can help form the alignment regimen, which can secure the cylindrical magnet array 514 in place when it is fixed to those surfaces to give maximum performance.

Figure 5H:
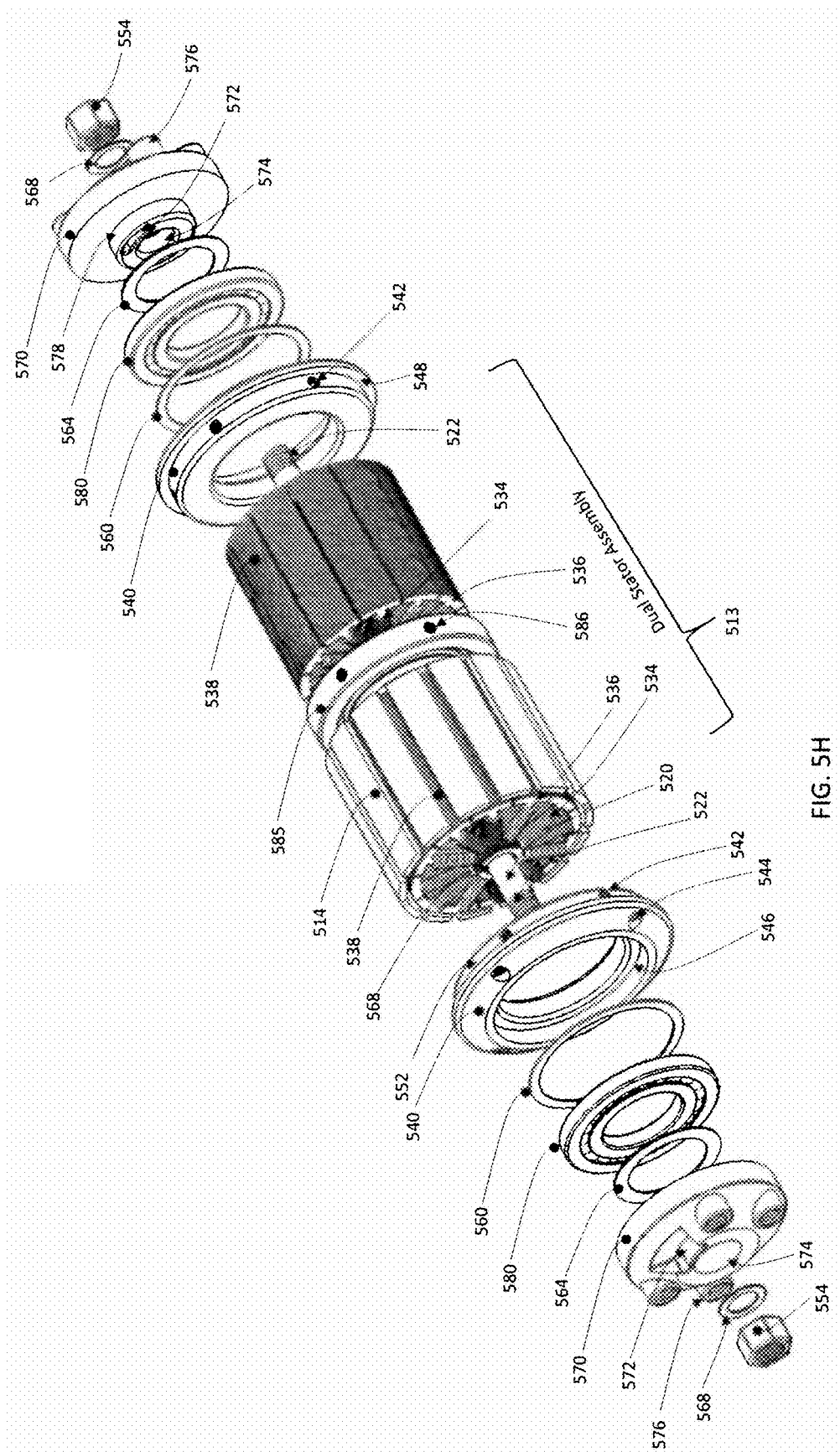
FIG. 5H is an exploded isometric view of all of the internal parts of the driver hub which comprises a brushless DC motor and the method of connecting it to an axle bearing hub adapter.
Figure 51:
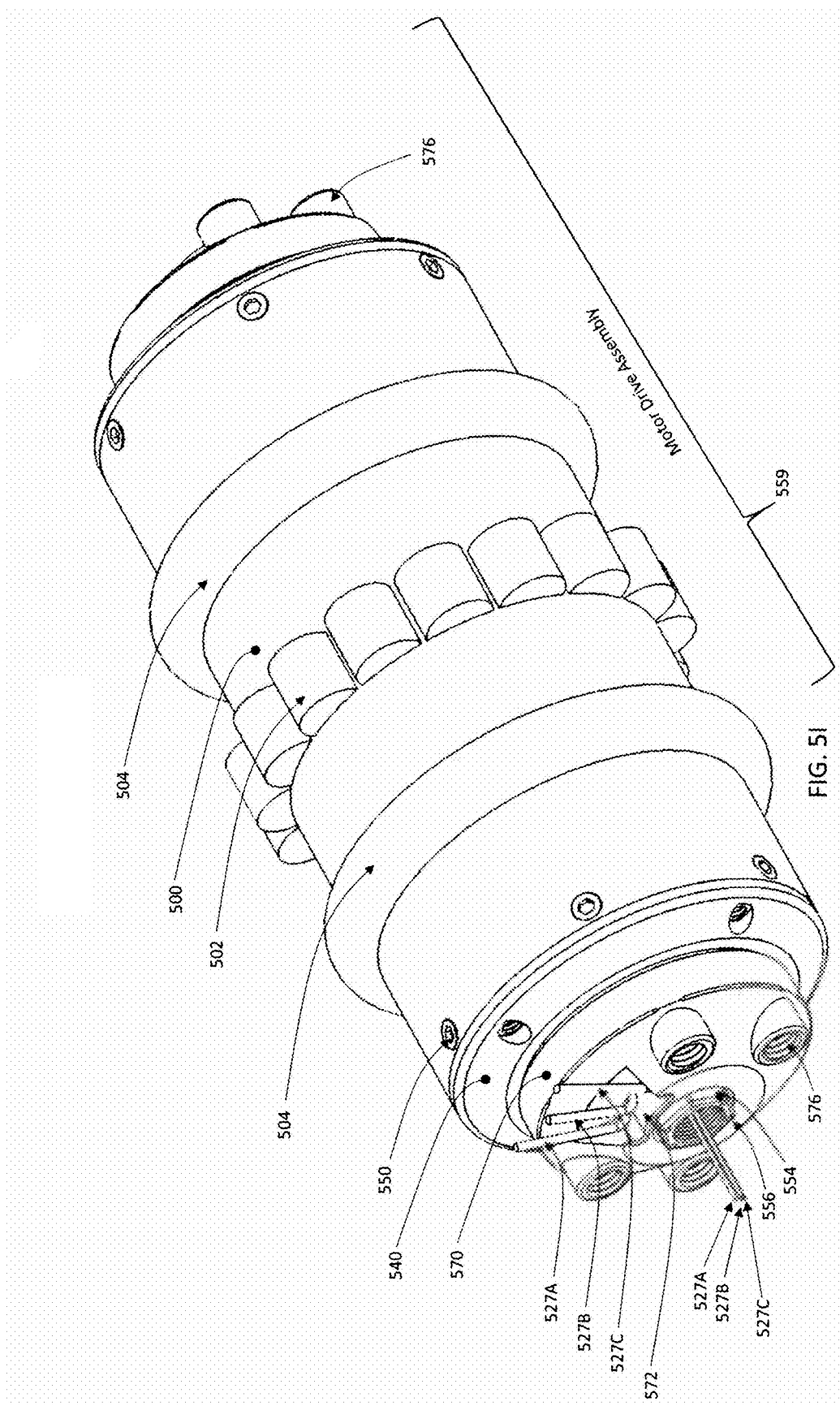

The view of FIG. 5H is an exploded isometric view of the dual stator or dual motor assembly 513 assembled onto the motor axel 521 with support bearing assembly 585 in the proper positions. The drive hub 500 and cylindrical magnet array 514B are not shown in this view. This view shows the center support bearing assembly 585 flanked on both sides by the dual stator assembly 513 or dual motor assembly 513. The remainder of the components are assembled as illustrated in FIG. 5D.

A complete out-runner style brushless direct current motor comprising an array of robust motor mounting bosses 576 is shown in FIG. 5I, which is an isometric view of a completed motor drive assembly 559. Shown here is the motor hub 500 secured in place to the bearing hub adapter 540F with the fasteners 550. The bearing axel adapter 570 can be secured in place by fixing the locking nut 554 securely to threads of the threaded axel end 522 of the motor axle 520 or motor axel 521 (not shown). The motor drive assembly can be properly torqued in place, for example, by using a spanner wrench on both ends of the motor axel 520, which can engage the sprocket-holes 556 on the outside of the locking nut 554. The winding wires 527A, 527B, and 527C are shown emerging from an off-axis wire through-hole 572. Also, the winding wires 527A, 527B, and 527C can be threaded through the radial wire through-hole 524, refer to FIG. 5G, and can emerge from the axle through-hole 526 through the locking nut 554.

Figure 5J:
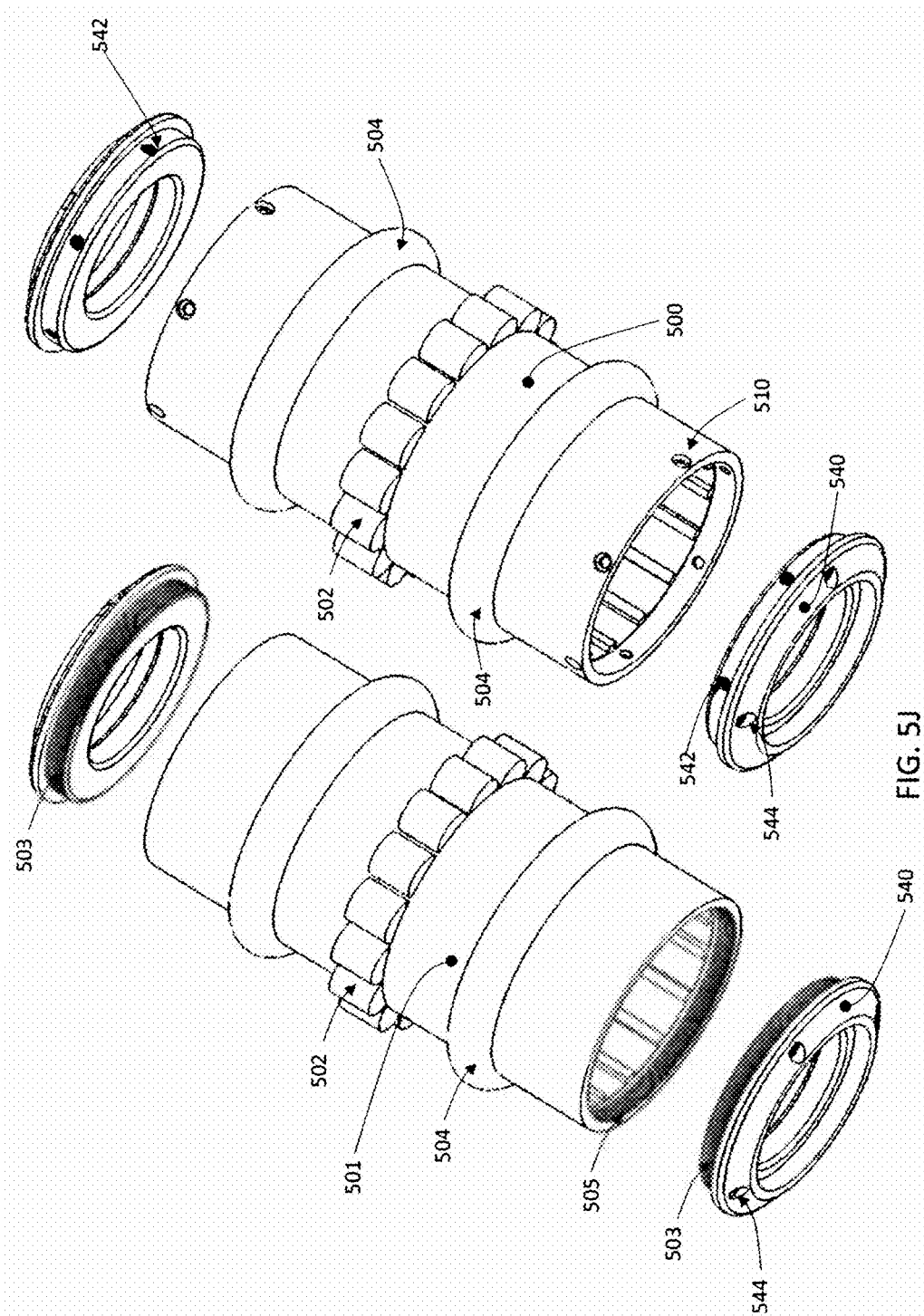
FIG. 5J is an isometric view of the two configurations of the drive hubs and the respective bearing hub adapters with the appropriate methods of connection or joining the bearing adapters to the drive nuts.

FIG. 5J is a comparative isometric view of example configurations of the drive hub 501 and drive hub 500. The bearing hub adapter 540 can comprise at least two configurations. The first configuration shown in FIG. 5J is a bearing hub adapter 540T with a set of threads 503. The set of threads 503 can be mated to a set of threads 505 on the edges of the drive hub 501. Drive hub 501 can comprise the same internal and external structures as the drive hub 500. A circular guide rail 514 can be used for maintaining alignment, and positive sprockets 502, which can be used as a cog engagement mechanism. The second configuration of the bearing hub adapter 540F can use fasteners 550 (not shown), which can screw into the threaded hole 542 after passing through the countersunk through-hole 510. The bearing hub adapter 540 can comprise a threaded sprocket-hole 544. The threaded sprocket-holes 544 can be used with a tightening device, such as sprocket wrench (not shown), which can tighten or loosen the bearing hub adapter 540F or the bearing hub adapter 540T. The spanner wrench (not shown), can be used to facilitate removal or alignment of the bearing hub adapter 540T or bearing hub adapter 540F during assembly.

Some example unique features that can be included on the outside of the drive hub 501 and drive hub 500 are illustrated interacting with the conveyance-structure assembly 160 in FIG. 6A, which is an isometric view of a tread 600, a tread cross-section 602, a wheel 620, and a wheel cross-section 622. This view also shows mating recesses to the complimentary features as seen on the drive hub 500. For example, the tread cross-section 602 shows a negative sprocket 626 that can engage the positive sprocket 502 of the drive hub 500 of the motor drive assembly 559. Also the two cylindrical guide rails 504 of the drive hub 500 and the drive hub 501 of the motor drive assembly 559 can engage a circular recess 624 to keep the tread 600 or the wheels 620 from sliding or walking off the drive hub 500 or drive hub 501 (not shown).

The wheel 620 and wheel cross-section 622 can comprise the same structures used for driving and alignment. A negative sprocket 626, as viewed in the wheel cross-section view 622, can engage the positive sprockets 502 part of the drive hub 500 of the motor drive assembly 559. The same positive circular guide rail of the drive hub 500 and the drive hub 501 can keep the wheel 620 on the respective drive hubs 500 and the drive hub 501 when they engage the circular recess 624. FIG. 5J shows some differences between the drive hub 500 and the drive hub 501. The drive hub 501 can utilize the threaded bearing hub adapter 540T, and the drive hub 500 can utilize the fastener 550 style of attachment when using bearing hub adapter 540F. The drive hub 501 is not shown in this view. The drive hub 501 can be a direct substitution for the drive hub 500 when using the respective bearing hub adapter 540T or bearing adapter 540F.

Figure 6B:
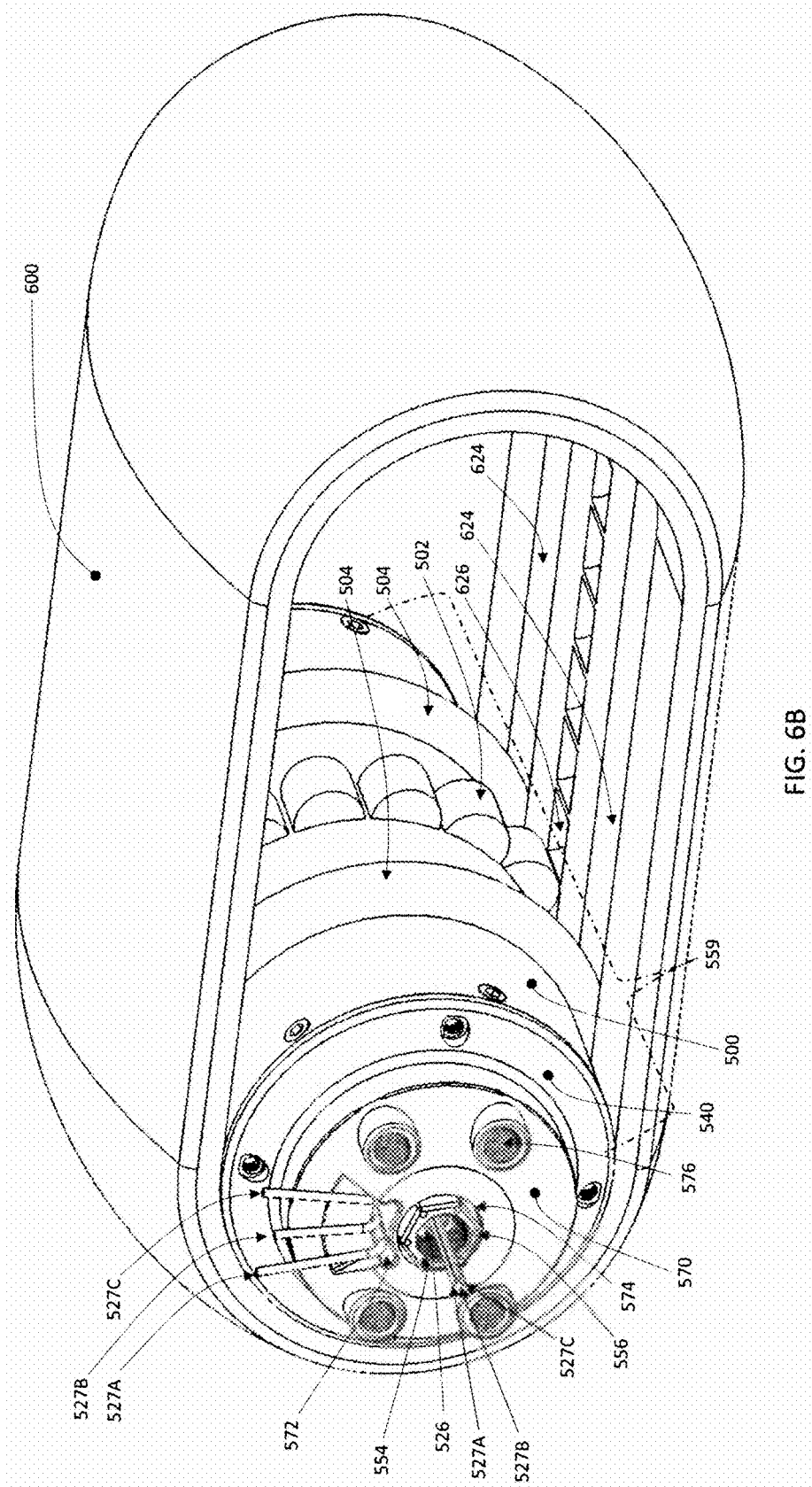
FIG. 6B is an elevated off-axis side view of a complete tread and the motor hub assembly showing the electrical wire feedthroughs.

FIG. 6B is an elevated off-axis side view of a tread 600, which has been mounted or otherwise connected to a motor drive assembly 559 and/or the one or more drive hub 500, designated by the dashed brace. This view shows the winding wires 527A, 527B, and 527C exiting from the recessed off-axis wire through-hole 572. Another set of winding wires 527A, 527B, and 527C can exit through the motor axel through-hole 526 and the recessed through-hole 574. This view provides a closer view of the locking nut 554 with sprocket-holes 556, which can be used used to tighten the locking nut 554 onto the motor axle 520 or motor axle 521 (both not shown), for example, via use of a spanner wrench. While a locking nut is described in this embodiment and in the various embodiments herein as it is a convenient, adjustable and expedient form of connection, it is understood that, in this and other embodiments, other known connection structures can be utilized. An advantage of utilizing the locking nut 554 which can be tightened with a spanner wrench is to conserve space by having the locking 554 fit into the recessed through-hole 574 of the bearing axle adapter 570. The mating surfaces of the drive hub 500, notably the positive sprocket 502, shows an example engagement with the negative sprocket 626 of the tread 600 and the positive cylindrical guide rails on the drive hub 500 can engage the circular recess 624 of the tread 600. A threaded boss 576 is a robust attachment surface to fasten the motor drive assembly 559 securely to the drive assembly mounting flanges 406 as seen in FIG. 4B.

Figure 7A:
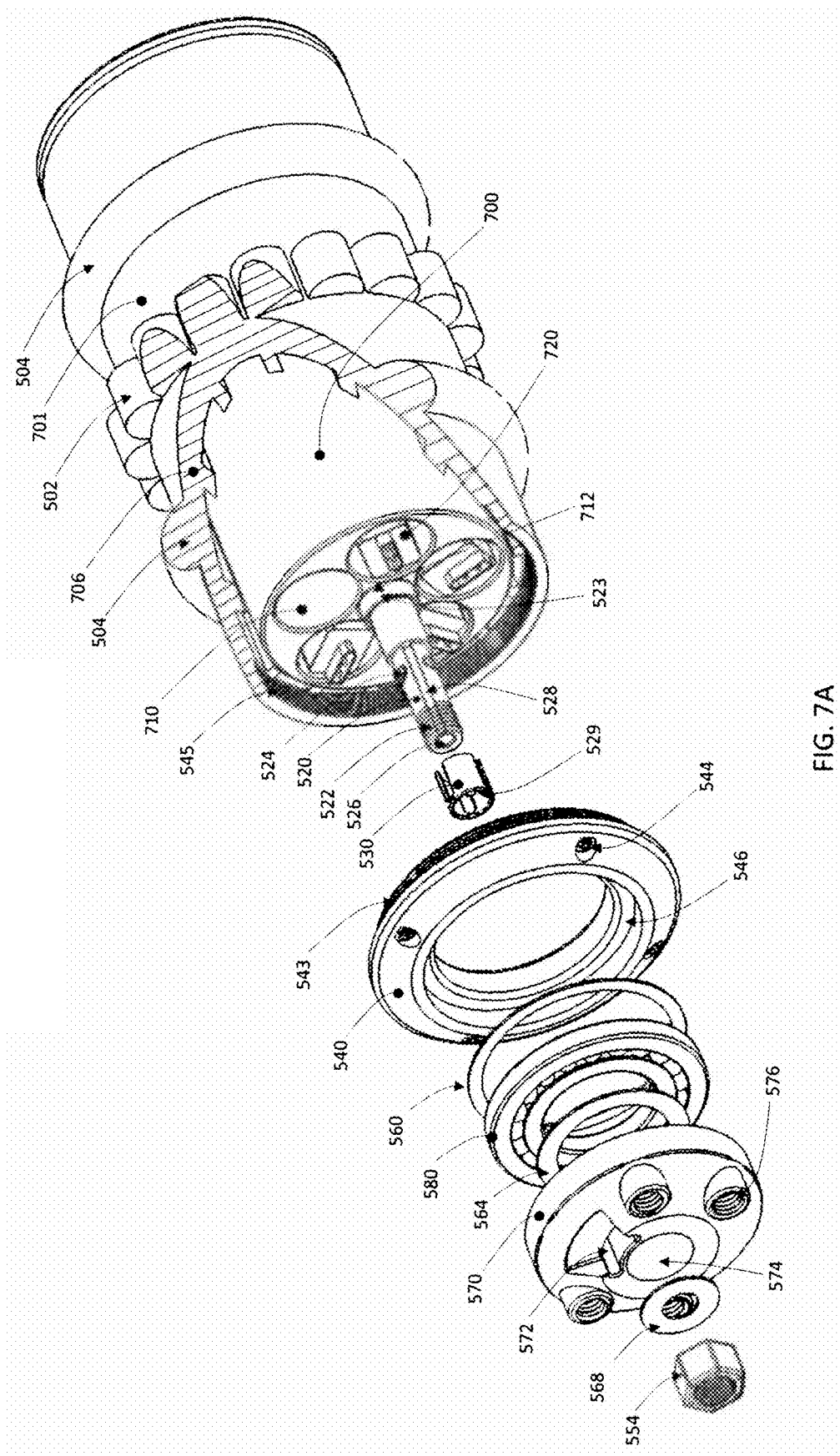
FIG. 7A is an exploded isometric view of an electronics component holder, which fits into a drive hub showing the electronic holder with component cells for the containment of the batteries and other electronic components, such as the battery charger and motor controller. This figure shows the common elements used in previous drawings used to secure this assembly to a common axle hub, bearing adapter, and axle hub adapter.

Another method of distribution and control of the batteries and electronics for the personal motorized device 100 is disclosed in FIG. 7A. FIG. 7A is an exploded isometric view of an electronic component holder 700, which can fit into an electrical hub assembly 701 (the base structure can be similar to drive hub 500 described with regard to FIG. 5A above). Shown here is a partial cross-sectional view of an electrical hub assembly 701. This partial cross-section 706 exposes the electronic component holder 700 with an array of component cells 710. The component cells 710 can accommodate a battery 720 that can electrical power to the motor drive assembly 559, shown in FIG. 6B. The electronic component holder 700 can occupy the same volume occupied by the stator assemblies 511, as seen in FIG. 5C. The electrical hub assembly 701 can function as a conversion of the drive hub 501, that can comprise the threaded features 505 used to secure the bearing hub adapter 540T and the electrical hub assembly 701 with the threads 503 that can thread into the receiver thread 505 on the electrical hub assembly 701. The reason for the designation of electrical hub assembly 701 will be clear in future drawings, indicating this electrical hub assembly 701 can contain electrical components. The bearing spacer 560 can be inserted into the bearing recess 546 followed by the bearing 580 being inserted into the same bearing recess 546. The bearing axle adapter 570, along with the bearing spacer 564, can be slid onto the motor axle 521 and into the inner race of the bearing 580.

The elongated spacer 530 with the rectangular key 529 can be placed onto the motor axle 520 by engaging the rectangular key 529 into the key way guide channel 528 on the motor axle 521. The radial axle through-holes 524 and motor axle through-hole 526 can be provided as wire guiding through-holes and may emanate from the locking nut 554 that passes through the recessed through-hole 574. Using the washer 568 and the locking nut 554 can tighten onto threads of the threaded axle end 522 of the motor axle 520 seats the bearing 580 and therefore can tighten all of the components in their proper dimensional orientation.

Although magnets 517, can be part of the cylindrical magnet array 514 as seen in FIG. 5G are not present in this partial cross-section 706, they may be present as another option to replace the stator assembly 511 that made up the motor drive assembly 559 with electronic component holder 700.

Figure 7B:
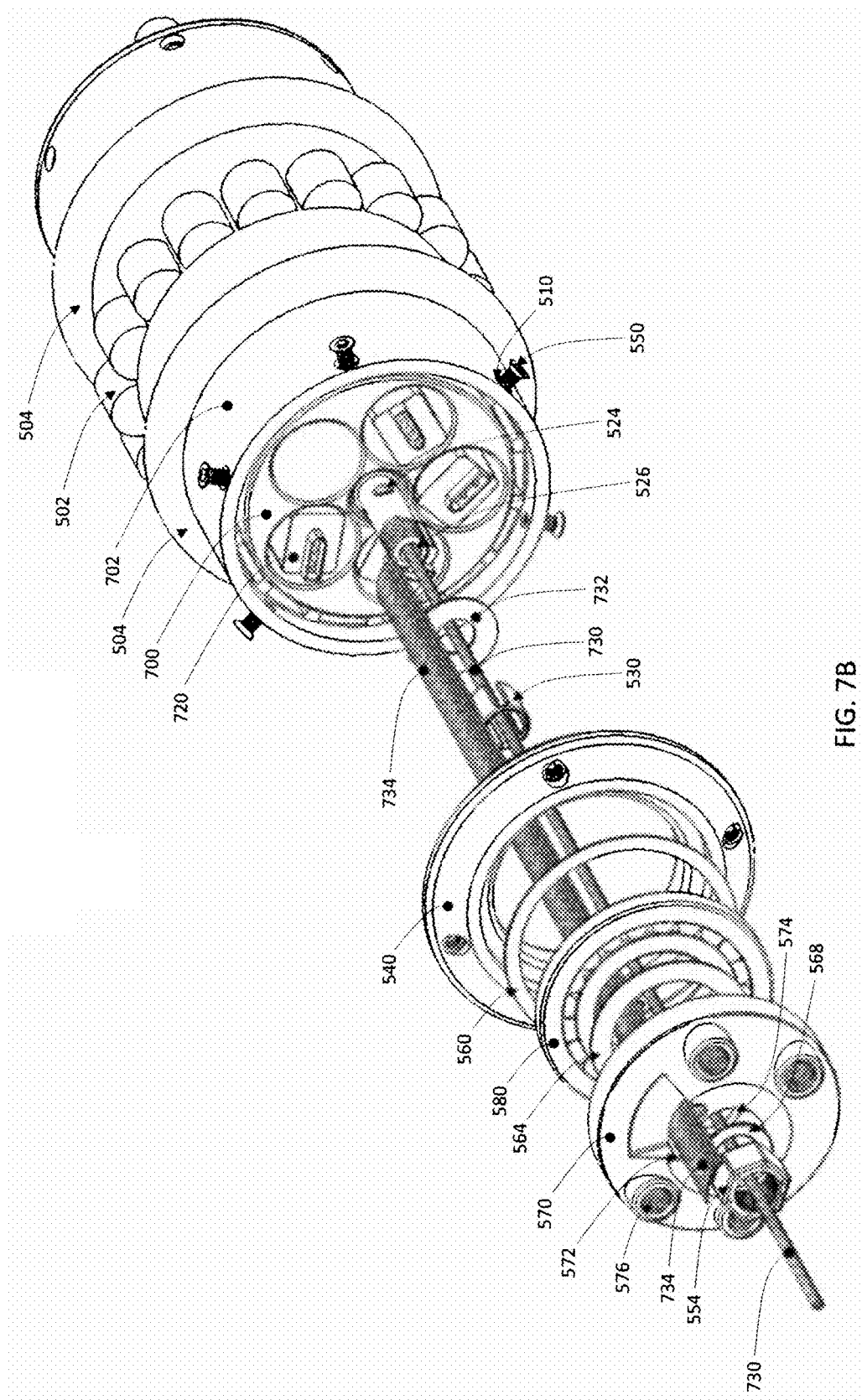
FIG. 7B is an isometric view of the electronic component holder placed in the drive hub showing the wire management pathways for the electrical components that govern the functioning of the motor, battery management, and control.

FIG. 7B is a partially exploded isometric view of the electronic component holder 700 inside the drive hub 702. The drive hub 702 is now designated 702 as it may use fasteners 550 to secure it to the bearing hub adapter 540F rather than a set of threads 503 and a set of threads 505 as described in FIG. 5I. The main purpose of this view, FIG. 7B, is to show an on-axis wire management pathway 730 for wires that can exit from the motor axle through-hole 526, which having been fed into the radial axle through-hole 524. Another access port for wire management control can be the off-axis recessed wire through-hole 572 for use an off-axis wire management pathways 734. These off-axis wire management pathways 734 and on-axis wire management pathways 730 show an embodiment providing direct access to the internal electrical components secured in the electronic component holder 700 and each of the electronic component cells 710. This view, FIG. 7B, illustrates that there is no obstruction to these off-axis wires management pathways 734 and on-axis wire management pathways 730 due to any of the components that are mounted to the motor axle 520 or motor axle 521, and a larger washer 732 can be used to secure the contents of the electronic component holder 700. Furthermore, off-axis wire management pathways 734 and on-axis wire management pathways 730, can be identical to the wire management pathways required by the motor drive assemblies 559.

Figure 7C:
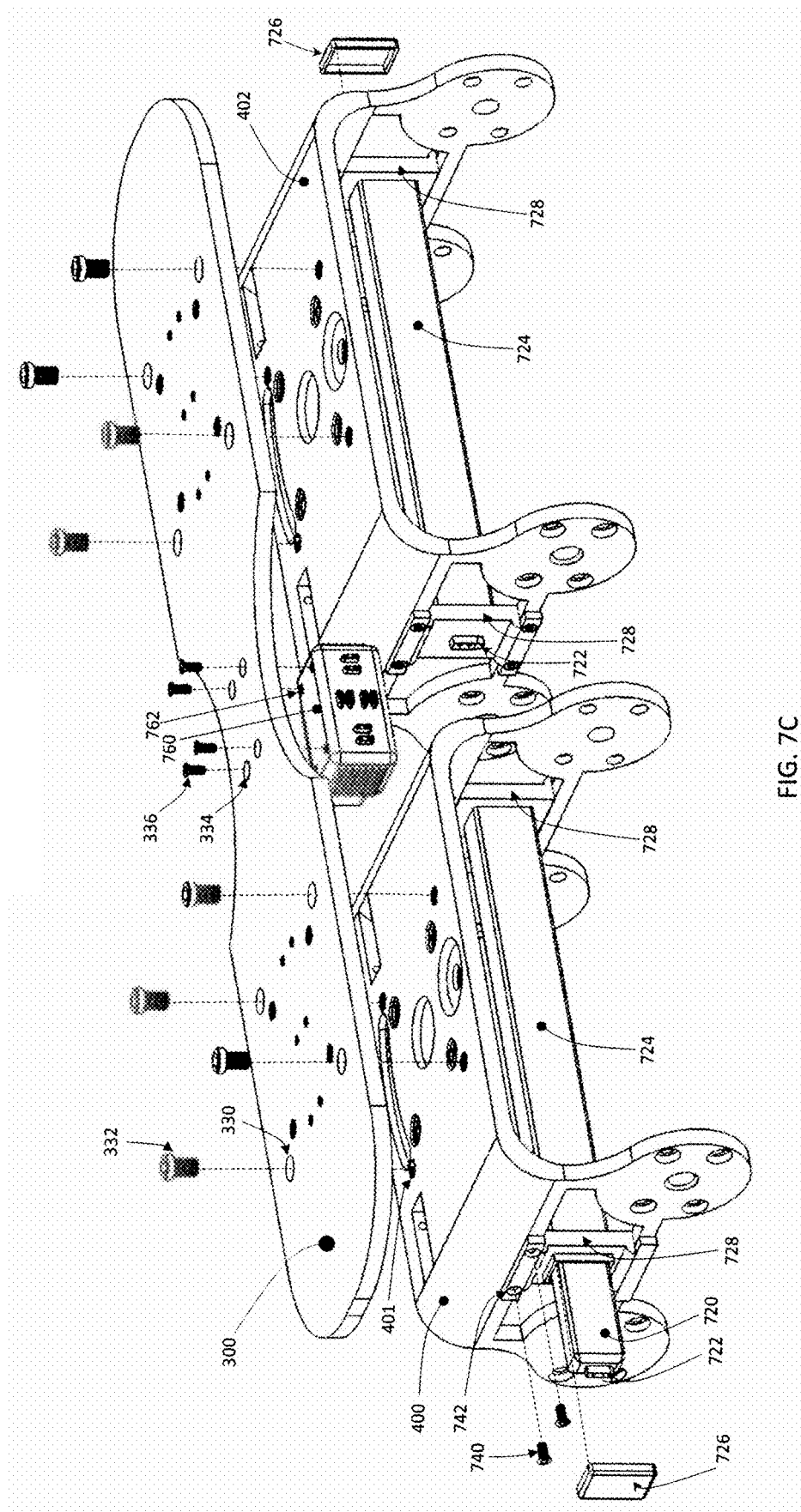
FIG. 7C is an isometric view of the right drive mounting bracket and the left drive mounting bracket to the electronic storage compartments and the battery storage compartments in the auxiliary storage compartments.

FIG. 7C is an exploded isometric view of the right drive motor mount bracket 400 and the left drive mounting bracket 402 with an auxiliary electrical component storage compartment 724 for storage of batteries 720 and any other electrical components such as commercial motor controllers (not shown). The auxiliary electrical component storage compartment 724 can be secured to the side of the right drive motor mount bracket 400 and the left drive motor mount bracket 402 by using a fastener 740 that can pass through a through-hole 742 and threaded into threaded hole 404 (not shown). The batteries 720 and other components can be secured in place by snapping an environment cover 726 onto a bulkhead 728. Depending upon which side of the auxiliary electrical component storage compartment 724, a battery connector 722 is desired to be accessed, it can be done easily as the battery connectors 722 and the environmental covers 726 are symmetrical and complementary. Also attached to the base platform 300, can be a motor control box and battery charger 760, which can be fastened to the base platform 300, for example, by fasteners 336 and passed through the countersunk through-holes 334 and attached to a threaded hole 762.

Figure 8A:
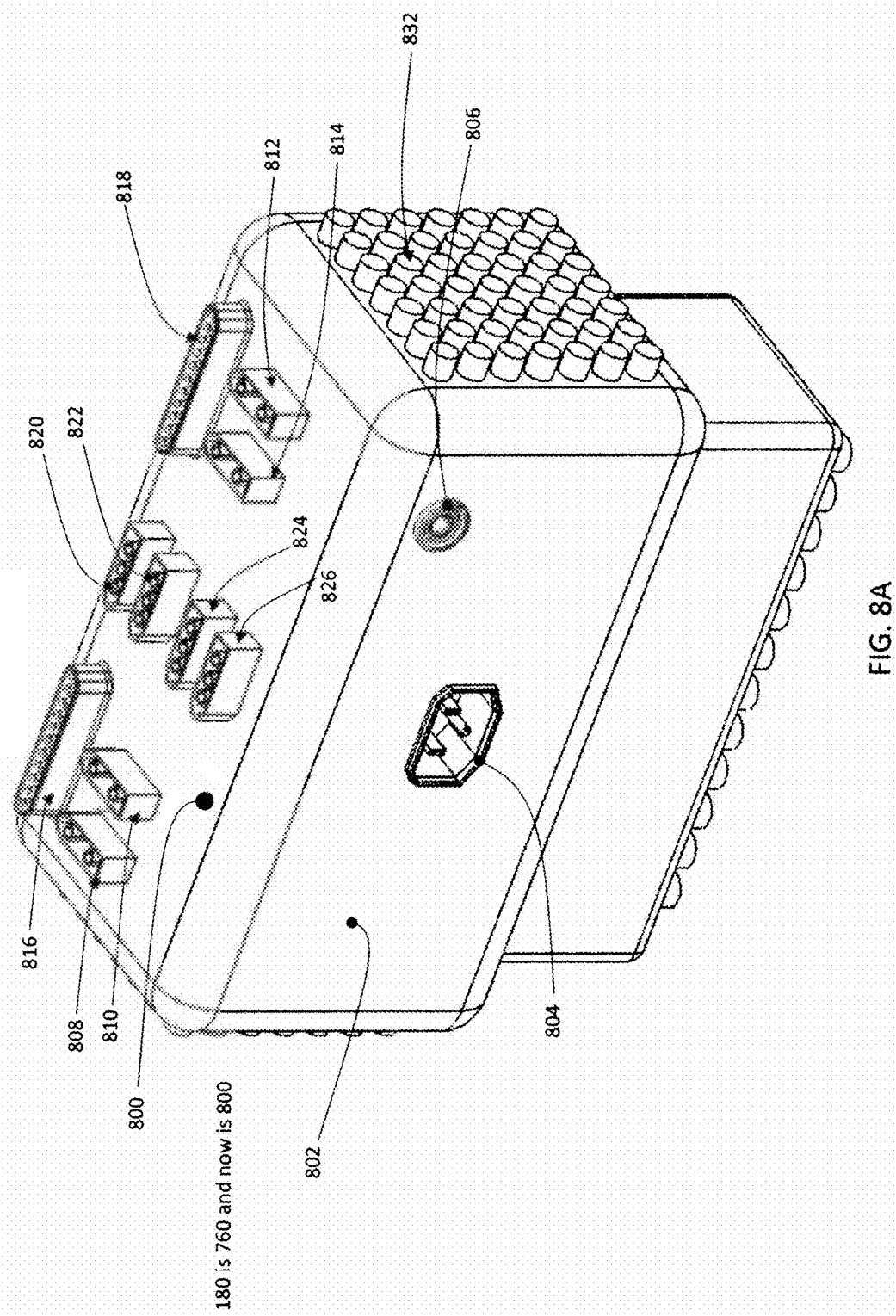
FIG. 8A is an isometric view of the electronic motor control box and battery charger showing the appropriate connectors for the sensor array, batteries, motors, and electrical connections for charging batteries.

FIG. 8A is an off-axis underside view of an electronic motor control box and battery charger 800 (similar to the motor control box and battery charger 760 described earlier herein with regard to FIG. 7C). The front face the electrical motor control box and battery charger 800 can comprise a motor controller connector 816, which can control or can be utilized as an input for right control sensor configuration 298, for example, by using the sensor wires 288w and 286w, as seen in FIG. 2C, and can be used for the right foot control panel 200. A connector 818 can be used for the left foot controller platform 202, which can control or be utilized as an input for the left foot control sensor assembly 297. A connector 808 and a connector 810 can be used for batteries 720 stored in the electrical component holder 710 or in auxiliary electrical component storage compartment 724. A connector 812 and a connector 814 can be used to connect the batteries 720 stored in the electrical component cell 710 or in the auxiliary electrical component compartment 724. A connector 820 and a connector 822 can be used used to connect the motor drive assemblies 559, connected to the right drive mounting brackets 400. A connector 824, and a connector 826 can be used to connect the motor drive assemblies 559 attached to the left drive mounting brackets 402. The bottom surface 802 of the electronic motor control box and battery charger 800 can comprise a provision for an electrical AC connector 804, as well as, a DC electrical connector 806. For thermal management, a radiating surface 832 can be provided to increase the surface area and allow for accelerated radiation cooling.

Figure 8B:
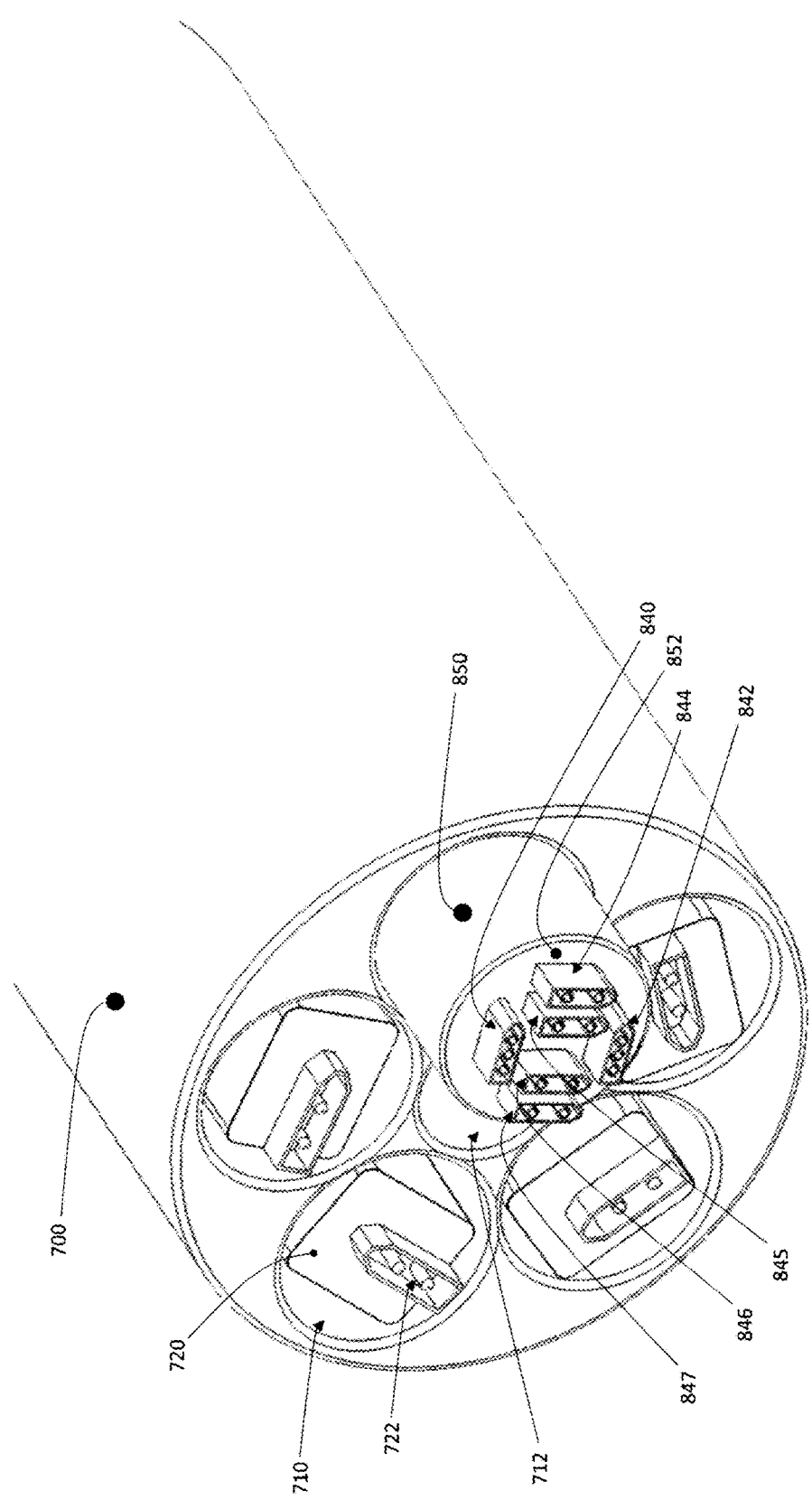
FIG. 8B is an isometric view of a section of the electrical component holder showing the component holes filled with batteries, an electronic controller, and battery management cylinder.

A unique holder for batteries and/or electronics controllers that can be used for personal motorized platforms 100 is illustrated in FIG. 8B. FIG. 8B is a partial isometric view of a section of the electronic component holder 700 showing the component recesses 710 with batteries 720 (four shown) and an electronic motor controller with a battery management cylinder 850. There can be electrical connectors on a front face 852 of the electrical motor controller and battery management cylinder 850, which can be a battery connector 844, a backup right battery connector 845, a left battery connector 846, and backup left battery connector 847. The motor controller connectors can comprise a right motor controller connector 840 and a left motor controller connector 842. These devices can be connected to their respective components either with connectors or hardwired and soldered. Also shown in FIG. 8B is an axle through-hole 712 and the battery connector 722.

Figure 8C:
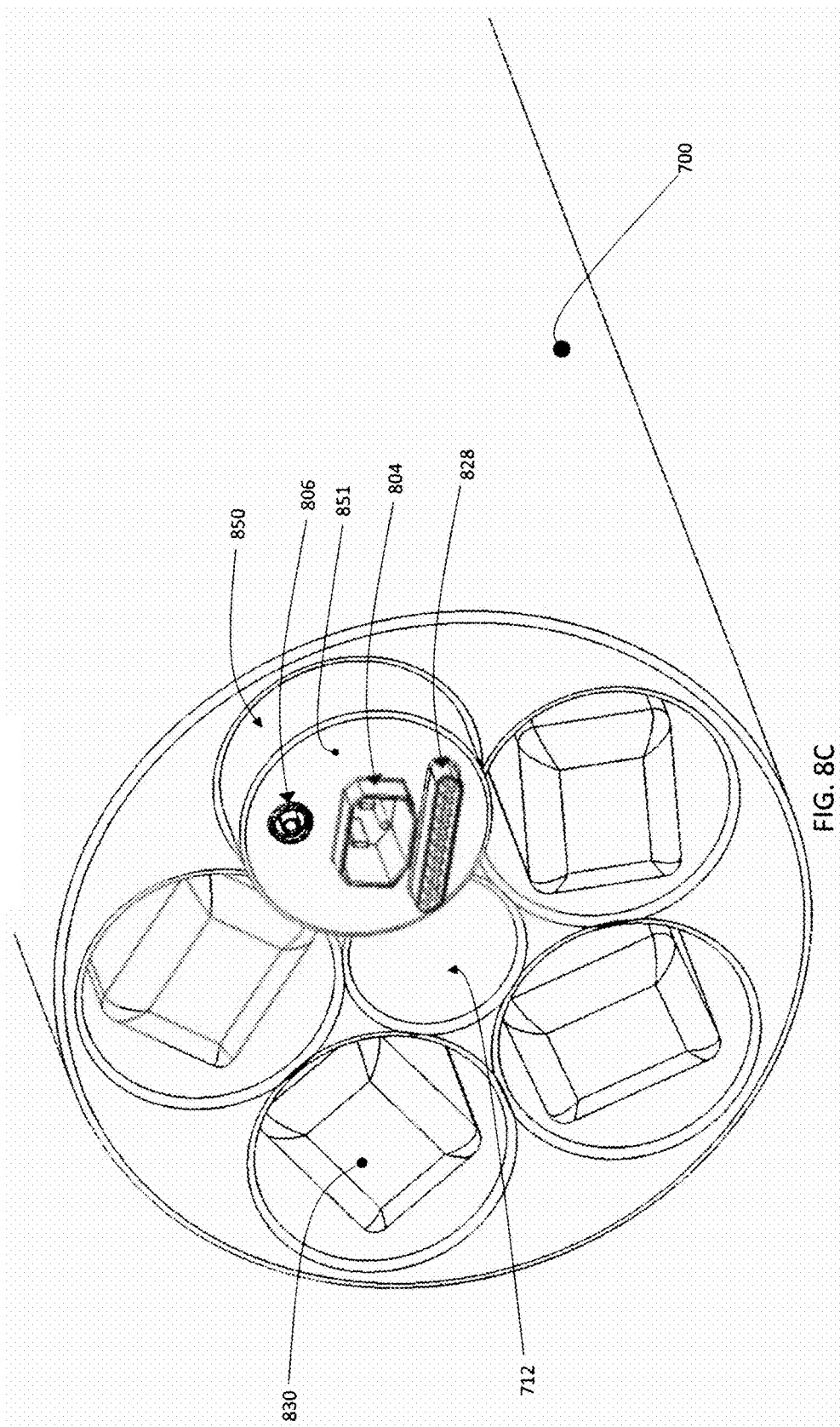
FIG. 8C is an isometric view of the opposite end of the electronic component holder showing the battery backs, the electronic component controller, and the battery charger with the electrical connections for AC or DC charging, as well as, an electrical connector used for motor controlling and sensor input.

FIG. 8C is a partial isometric view of the opposite end of the electronic component holder 700 showing a battery backs 830 and the back of an electronic component controller and battery charger 851 with an electrical DC connector 806 for direct current charging, and a connector 804 for connecting to alternating current. A connector 828 can be the input from the foot control platform either 200 or 202 as shown in FIG. 2C. Also shown is the other end of the axle through-hole 712.

Figure 9A:
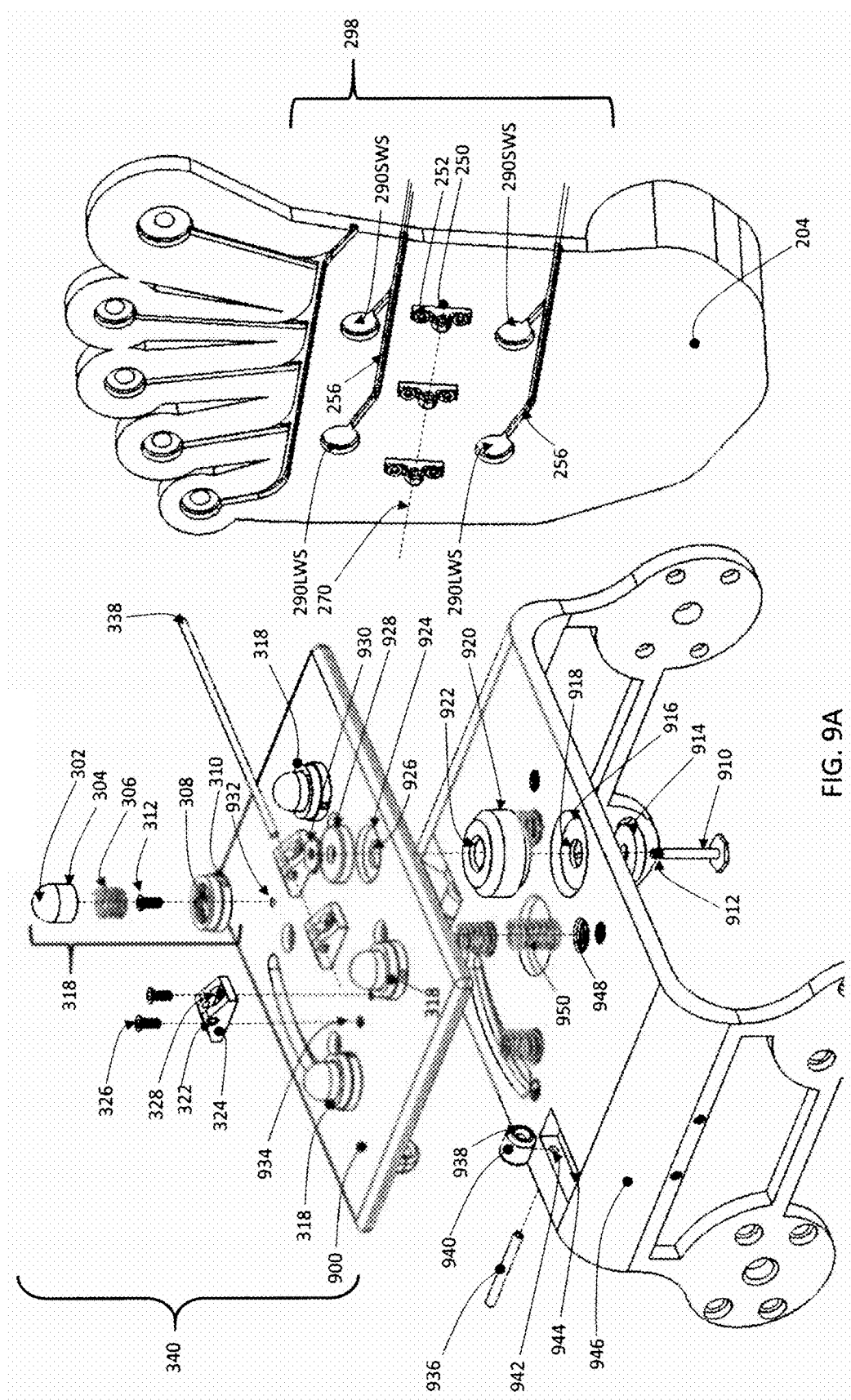
FIG. 9A is an exploded isometric view of components attached to the right drive mounting bracket and the right foot control platform assembly.

A slightly more complex and more versatile variation of the personal motorized device 100 is illustrated in FIG. 9A, which is an exploded isometric view of the components attached to a right drive mounting bracket 946 (similar to the right drive motor mount bracket 400 discussed above with regard to FIG. 4A). Also shown in this view of FIG. 9A is the bottom view of the right foot control platform 204 with the control sensor configuration 298. A control platform 900 can comprise, connected to its top surface, an array of suspension assemblies 318 (four shown), that can be secured to the control platform 900 with a fastener 308, which can pass through a through-hole 310 in the piston base 312, and can screw into a threaded-hole 932. Contained within the piston body 304, can be a spring 306 or an elastomer acting like a spring. A piston top 302 can interact with an one or more sensors, for example an array of sensors comprising sensor 290LWS and short wire sensor 290SWS as part of the bottom right foot control panel assembly 298. There can be main hinge knuckles 324 (three shown) secured to the control platform 900 with fasteners 336 that can pass through knuckle through-holes 328 and screw into a threaded hole 934 of the control platform 900. The bottom view of the bottom right foot control platform 204 with the control sensor configuration 298 can comprise the minor hinge knuckles 250 secured to the main knuckles 324, with a hinge rod 338, passes through the hinge axle through-hole 322 to the axis of rotation 270, which can be coincident with the minor hinge knuckles 250 and the main hinge knuckles 324.

The control platform 900 can be connected to the right drive mounting bracket 946 with a kingpin 910, which can pass through a lower bushing 914, a through a through-hole 918 of the right drive mounting bracket 946, through a main resilient bushing 920, through a through-hole 926 of the control platform 900, and secured in place with a locking nut 930 on a threaded end 912 of the kingpin 910, and through a top bushing 928 that resides in a bushing recess 924, which can securely holds the two surfaces together, but can allow freedom or oscillatory motion about the main resilient bushing 920, that resides in a recess 916, and the kingpin 910. The right drive mounting bracket 946 can comprise a threaded spring retaining hole 948 for attaching a spring 950 at multiple locations (four shown). These springs 950 can keep the control platform 900 symmetrically balanced above the right drive mounting bracket 946 and compensate the oscillatory motion about the main resilient bushing 920 and the kingpin 910.

Figure 9B:
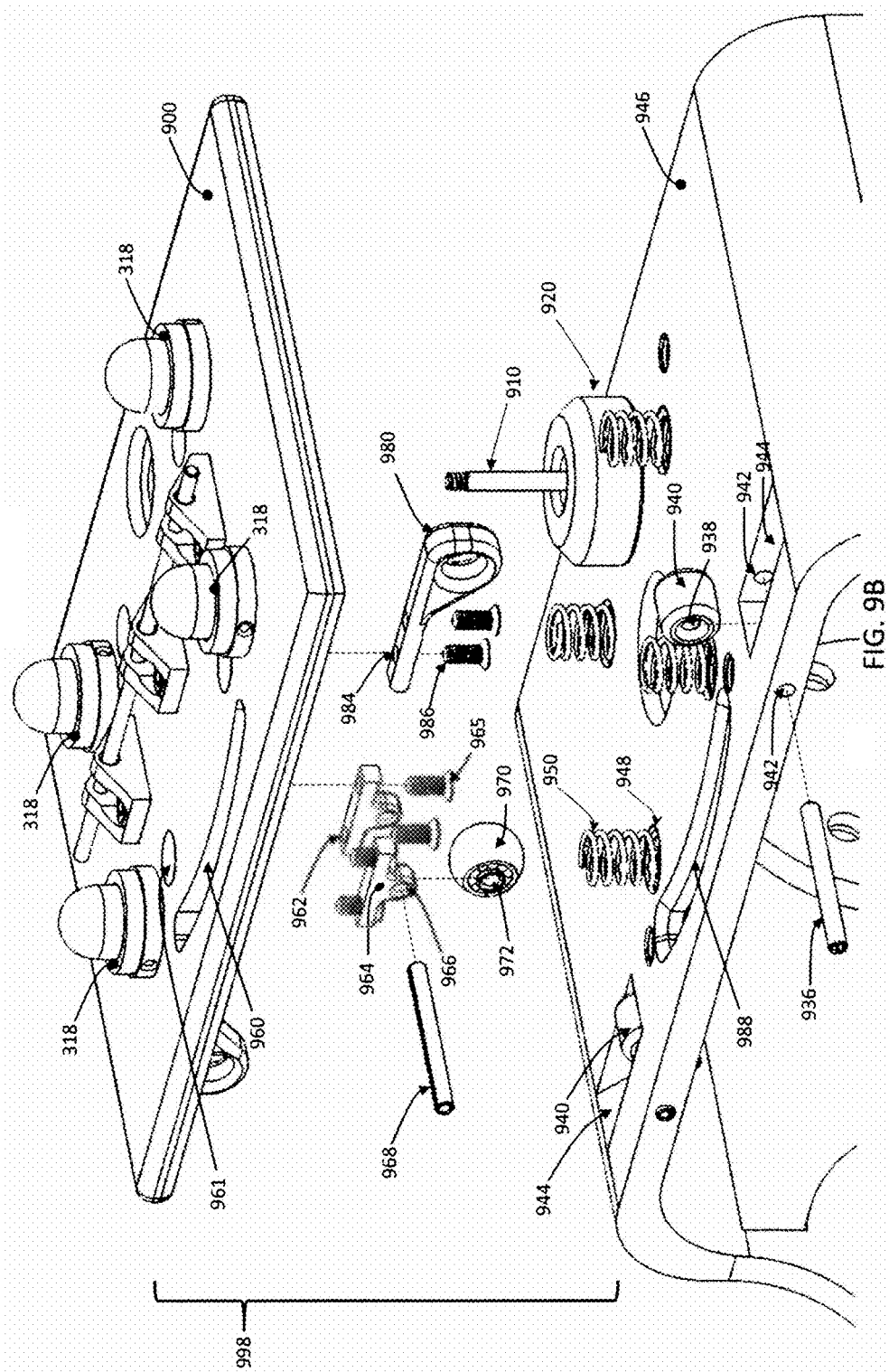
FIG. 9B is an exploded slightly off-axis isometric rear view of the right drive mounting bracket showing the support and control mechanisms that are used to maneuver another personal motorized device.

FIG. 9B is an exploded isometric view of the rear of the right drive mounting bracket 946 showing the rear support mechanisms, which can be a roller bearing 940 rotating about a roll pin 936 mounted through a bearing through-hole 938, and inserted into a through-hole 942. The roller bearing 940 can reside in a cut out region 944 that accommodates a steering wedge 980 when the control platform 900 is properly secured. The steering wedge 980 can be secured to the underside of the control platform 900, for example, with a fastener 986 that passes through a through-hole 984 of the steering wedge 980. To the underside of the control platform 900 can be moveably connected to the mounting bracket 946, for example, through any known means. In the embodiment shown, the moveable connection is achieved through a roller ball bearing 970, which can ride in a chamfered radial slot 988 formed in the top surface of the right drive mounting bracket 946 with an option to use a larger roller ball bearing 970 that can engage the chamfered radial slot 988 and a chamfered radial slot 960 on the underside of the control platform 900.

The roller ball bearing 970 can be attached to a roll pin 968 serving as its axis of rotation. It can be pushed through a hinge knuckle through-hole 966 of a hinge knuckle 964, as well as, a bearing through-hole 972 when the roller ball bearing 970 is in its functioning position. The hinge knuckles 964 can be secured to the underside of the control platform 900 with a fastener 965 that passes through a fastener through-hole 962. A threaded spring retaining hole 948 can secure the springs 950 (four shown) in place in the base of the right drive mounting bracket 946. When the control platform 900 is lowered onto the springs 950 and secured in place with locking pin 963 (not shown) by pulling part of the spring 950 partially through a countersunk through-hole 961, it can prevent the control platform 900 from separating too far from the right drive mounting brackets 946. The components attached to the underside of the control platform 900 and on top of the right drive mounting bracket 946 can form a steering assembly 998.

Figure 9C:
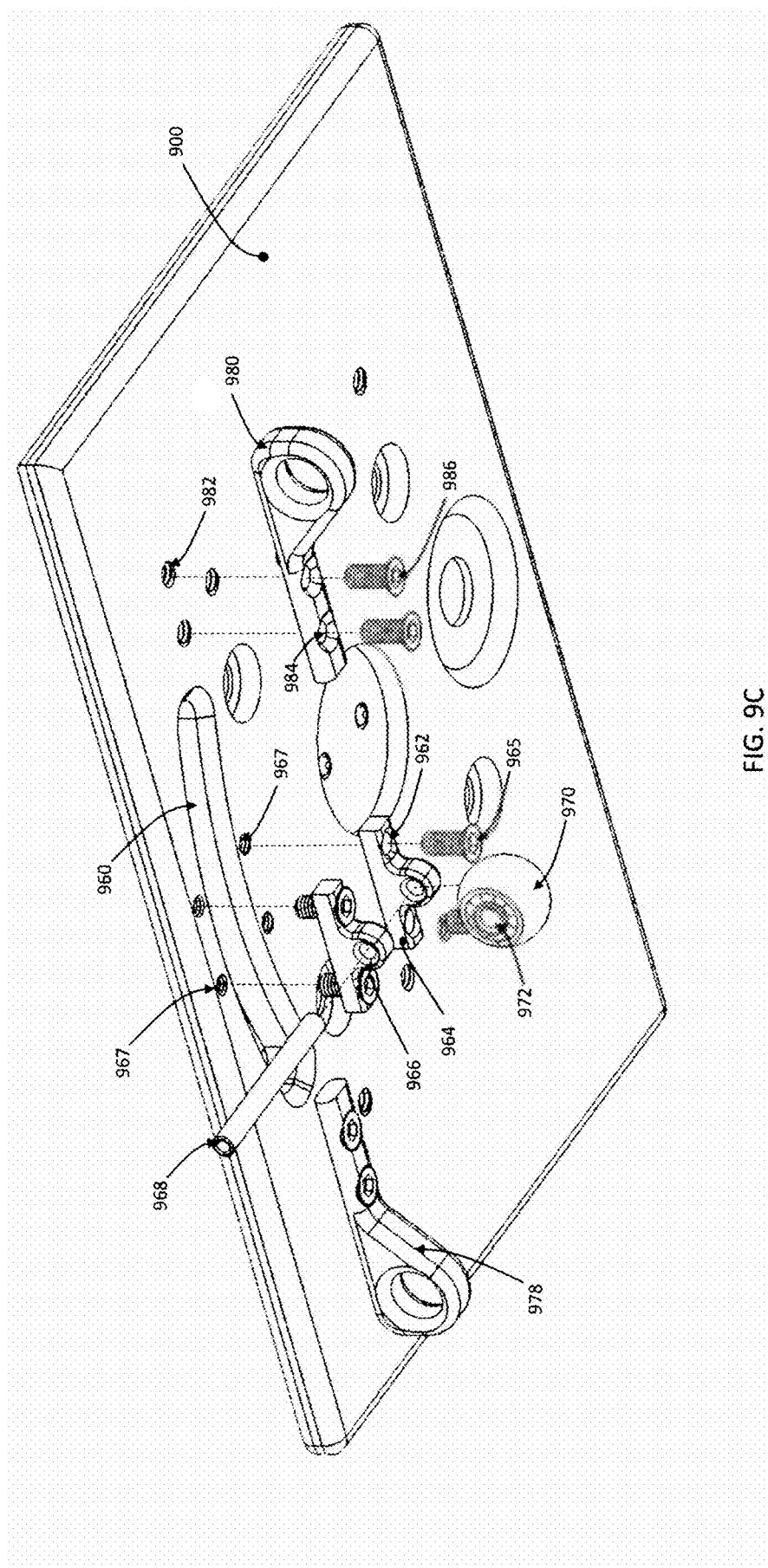
FIG. 9C is an off-axis underside view of the components control platform and the method of attachment, including a new device, the roller ball bearing, and a steering wedge.

FIG. 9C is an off-axis underside exploded view of the control platform 900 and the components that can be secured to the underside. The roll pin 968 can be inserted into the hinge knuckle through-hole 966 of the first hinge knuckle, then through the through-hole 972 of the roller ball bearing 970, and then through the second hinge knuckle through-hole 966 of the hinge knuckles 964. The roller ball bearing 970 can rotate about the roll pin 968 and can be firmly secured to the bottom of the control platform 900 by the hinge knuckles 964. The hinge knuckles 964 can be attached to the underside of the control platform 900 with the fastener 965 that can pass through the fastener through-hole 962 of the hinge knuckle 964, and screw into a threaded hole 967 on the bottom or underside of the control platform 900. The steering wedge 980 can be fastened to the underside of the control platform 900 with the fasteners 986, then can pass through the through-holes 984, and into a threaded hole 982 in the bottom or underside of the control platform 900. The steering wedge 980 can comprise an inclined surface 978 that can interact with the roller bearing 940 shown in FIG. 9B.

Figure 9D:
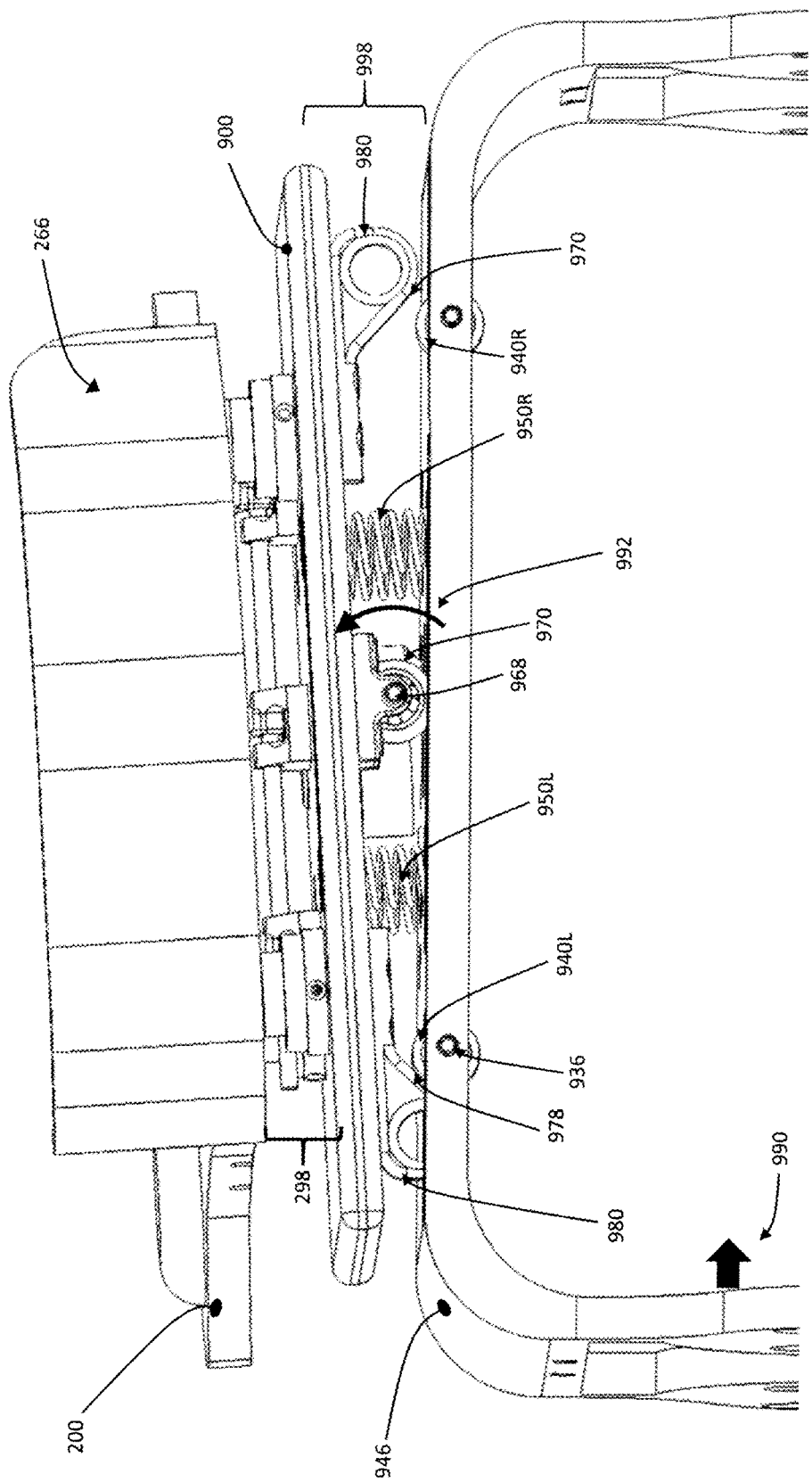
FIG. 9D is a rear view of the right drive mounting bracket with the control platform depicting the steering action induced by rotating the right foot control platform or leaning on this platform in a left direction, which shows the interaction of the steering wedge, the roller ball bearing, and the suspension springs.

Maneuverability is shown in FIG. 9D, which is a rear view of the right drive mounting bracket 946 with the control platform 900 depicting the steering action inducted by rotating the right foot control platform 200 to the left direction. This steering action can cause rotation of the control platform 900 causing the steering wedge 980 to apply force on the left roller bearing 940L by application of force on the steering wedge 980 at the incline surface 978 meeting the roller bearing surface 940L. The right drive-mounting bracket 946 can be pushed in the opposite direction causing the motion of the rear of the right drive-mounting bracket 946 to move in the direction of the arrow 990. By the action of the roller ball bearing 970, there can be a greater force pushing the right drive-mounting bracket 946 in the direction of the arrow 990, causing more rotation.

The suspension springs 950L are compressed due to the rotation and the suspension springs 950R are extended to give stability to the control platform 900. The greater the angle of inclination or rotation as indicated by the arrow 992, the greater is the deflection in the direction of the arrow 990. All of this motion is assuming that the platform itself is moving or biased in the forward direction. The combination of the components between the control platform 900 and the right drive-mounting bracket 946, henceforth, referred to as steering assembly 998; for reference, refer to FIG. 2C and FIG. 2D. The forward and backward motion of the right drive-mounting bracket 946 can be controlled by forces applied to the sensors that can be located on the bottom side of the bottom right foot control platform 204, which can be the right control sensor assembly 298. When the foot is rotated forward, the forward sensor array 230 can generate the appropriate generic sensor response to move forward. Conversely, when the riders' foot is rotated to the rear by the action of the hinge assemblies, the rear sensor array 232 can generate the appropriate generic response to move in the backward or rear direction. A generic response may refer to a commercial sensor that can generate a voltage response, a resistance response, or a capacitive response to the induced force on the sensor. The components attached to the underside of the control platform 900 and on top of the right drive-mounting bracket 946 can form the steering assembly 998.

Figure 9E:
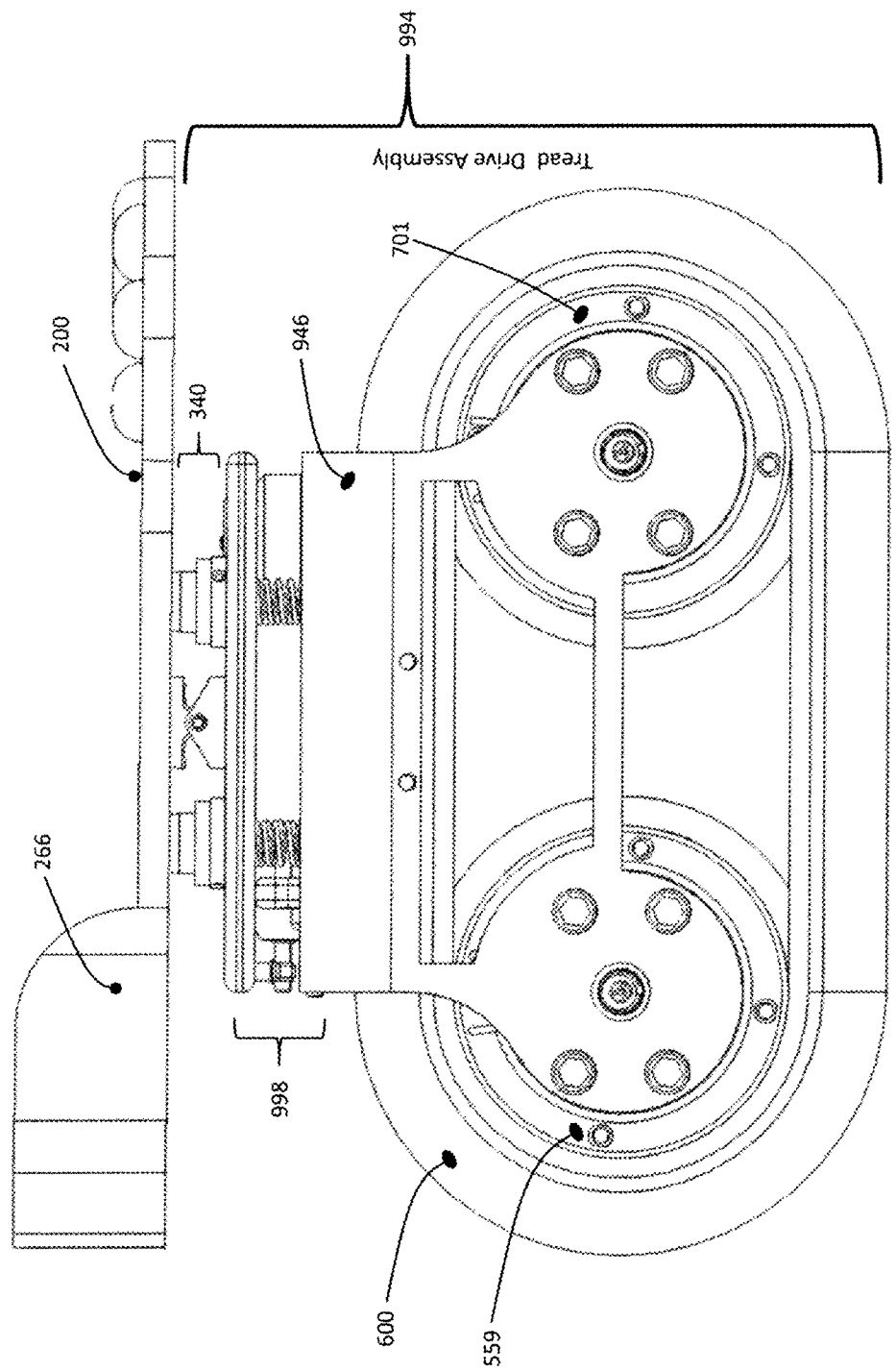
FIG. 9E is a side view of the right drive mounting bracket, the drive assembly, the electrical drive assembly, the tread assembly, the right foot control platform profile, and the suspension and steering assemblies.

A versatile configuration using a tread 600 mounted on, or otherwise connected to the two motor drive assemblies 559 is illustrated in FIG. 9E. FIG. 9E is a side view of the right drive mounting bracket 946, the motor drive assembly 559, the electrical hub assembly 701, the tread 600, the right foot control platform profile 200, the two suspension array assemblies 340, and the steering assembly 998. This configuration shows a tread drive assembly 994.

Figure 9F:
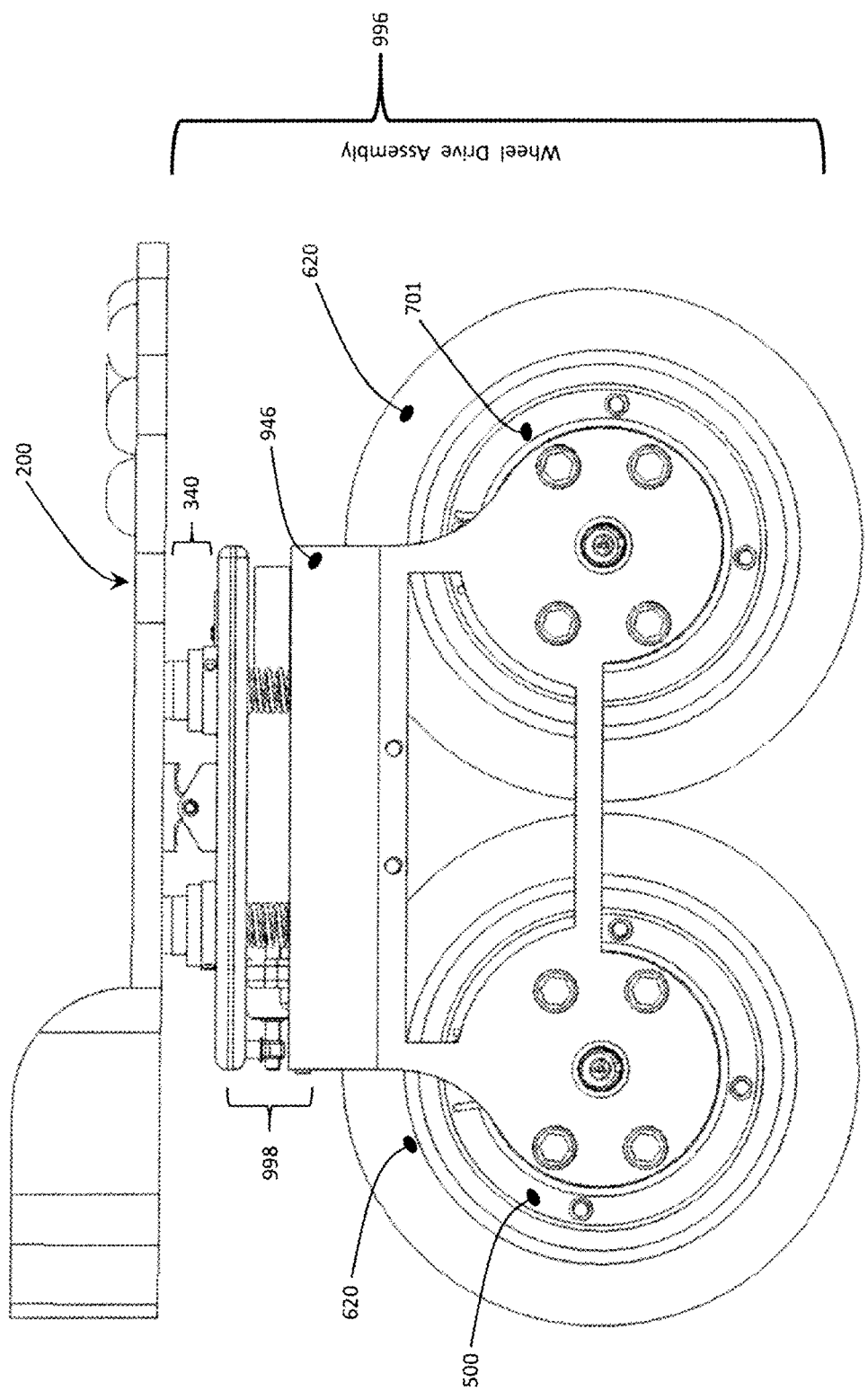
FIG. 9F is a side view of the right drive mounting bracket, the drive assembly, the electrical drive assembly, the wheel assembly, the right foot control platform profile, the two suspension systems along with the steering assembly.

Another highly mobile configuration using two wheels 620 mounted on two motor drive assemblies 559 is illustrated in FIG. 9F, which is a side view of the right drive mounting bracket 946, the motor drive assembly 559, the electrical hub assembly 701, the wheel 620, the right foot control platform 200, the two suspension array assemblies 340, and the steering assembly 998. This configuration shows a wheel drive assembly 996.

A set of motorized assemblies which are aligned, for example, resembling a style of in-line skates or inline-treads, is illustrated in FIG. 9G, which is an off-axis end on view of two separate motorized assemblies, a right mobilized assembly 902, and a left motorized assembly 904. The right motorized assembly 902 and the left motorized assembly 904 can share the same common right drive mounting bracket 946, henceforth, is referred to as a common mounting bracket 908.

One difference between right motorized assembly 902 and the left motorized assembly 904 is that the foot platforms can comprise a left foot platform and right foot platform associated with them. Otherwise, they can function identically. The rotation of the right foot control platform 200 with the toes pointed downward suggests the motion is in the forward direction. Whereas, the rotation of the left foot control platform 202 with the toes in the upward direction indicates the reverse direction. This is occurring without any use of the steering assembly 998. However, when performing as a set of rollerblades, roller skates, or roller treads, the right motorized assembly 902 and the left motorized assembly 904, can perform a coordinated turn by simply leaning in one direction for gradual turns. This configuration can automatically cause the steering assembly 998 to track the leaning motion of the rider. There are commercial speed control devices that can synchronize speeds of the right motorized assembly 902 and the left motorized assembly 904.

Figure 9H:
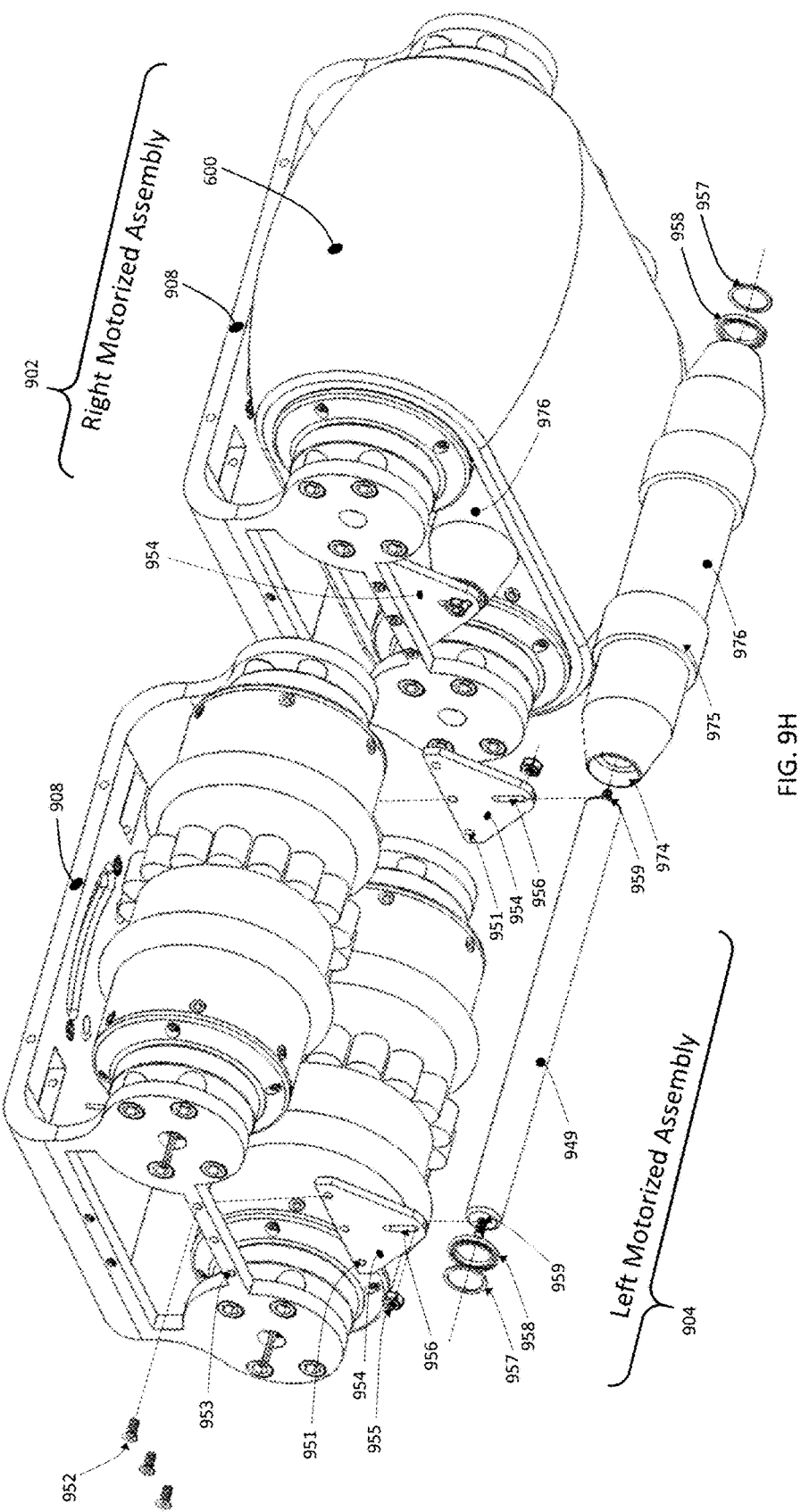
FIG. 9H is an off-axis underside view of the partially exploded left motorized assembly without a tread, and the right motorized assembly with a tread.
Figure 91:
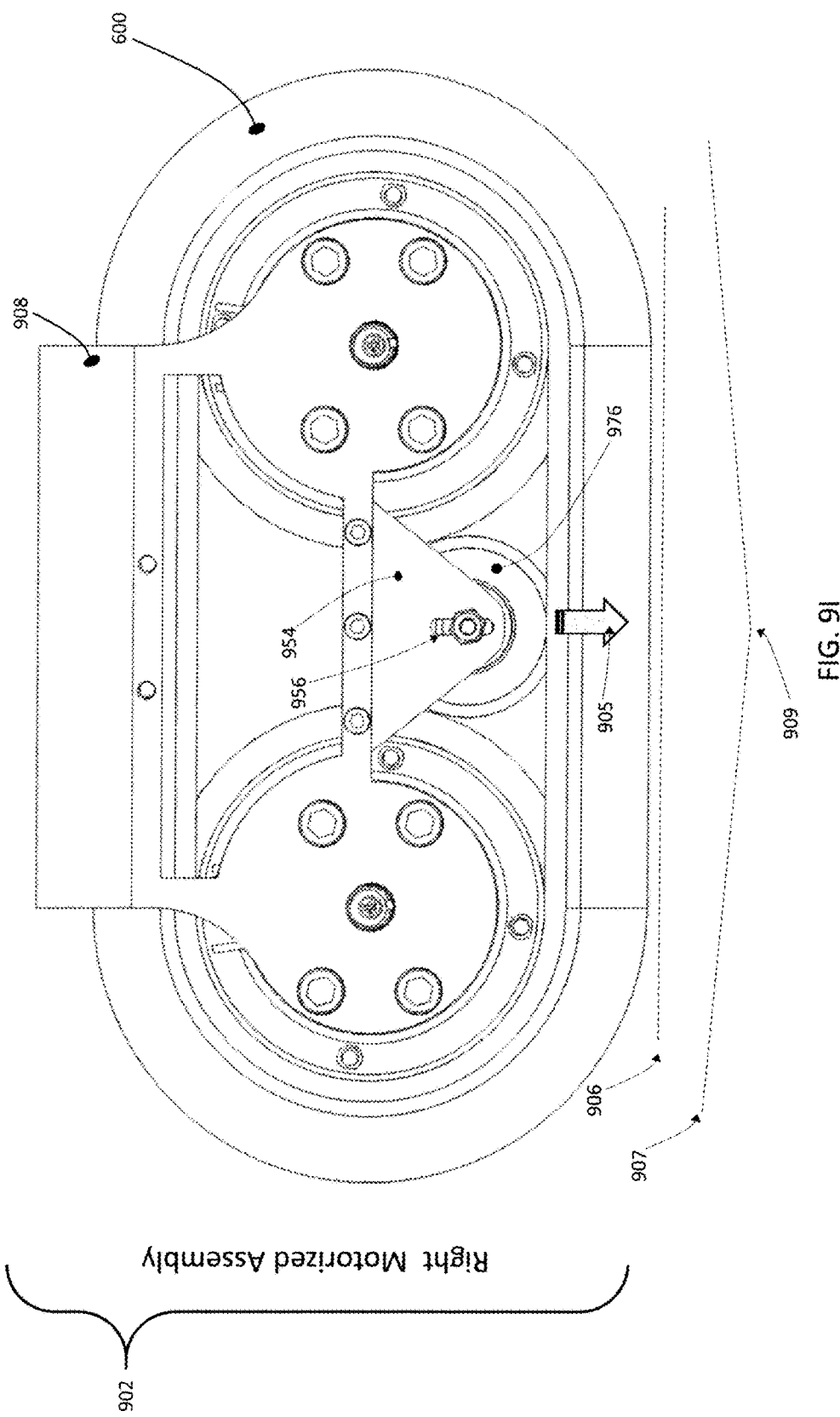

FIG. 9H is an off-axis underside view of the partially exploded left motorized assembly 904 without a tread 600 and the right motorized assembly 902 with a tread 600. The partially exploded view of the left motorized assembly 904 reveals a tread pressure roller 976 with a bearing recess 974 for a bearing 958 and a bearing spacer 957. These components can be slid onto a tread pressure axle 949 and fastened to a pressure axle bracket 954 by sliding a threaded end 959 through a slotted through-hole 956 and secured with a locking-nut 955. The pressure axle bracket 954 can be fastened to the common motor bracket 908 with a fastener 952 that can pass through a through-hole 953 and into a threaded hole 951 on the top of the pressure axle bracket 954. There can be one or more raised bosses (two shown) that serve as a tread guide 975 on the outside circumference of the tread pressure roller 976, which can ride in the circular recess 624 of the tread 600 as shown in FIG. 6A, to assist in maintaining the tread 600 from sliding off of the motor drive assembly 559 as seen in FIG. 5I. The tread guides 975 are cylindrical in shape rather than circular to minimize the size and eliminate interference with other structures because of the compactness of the assembly.

The right motorized assembly 902 illustrates the operational position of the tread pressure roller 976 and its function is to maintain a certain profile for riding and turning purposes that are described in FIG. 9I.

FIG. 9I is a side view of the right motorized assembly 902 with the tread pressure roller 976 being lowered in the direction of an arrow 905 indicating the deformation point. A straight line 906 indicates normal pressure is placed onto the tread 600 by the pressure roller 976. If greater downward pressure is placed on the tread pressure roller 976, the tread 600 can deform and comprises a profile as indicated by a line deformation 907. This deformation line 907 can form a riding vertex 909. The riding vertex 909 can minimize the straight length of tread 600, which can reduce the pivot radii and increases the maneuverability.

Figure 10A:
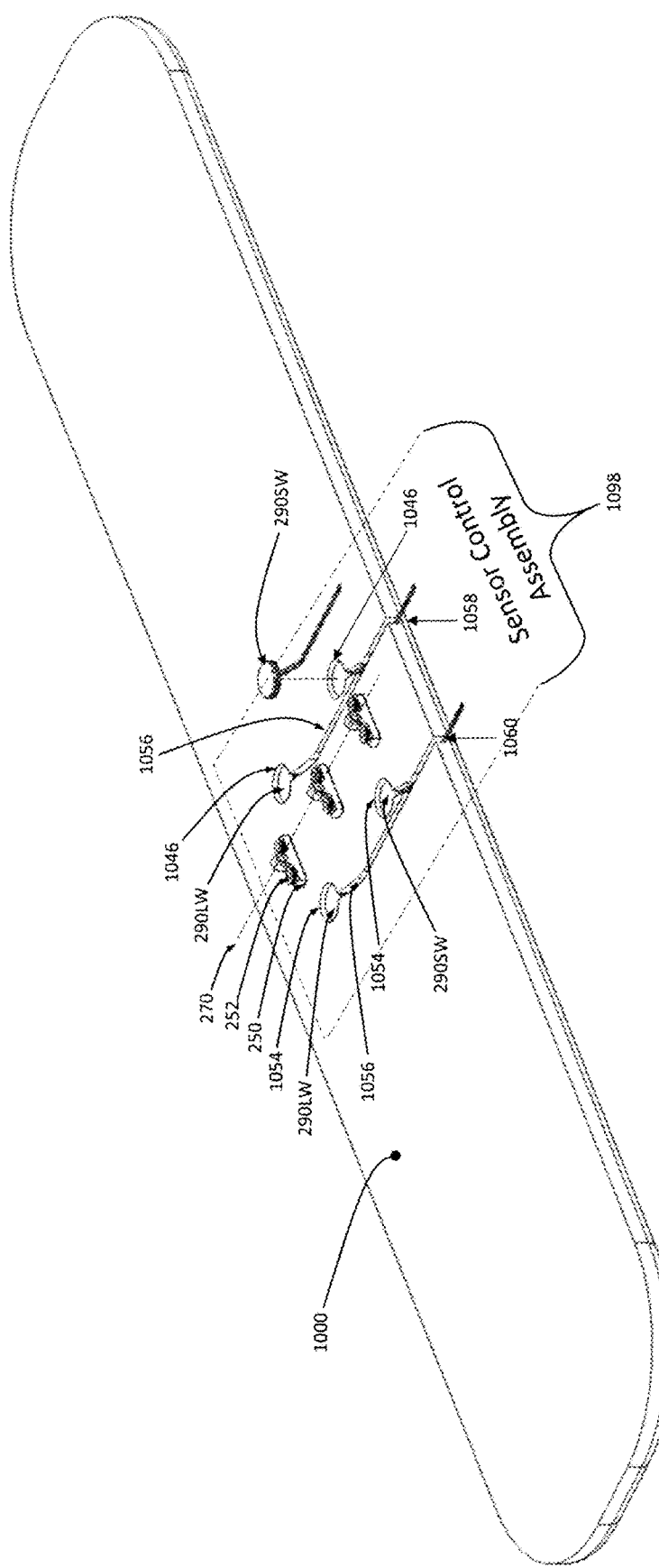
FIG. 10A is an underside isometric view of the rider platform showing its analogous configuration to the right or left foot control platforms with the sensor control configuration defined and registered to the minor hinge knuckles fastened to the underside in similar fashion to the left or right foot control platforms.

A new style of skateboard is illustrated in FIG. 10A, which is an underside isometric view of a rider platform 1000, which can be similar to base platform 110 discussed with regard to FIG. 1A herein. This rider platform 1000 is analogous to the bottom right foot control platform 204 and the bottom left foot control platform 206, as seen in FIG. 2C and FIG. 2D. A sensor control assembly 1098 (similar to control platform assembly 298 described with regard to FIG. 2C above), is defined for the rider platform 1000 by one or more sensor wells (two shown), a sensor well 1046a and a sensor well 1046b. The sensor well 1046b can contain the long wire sensor 290LWS sensor and the sensor well 1046b contains the short wire sensor 290SWS.

All sensors can comprise a set of output wires, an anode wire 286W, and a cathode wire 288W routed in the wire guide channel 1052; the wires can exit through a sensor wire channel 1058. A second series of sensor wells (two shown), a sensor well 1054a and a sensor well 1054b, a sensor wire routing channel 1052, and a sensor wire exit channel 1060 can also be utilized. The sensor well 1054a can contain a long wire sensor 290LWS sensor and the sensor well 1054b can contain a short wire sensor 290SWS. All sensors can comprise a set of output wires, an anode wire 286W, a cathode wire 288W, and they all exit through the sensor wire channel 1060. Part of the sensor control assembly 1098 is the incorporation of the minor hinge knuckles 250 to the bottom of the rider platform 1000 and the securing them in place with the fastener 252. The minor knuckles 250 (three shown) on the underside of the rider platform 1000 rotate about an axis of rotation 270, as illustrated in FIG. 2C. These components, defined by the dashed line, henceforth are referred to as the sensor control assembly 1098.

Figure 10B:
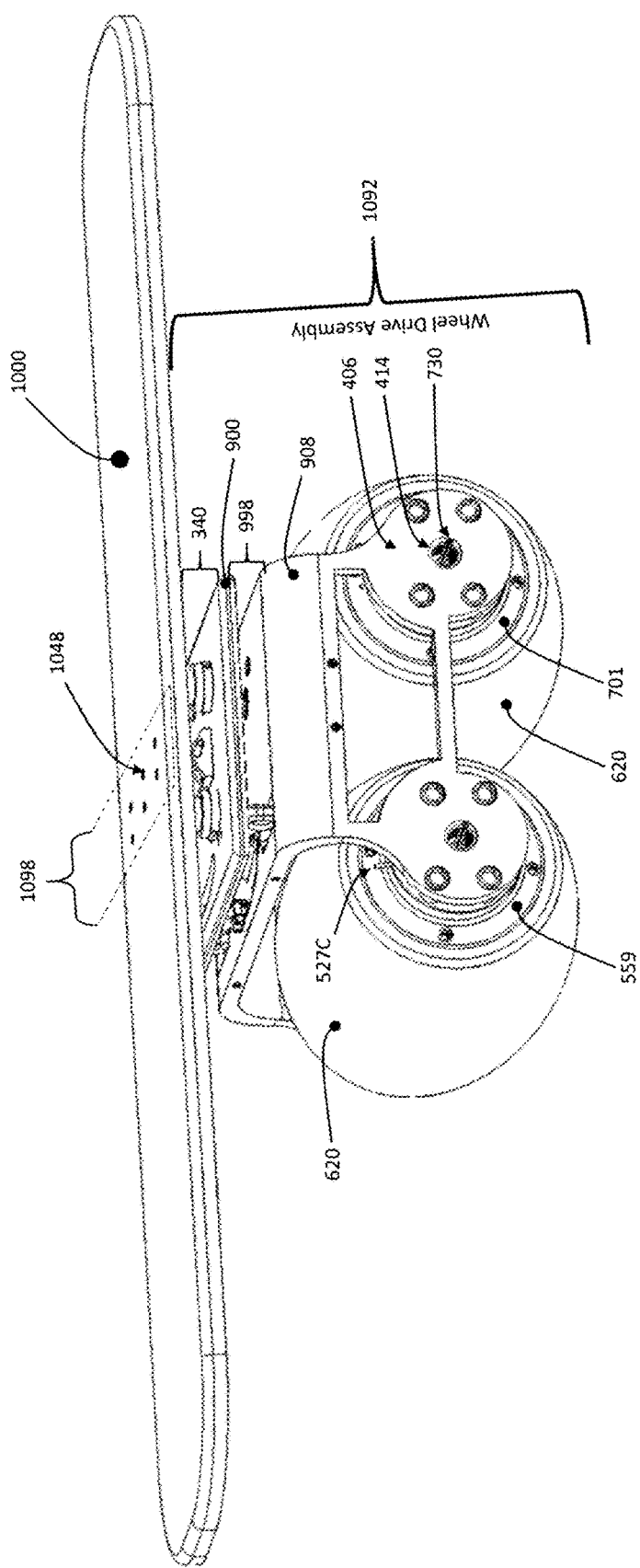
FIG. 10B is a slightly elevated off-axis side view of the rider platform attached to the wheel drive assembly showing the two wheels, one drive hub, one electrical drive hub, and how it is attached.

FIG. 10B is a slightly elevated off-axis side view of the rider platform 1000 attached with a wheel drive assembly 1092 (similar to a wheel drive assembly 996 described above with regard to FIG. 9F). One wheel 620 can be attached to the motor drive assembly 559 and the other wheel 620 can be attached to the electrical hub assembly 701. The wheel drive assembly 1092 can operate in the same fashion as the left foot motorized assembly 904 or right foot motorized assembly 902. The sensor control assembly 1098 with the suspension assembly array 340 can rely on the steering assembly 998 for maneuvering. The electrical hub assembly 701 can provide the necessary motor control via the off-axis wire management pathway 734 (not shown), through which pass the winding wires 527A (not shown), 527B (not shown), and 527C. Power distribution can be controlled with the various on-axis wire management pathways 730. Additional connections can be made to external sources through the off-axis wire management pathway 734 and on-axis wire management pathways 730 as well. For example, battery packs can be worn on a belt or in a knapsack, along with commercial motor controller and a remote control, to connect to the internal components through these wire management pathways.

Figure 10C:
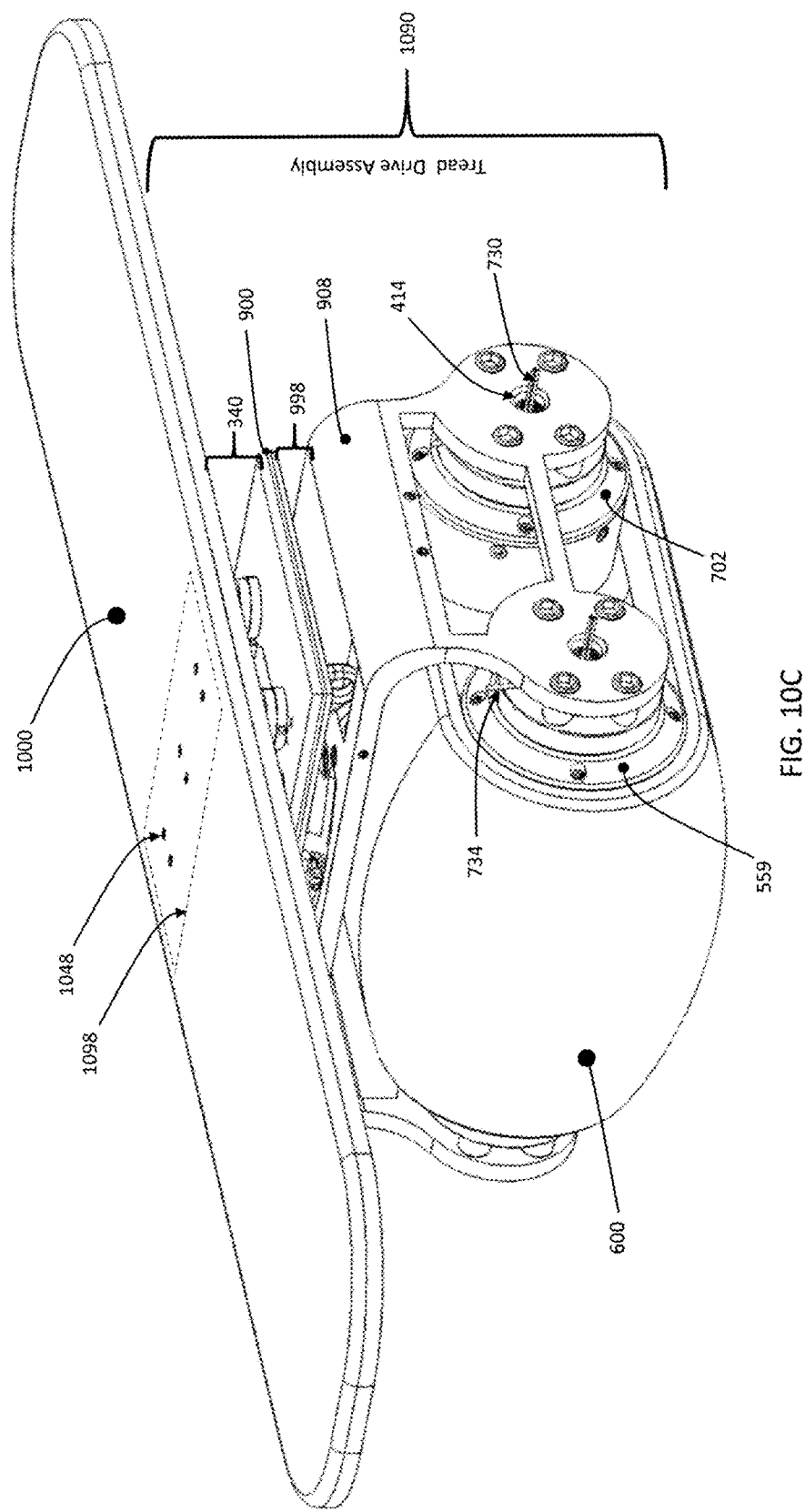
FIG. 10C is a slightly elevated off-axis view of the tread drive assembly mounted under the new rider board showing the tread mounted on the motor drive hub accompanied by the electrical drive hub.

FIG. 10C is an isometric rear view of a tread drive assembly 1090 propelled by the motor drive assembly 559 with the tread 600. The sensor control assembly 1098, is indicated by the dotted lines, is mounted on the underside of the rider platform 1000 with a hinge mounting assembly 1048. The rider platform 1000 can rest on the suspension array assembly 340, fastened to the control platform 900, which can use the steering assembly 998 attached to the common mounting bracket 908, as shown in FIG. 9G.

Figure 10D:
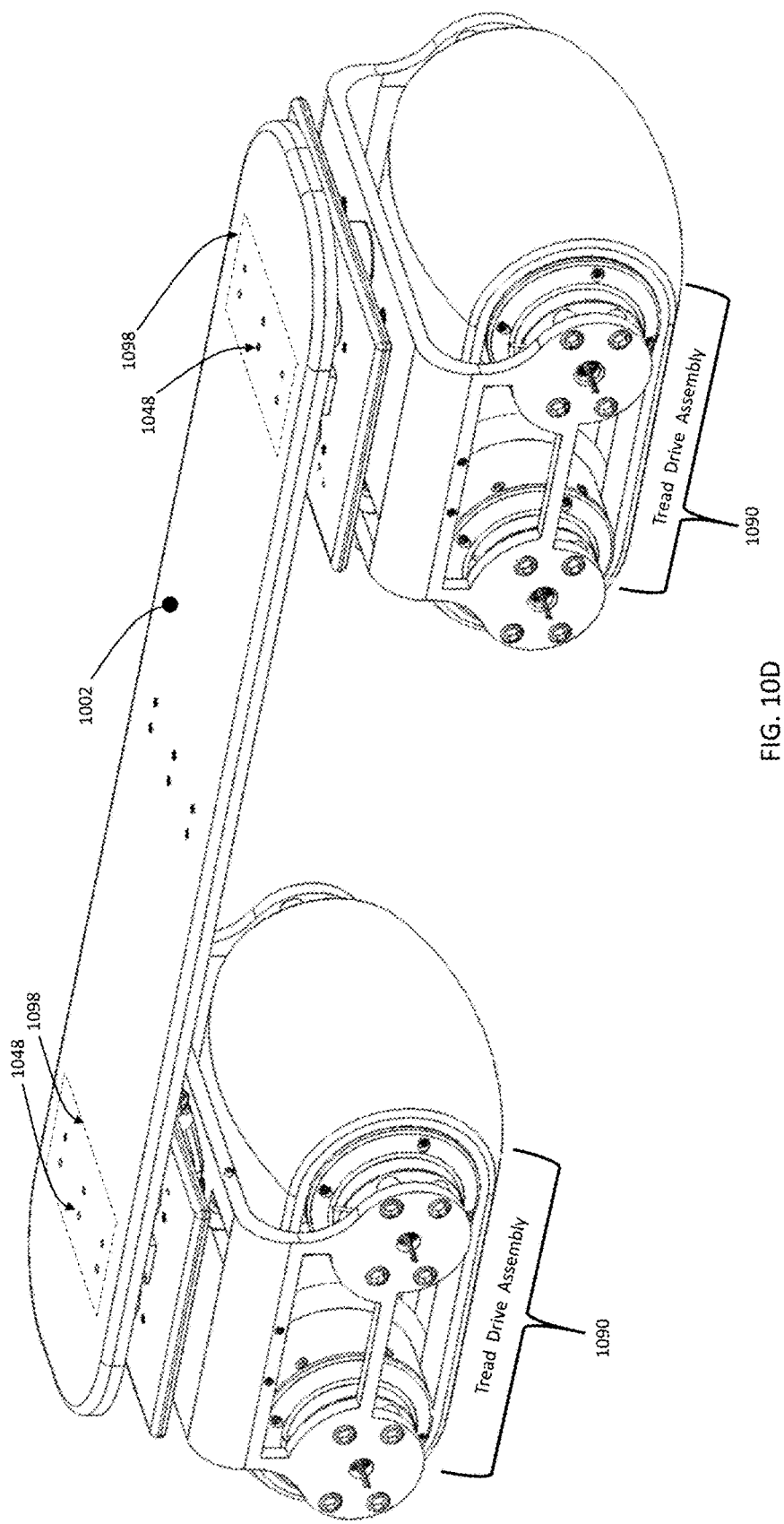
FIG. 10D is an elevated off-axis side view of a new rider board, which comprises two tread drive assemblies showing the common point of attachment in the front and the rear.

A double treaded skateboard is described in FIG. 10D. FIG. 10D is an elevated off-axis side view of a dual drive assembly rider board 1002, which can comprise tread drive assemblies 1090 (two shown) attached to the ends of the dual drive assembly rider board 1002 underside with the hinge assembly 1048 and the sensor control assembly 1098. This is another configuration of a skateboard that allows traversing on grass and snow. In this configuration, speed and direction control can be controlled by firmware in the electronic controller assembly that can balance the signal based on the ratios of the pressures sensed from the front and rear tread drive assemblies 1090. The motion of this dual drive assembly rider board 1002 is similar to that of a skateboard, and as previously described, the maneuvering can be controlled by leaning to the left or the right to determine the turning direction.

Figure 10E:
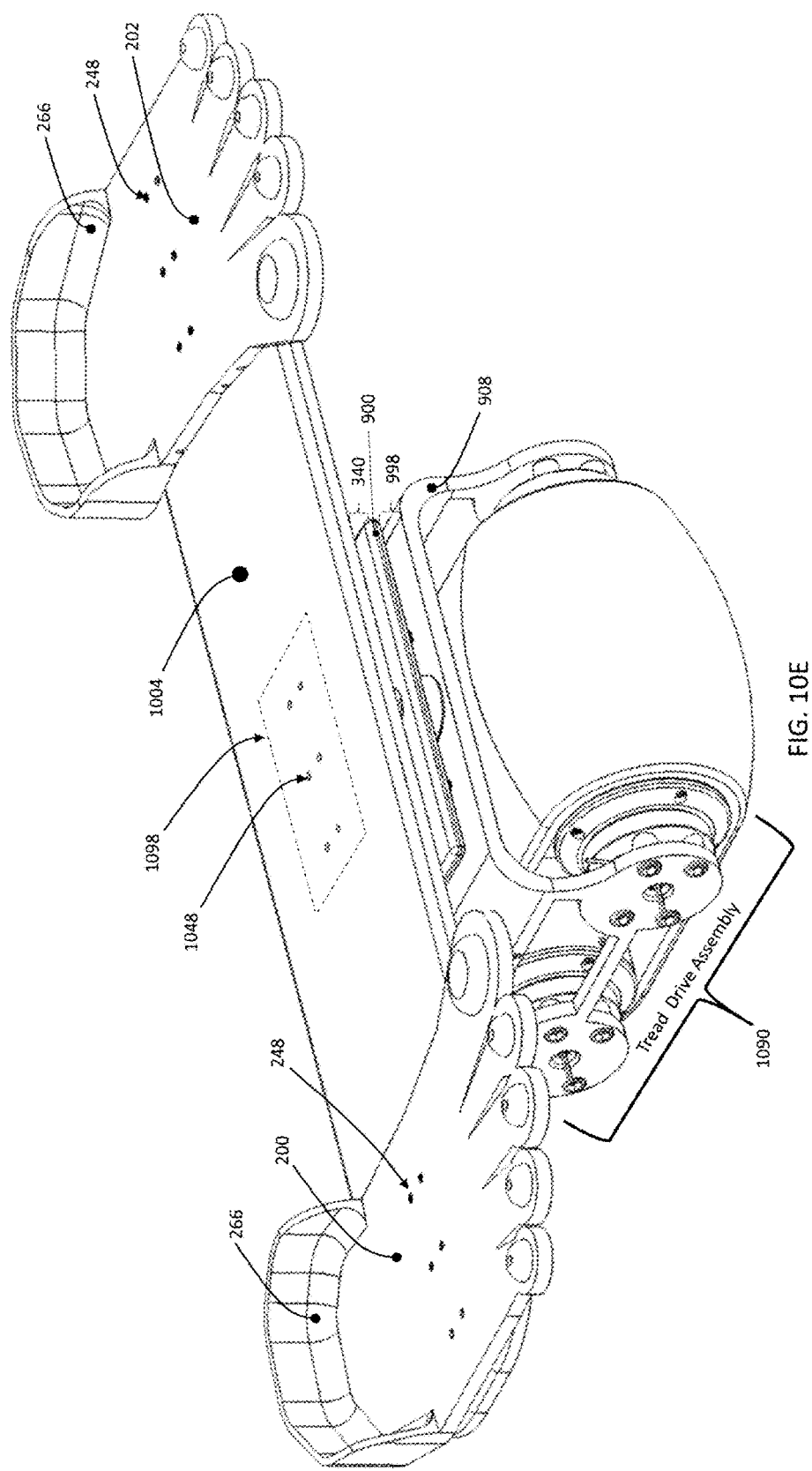
FIG. 10E is an elevated off-axis front view of another configuration of a new rider board, which is mounted transversely to the direction of motion with the feet straddling the sides of the new rider board.

FIG. 10E is an elevated off-axis front view of another configuration of a foot pedestal rider board 1004. The foot pedestal rider board 1004 can be mounted transversely on a single tread drive assembly 1090 as described in FIG. 10D, secured with the hinge mounting assembly 1048, and the sensor control assembly 1098. This allows the rider to straddle the foot pedestal rider board 1004 by placing feet in the respective left foot control platform 202 and the right foot control platform 200. The threaded through-holes 248 with fasteners 250 can be used to attach the right foot control platform 200 and left foot control platform 202, which can provide a place for the riders' feet. There can be no sensors or suspension assemblies between the foot pedestal rider board 1004 and the left foot control platform 202 and the right foot control platform 200. The steering assembly 998, the suspension array assembly 340, and the sensor control assembly 1098 can control the speed and direction when the rider leans forwards, backwards, and left or right.

Figure 10F:
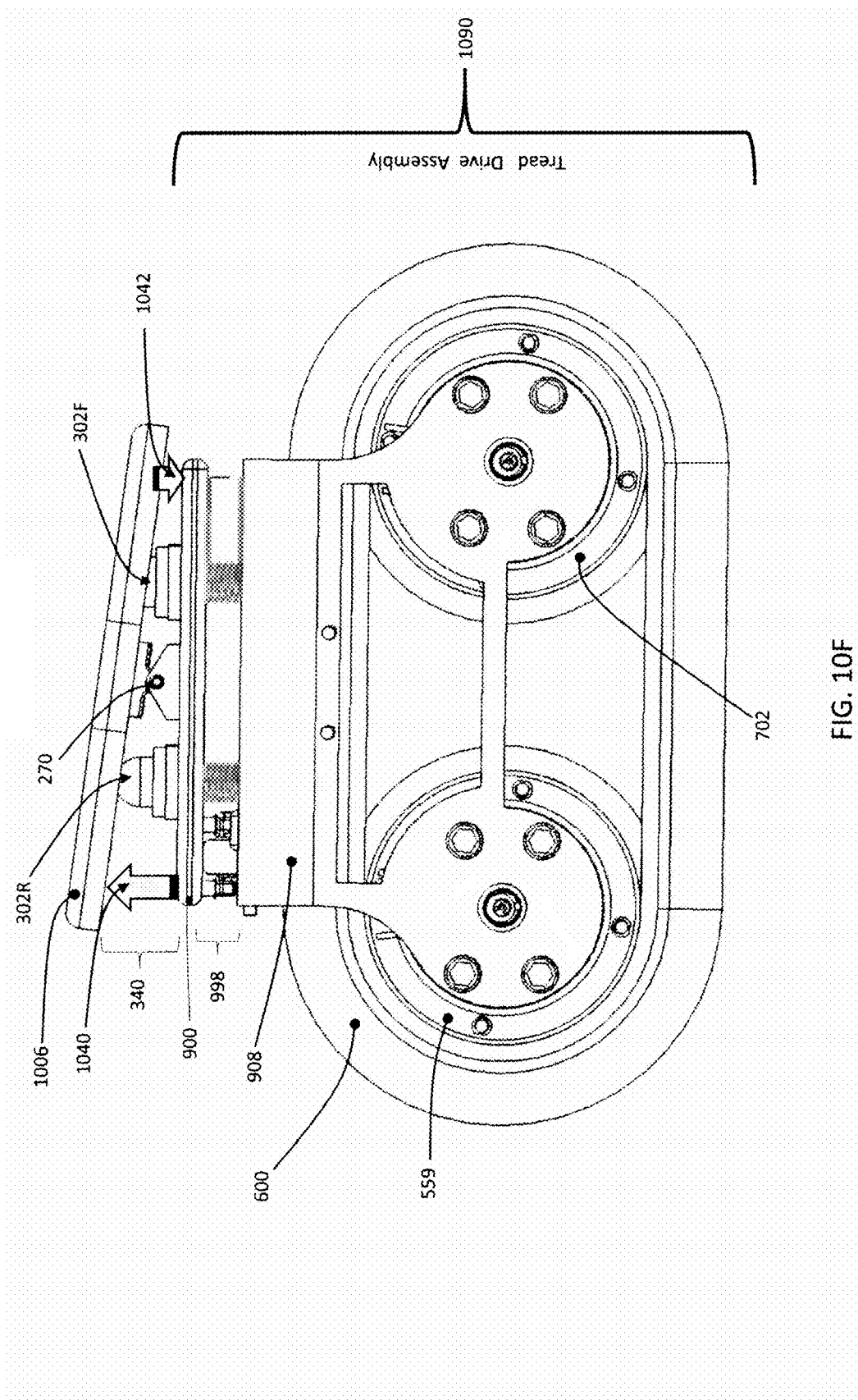
FIG. 10F is a side view of the transversely mounted new rider board without the benefit of the foot control platforms showing the rider leans forward causing the rider platform to be inclined relative to the hinge and compressing the forward piston, which in turn, places pressure on the sensor to move in the forward direction.

FIG. 10F is a side view of a transversely mounted rider board 1006 without the benefit of the foot control platforms. The transversely mounted rider board 1006 can be mounted atop the tread drive assembly 1090 with the hinge mounting assembly 1048 and the sensor control assembly 1098 (not shown) as in the previous example. The forward portion of the transversely mounted rider board 1006 is slanted forward indicating that the motion is in the forward direction. This slanted rotation of the transversely mounted rider board 1006 can be caused by leaning forward or rotating the feet forward, which caused the forward sensor piston head 302F to compress the sensor 290 (not shown), as indicated by a downward arrow 1042. An upward arrow 1040 indicated that the pressure on the rear sensor 302R is minimized. The top resilient pad 280 of the forward sensor array 230, can generate the required electrical response to the motor drive assembly 559 to move the tread drive assembly 1090 in the forward direction. Conversely, to lean backwards or rotate heels down on the transversely mounted rider board 1006, the response can be to cause compression of the rear piston head 302R. This applies highly compressive force on the resilient sensor pad 280 of the rear sensor array 232, which may cause the motor drive assembly 559 to move in the reverse direction.

Figure 10G:
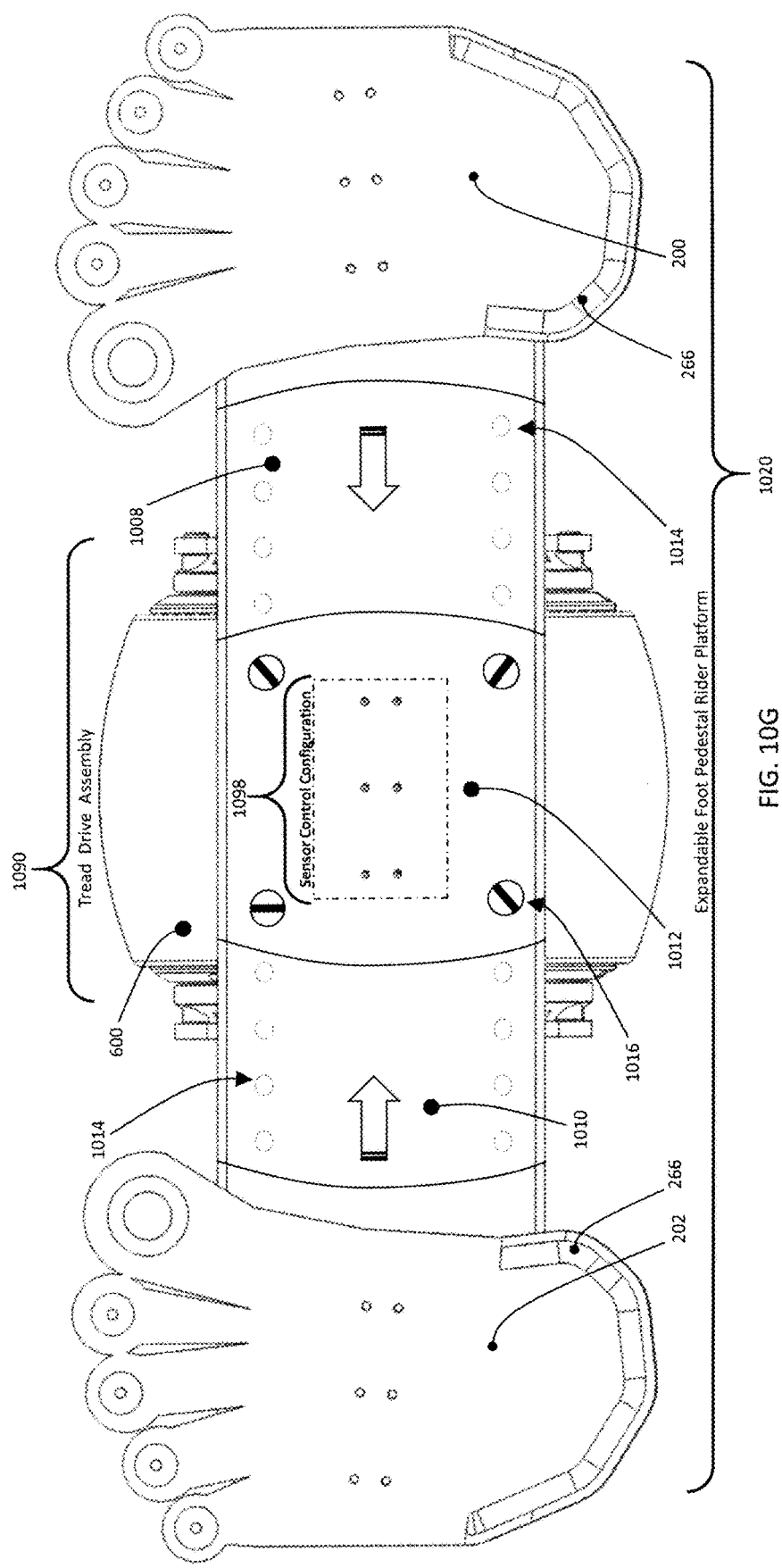
FIG. 10G is a top-down view of a new expandable foot pedestal rider platform with the left expandable foot pedestal and the right expandable foot pedestal with both pedestals in the fully extended position.

Rider comfort and maneuverability are not coincident with skateboard platforms of other motorized devices. Maneuverability and comfort can be realized in a common platform as illustrated in FIG. 10G. FIG. 10G is a top-down view of a new expandable foot pedestal rider platform 1020 with a left expandable foot pedestal 1010, a right expandable foot pedestal 1008, and a center pedestal platform 1012. The left expandable foot pedestal 1010 and the right expandable foot pedestal 1008 can be secured in place or adjusted for comfort by securing a pedestal extension locking fastener 1016 to a chosen location of a pedestal extension locking through-hole 1014. There can be one or more pedestal extension locking through-holes 1014 that allow for a comfortable positioning for the rider.

Attached to the right expandable foot pedestal 1008 and the left expandable foot pedestal 1010 can be the left foot control platform 202 and the right foot control platform 200. In this particular embodiment, the left foot control platform 202 and the right foot control platform 200 are only for foot placement and have no electronic control sensors attached to the underside. The center pedestal platform 1012 has attached to its underside, the hinge mounting assembly 1048 and the identical sensor control assembly 1098 that can appear on all other riding platforms such as the transversely mounted rider board 1006, foot pedestal rider board 1004, and the rider platform 1000. The center pedestal platform 1012 can be slightly thick than the conventional riding platforms to accommodate the thicker right expandable foot pedestal 1008, as well as, the left expandable foot pedestal 1010. The center pedestal platform 1012 can be attached to the tread drive assembly 1090. The electrical and mechanical connections can be identical to those previously described. When the right expandable foot pedestal 1008 and the left expandable foot pedestal 1010 are extended, several auxiliary electrical component storage compartments 724 can be located on the underside for extended range.

Figure 10H:
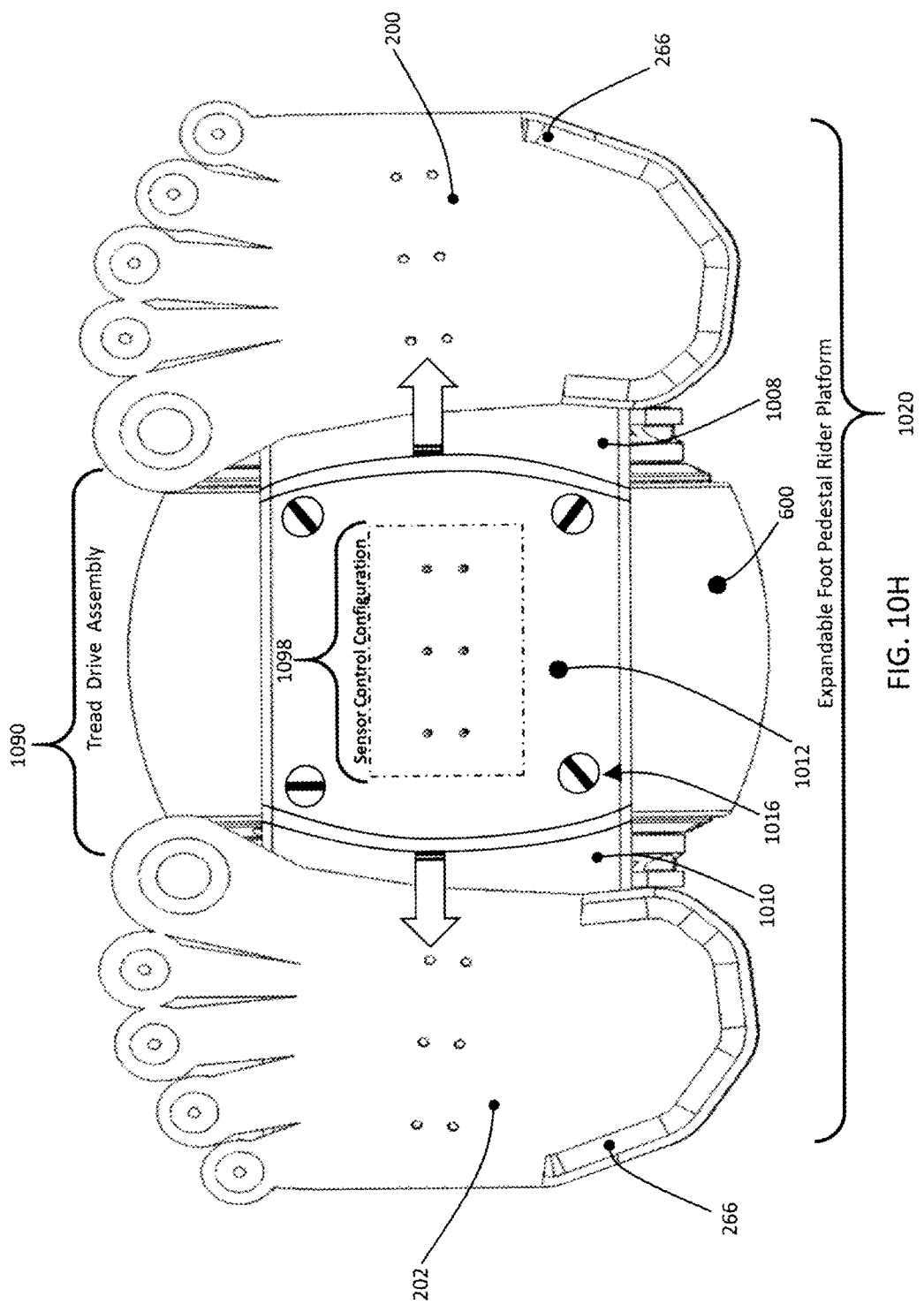
FIG. 10H is a top-down view of the expandable foot pedestal rider platform with the left expandable foot pedestal and the right expandable foot pedestal in the fully closed position.

FIG. 10H is a top-down view of the fully collapsed expandable foot pedestal rider platform 1020. The purpose for the expandable foot pedestal rider platform 1020 is not only for the comfort of the rider, but to facilitate greater maneuverability when it is collapsed inwardly. If the left expandable foot pedestal 1010 and the right expandable foot pedestal 1008 are fully extended, which restricts the turning radius, but yield a more stable ride. The radius of curvature of the turns can be greatly enhanced because the left expandable foot pedestal 1010 and the right expandable foot pedestal 1008 are fully collapsed and do not extend outwardly to restrict the turning radius. The rider may lean harder into the turns, thus producing smaller turning radius.

Figure 10I:
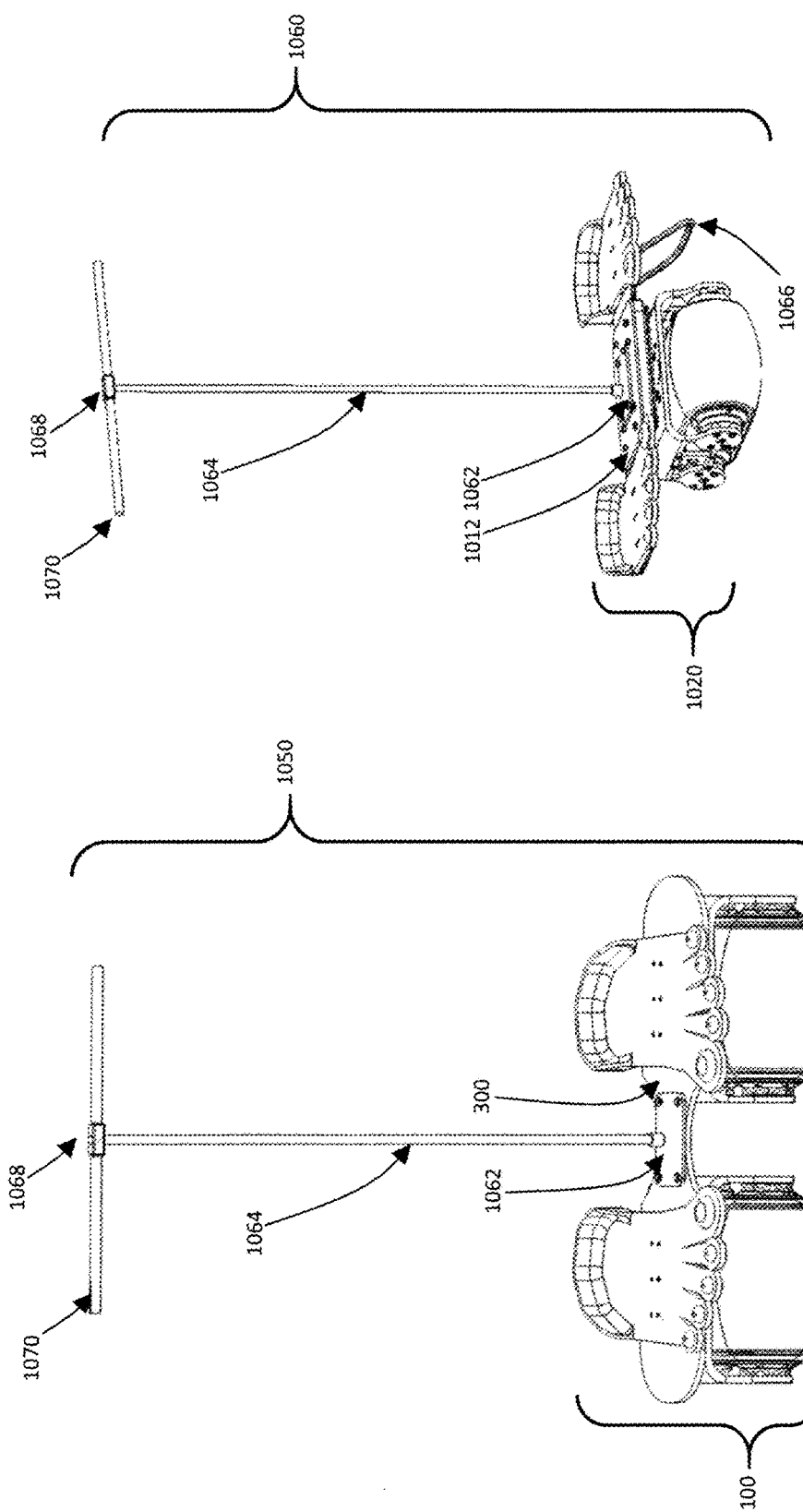
FIG. 10I is a slightly elevated front view of the handlebar-assisted personal motorized device and an off-axis elevated view of the sporty version of the single tread handlebar-assisted personal motorized device.

FIG. 10I is a slightly elevated front view of a handlebar-assisted personal motorized device 1050 and an off-axis elevated view of a sporty version of a single tread handlebar-assisted personal motorized device 1065. The handlebar-assisted personal motorized device 1050 is shown with a handlebar riser 1064 attached to a handlebar pedestal 1062, which is fastened to the base platform 300 of the personal motorized device 100. A handlebar T-union 1068 can provide mounting for a handlebar grip 1070, which can be attached to the handlebar riser 1064. The handlebar grip 1070 is a potential location for a commercial electronic control throttle. A handlebar assembly 1080 may act as a joystick controller where the handlebar assembly 1080 can be comprised of the handlebar pedestal 1062, handlebar riser 1064, handlebar T-union, and the handlebar grips.

A single trend handlebar-assisted personal motorized device 1065 is shown with a handlebar riser 1064 attached to the handlebar pedestal 1062, which can be fastened to a center pedestal platform 1012 of the expandable foot pedestal rider platform 1020. This provides handle-grips 1070, which can be attached to the handlebar riser 1064 at the handlebar T-union 1068. The handlebar grips 1070 are potential locations for an electronic control throttle placement or the handlebar assembly 1080 may act as a joystick controller, where the handlebar assembly 1080 can be comprised of the handlebar pedestal 1062, handlebar riser 1064, handlebar T-union 1068, and the handlebar grips 1070. A kickstand 1066 can be provided to assist the rider when mounting the single tread handlebar-assisted personal motorized device 1065.

Although the present invention has been described in detail with reference to certain preferred configurations thereof, other versions are possible. Embodiments of the present invention can comprise any combination of compatible features shown in the various figures, and these embodiments should not be limited to those expressly illustrated and discussed. Therefore, the spirit and scope of the invention should not be limited to the versions described above.

The foregoing is intended to cover all modifications and alternative constructions falling within the spirit and scope of the invention as expressed in the appended claims, wherein no portion of the disclosure is intended, expressly or implicitly, to be dedicated to the public domain if not set forth in any claims.

I claim:

1. A device, comprising:
    a platform;
    a first mount bracket body comprising a top portion and two side portions integral with said top portion, said top portion removably connected to an underside of said platform;
    a first drive hub assembly between and connected to said two side portions of said first mount bracket body, said first drive hub assembly comprising an electrical drive hub assembly comprising a motor;
    a first tread connected to said first drive hub assembly;
    a second mount bracket body comprising a top portion and two side portions integral with said top portion, said top portion removably connected to an underside of said platform such that said first mount bracket body and said second mount bracket body are in lateral alignment;
    a second drive hub assembly between and connected to said two side portions of said second mount bracket body, said second drive hub assembly comprising an electrical drive hub assembly comprising a motor; and
    a second tread connected to said second drive hub assembly.

2. The device of claim 1, further comprising a third drive hub assembly in line with said first drive hub assembly, between and connected to said two side portions of said first mount bracket body, said first tread also connected to said third drive hub assembly.

3. The device of claim 2, further comprising a fourth drive hub assembly in line with said second drive hub assembly, between and connected to said two side portions of said second mount bracket body, said second tread also connected to said fourth drive hub assembly.

4. The device of claim 1, wherein said first drive hub assembly comprises a stator assembly comprising two or more stator arms.

5. The device of claim 1, wherein said first drive hub assembly comprises a motor axle spanning substantially the entire length of said first drive hub assembly.

6. The device of claim 5, wherein said motor axle comprises one or more through-holes with wires passing therethrough to electrically connect to said motor.

7. The device of claim 1, wherein said first drive hub assembly comprises a positive sprocket and said first tread comprises a corresponding negative sprocket configured to engage said positive sprocket.

8. The device of claim 7, further comprising at least two guide rails configured to maintain connection of said first tread, said guide rails on a circumference of said first drive hub assembly.

9. The device of claim 8, wherein said first drive hub assembly comprises an electrical storage compartment configured to connect to one or more batteries and at least one motor controller.

10. A motorized platform, comprising:
    a base platform;
    a first motorized drive assembly, comprising:
        a first mount bracket body removably connected to said base platform;
        a first drive hub assembly and a second drive hub assembly each connected to two side portions of said first mount bracket body, at least said first drive hub assembly comprising an electrical drive hub assembly comprising a motor; and
        a first tread connected to said first drive hub assembly and said second drive hub assembly and between said two side portions of said first mount bracket body; and
    a second motorized drive assembly, comprising:
        a second mount bracket body removably connected to said base platform;
        a third drive hub assembly and a fourth drive hub assembly each connected to two side portions of said second mount bracket body, at least said third drive hub assembly comprising an electrical drive hub assembly comprising a motor; and
        a second tread connected to said third drive hub assembly and said fourth drive hub assembly and between said two side portions of said second mount bracket body.

11. The motorized platform of claim 10, further comprising a first ball bearing facilitating a moveable connection between said base platform and said first mount bracket body, and a second ball bearing facilitating a moveable connection between said base platform and said second mount bracket body.

12. The motorized platform of claim 10, wherein said first and second mount bracket bodies can be connected to said base platform so as to be in line with one another in a first configuration, and can be connected to said base platform so as to be next to one another in a second configuration.

13. The motorized platform of claim 10, further comprising at least a first mounting platform on a topside of said base platform, and at least a first sensor between said first mounting platform and said topside of said base platform, said first sensor configured to detect motion of said first mounting platform.

14. The motorized platform claim 10, wherein each of said first drive hub assembly and said third drive hub assembly comprises a positive sprocket, said first tread comprising a corresponding negative sprocket configured to engage said positive sprocket of said first drive hub assembly, and said second tread comprising a corresponding negative sprocket configured to engage said positive sprocket of said third drive hub assembly.

15. The motorized platform of claim 14, wherein said first drive hub assembly comprises first and second guide rails configured to maintain connection with said first tread, said first and second guide rails on either side of said positive sprocket of said first drive hub assembly, and on a circumference of said first drive hub assembly; and
    wherein said third drive hub assembly comprises third and fourth guide rails configured to maintain connection with said second tread, said third and fourth guide rails on either side of said positive sprocket of said third drive hub assembly, and on a circumference of said third drive hub assembly.

16. The motorized platform of claim 10, further comprising a handlebar connected to said base platform.

17. The motorized platform of claim 16, wherein said handlebar is configured to act as a controller for said motorized platform.

18. The motorized platform of claim 16, wherein said handlebar comprises an electronic control throttle.

19. A motorized platform, comprising:
a base platform;
first and second mount bracket bodies moveably connected to an underside of said base platform, said first and second mount bracket bodies in lateral alignment;
a first drive hub assembly connected to said first mount bracket body, said first drive hub assembly comprising an electrical drive hub assembly comprising a motor; and
a second drive hub assembly connected to said second mount bracket body, said second drive hub assembly comprising an electrical drive hub assembly comprising a motor;
a third drive hub assembly connected to said first mount bracket body; and
a fourth drive hub assembly connected to said second mount bracket body.

20. The motorized platform of claim 19, wherein said first and third drive hub assemblies are in line with one another, and wherein said second and fourth drive hub assemblies are in line with one another.

21. The motorized platform of claim 20, wherein said first mount bracket body comprises two side portions, said first and third drive hub assemblies between and connected to said two side portions of said first mount bracket body; and wherein said second mount bracket body comprises two side portions, said second and fourth drive hub assemblies between and connected to said two side portions of said second mount bracket body.

22. The motorized platform of claim 19, further comprising a first tread connected to said first and third drive hub assemblies and a second tread connected to said second and fourth drive hub assemblies.

23. A motorized platform, comprising:
a base platform;
first and second mount bracket bodies moveably connected to an underside of said base platform, said first and second mount bracket bodies in lateral alignment;
a first drive hub assembly connected to said first mount bracket body, said first drive hub assembly comprising an electrical drive hub assembly comprising a motor;
a second drive hub assembly connected to said second mount bracket body, said second drive hub assembly comprising an electrical drive hub assembly comprising a motor;
first and second mounting platforms on a top side of said base platform;
a first suspension assembly between said first mounting platform and said base platform, and a second suspension assembly between said second mounting platform and said base platform;
at least a first sensor between said first mounting platform and said first mount bracket body, said first sensor configured to detect motion of said first mounting platform; and
at least a second sensor between said second mounting platform and said second mount bracket body, said second sensor configured to detect motion of said second mounting platform.

24. The motorized platform of claim 23, further comprising a handlebar connected to said base platform.

* * * * *